(12) United States Patent
Chilappagari et al.

(10) Patent No.: US 12,455,746 B2
(45) Date of Patent: Oct. 28, 2025

(54) METHOD AND APPARATUS FOR PERFORMING MATRIX MULTIPLICATION

(71) Applicant: DeGirum Corporation, Santa Clara, CA (US)

(72) Inventors: Shashi Kiran Chilappagari, San Jose, CA (US); Winston Lee, Palo Alto, CA (US)

(73) Assignee: DeGirum Corporation, Santa Clara, CA (US)

( * ) Notice: Subject to any disclaimer, the term of this patent is extended or adjusted under 35 U.S.C. 154(b) by 1085 days.

(21) Appl. No.: 17/470,675

(22) Filed: Sep. 9, 2021

(65) Prior Publication Data

US 2021/0406030 A1 Dec. 30, 2021

Related U.S. Application Data

(62) Division of application No. 16/397,401, filed on Apr. 29, 2019, now abandoned.

(51) Int. Cl.
*G06F 9/38* (2018.01)
*G06F 9/30* (2018.01)
*G06F 17/16* (2006.01)

(52) U.S. Cl.
CPC ........ *G06F 9/3887* (2013.01); *G06F 9/30109* (2013.01); *G06F 9/30141* (2013.01); *G06F 9/3824* (2013.01); *G06F 17/16* (2013.01)

(58) Field of Classification Search
CPC ............... G06F 9/3887; G06F 9/30109; G06F 9/30141; G06F 17/16
See application file for complete search history.

(56) References Cited

U.S. PATENT DOCUMENTS

| | | |
|---|---|---|
| 7,197,625 B1 | 3/2007 | van Hook et al. |
| 7,302,627 B1 | 11/2007 | Mimar |
| 2007/0250683 A1 | 10/2007 | Van Hook et al. |
| 2013/0067203 A1 | 3/2013 | Chung |
| 2015/0205609 A1 | 7/2015 | Godard et al. |
| 2016/0224465 A1 | 8/2016 | Morad et al. |

(Continued)

FOREIGN PATENT DOCUMENTS

| | | |
|---|---|---|
| CN | 102576302 A | 7/2012 |
| TW | 200636573 A | 10/2006 |
| TW | 201020805 A | 6/2010 |

*Primary Examiner* — Michael D. Yaary
(74) *Attorney, Agent, or Firm* — Bever, Hoffman & Harms, LLP

(57) ABSTRACT

A computer system including a plurality of SIMD engines and a corresponding plurality of output register sets. Operand A register file stores one or more Operand A values, each including a plurality of operand words. Operand B register file stores one or more Operand B values, each including a plurality of operand words. Operand A distribution circuit receives an Operand A value from the Operand A register file, and selectively routes one or more of the operand words of the received Operand A value to create a plurality of input Operand A values, which are selectively routed to the SIMD engines. Operand B distribution circuit receives one or more Operand B values from the Operand B register file, and selectively routes one or more of the operand words of the Operand B value(s) to create a plurality of input Operand B values, which are selectively routed to the SIMD engines.

24 Claims, 31 Drawing Sheets

(56) References Cited

U.S. PATENT DOCUMENTS

| | | |
|---|---|---|
| 2018/0046906 A1 | 2/2018 | Dally et al. |
| 2018/0067899 A1* | 3/2018 | Rub .................. G06F 17/16 |
| 2018/0144435 A1 | 5/2018 | Chen |
| 2019/0042250 A1 | 2/2019 | Anders et al. |
| 2019/0171448 A1 | 6/2019 | Chen |
| 2020/0293867 A1* | 9/2020 | Shao .................. G06F 9/30036 |

* cited by examiner

MATRIX I

|  | Col 0 | Col 1 | Col 2 | Col 3 |  |  |  | Col 15 |
|---|---|---|---|---|---|---|---|---|
| Row 0 | $W_{0,0}$ | $W_{0,1}$ | $W_{0,2}$ | $W_{0,3}$ | ∘ | ∘ | ∘ | $W_{0,15}$ |
| Row 1 | $W_{1,0}$ | $W_{1,1}$ | $W_{1,2}$ | $W_{1,3}$ | ∘ | ∘ | ∘ | $W_{1,15}$ |
| Row 2 | $W_{2,0}$ | $W_{2,1}$ | $W_{2,2}$ | $W_{2,3}$ | ∘ | ∘ | ∘ | $W_{2,15}$ |
| Row 3 | $W_{3,0}$ | $W_{3,1}$ | $W_{3,2}$ | $W_{3,3}$ | ∘ | ∘ | ∘ | $W_{3,15}$ |
|  | ∘ | ∘ | ∘ | ∘ | ∘ | ∘ | ∘ | ∘ |
|  | ∘ | ∘ | ∘ | ∘ | ∘ | ∘ | ∘ | ∘ |
|  | ∘ | ∘ | ∘ | ∘ | ∘ | ∘ | ∘ | ∘ |
|  | ∘ | ∘ | ∘ | ∘ | ∘ | ∘ | ∘ | ∘ |
|  | ∘ | ∘ | ∘ | ∘ | ∘ | ∘ | ∘ | ∘ |
|  | ∘ | ∘ | ∘ | ∘ | ∘ | ∘ | ∘ | ∘ |
| Row 61 | $W_{60,0}$ | $W_{60,1}$ | $W_{60,2}$ | $W_{60,3}$ | ∘ | ∘ | ∘ | $W_{60,15}$ |
| Row 62 | $W_{61,0}$ | $W_{61,1}$ | $W_{61,2}$ | $W_{61,3}$ | ∘ | ∘ | ∘ | $W_{61,15}$ |
| Row 63 | $W_{62,0}$ | $W_{62,1}$ | $W_{62,2}$ | $W_{62,3}$ | ∘ | ∘ | ∘ | $W_{62,15}$ |
| Row 64 | $W_{63,0}$ | $W_{63,1}$ | $W_{63,2}$ | $W_{63,3}$ | ∘ | ∘ | ∘ | $W_{63,15}$ |

MATRIX J

|  | Col 0 | Col 1 | Col 2 | Col 3 |
|---|---|---|---|---|
| Row 0 | $a_0$ | $b_0$ | $c_0$ | $d_0$ |
| Row 1 | $a_1$ | $b_1$ | $c_1$ | $d_1$ |
| Row 2 | $a_2$ | $b_2$ | $c_2$ | $d_2$ |
| Row 3 | $a_3$ | $b_3$ | $c_3$ | $d_3$ |
|  | ∘ | ∘ | ∘ | ∘ |
|  | ∘ | ∘ | ∘ | ∘ |
|  | ∘ | ∘ | ∘ | ∘ |
| Row 14 | $a_{14}$ | $b_{14}$ | $c_{14}$ | $d_{14}$ |
| Row 15 | $a_{15}$ | $b_{15}$ | $c_{15}$ | $d_{15}$ |

FIG. 24

| $2000_0$ | | | |
|---|---|---|---|
| $w_{0,i}d_i$ | $w_{0,i}c_i$ | $w_{0,i}b_i$ | $w_{0,i}a_i$ |
| $w_{4,i}d_i$ | $w_{4,i}c_i$ | $w_{4,i}b_i$ | $w_{4,i}a_i$ |
| $w_{8,i}d_i$ | $w_{8,i}c_i$ | $w_{8,i}b_i$ | $w_{8,i}a_i$ |
| $w_{12,i}d_i$ | $w_{12,i}c_i$ | $w_{12,i}b_i$ | $w_{12,i}a_i$ |
| $w_{16,i}d_i$ | $w_{16,i}c_i$ | $w_{16,i}b_i$ | $w_{16,i}a_i$ |
| $w_{20,i}d_i$ | $w_{20,i}c_i$ | $w_{20,i}b_i$ | $w_{20,i}a_i$ |
| $w_{24,i}d_i$ | $w_{24,i}c_i$ | $w_{24,i}b_i$ | $w_{24,i}a_i$ |
| $w_{28,i}d_i$ | $w_{28,i}c_i$ | $w_{28,i}b_i$ | $w_{28,i}a_i$ |
| $w_{32,i}d_i$ | $w_{32,i}c_i$ | $w_{32,i}b_i$ | $w_{32,i}a_i$ |
| $w_{36,i}d_i$ | $w_{36,i}c_i$ | $w_{36,i}b_i$ | $w_{36,i}a_i$ |
| $w_{40,i}d_i$ | $w_{40,i}c_i$ | $w_{40,i}b_i$ | $w_{40,i}a_i$ |
| $w_{44,i}d_i$ | $w_{44,i}c_i$ | $w_{44,i}b_i$ | $w_{44,i}a_i$ |
| $w_{48,i}d_i$ | $w_{48,i}c_i$ | $w_{48,i}b_i$ | $w_{48,i}a_i$ |
| $w_{52,i}d_i$ | $w_{52,i}c_i$ | $w_{52,i}b_i$ | $w_{52,i}a_i$ |
| $w_{56,i}d_i$ | $w_{56,i}c_i$ | $w_{56,i}b_i$ | $w_{56,i}a_i$ |
| $w_{60,i}d_i$ | $w_{60,i}c_i$ | $w_{60,i}b_i$ | $w_{60,i}a_i$ |

| $2000_1$ | | | |
|---|---|---|---|
| $w_{1,i}d_i$ | $w_{1,i}c_i$ | $w_{1,i}b_i$ | $w_{1,i}a_i$ |
| $w_{5,i}d_i$ | $w_{5,i}c_i$ | $w_{5,i}b_i$ | $w_{5,i}a_i$ |
| $w_{9,i}d_i$ | $w_{9,i}c_i$ | $w_{9,i}b_i$ | $w_{9,i}a_i$ |
| $w_{13,i}d_i$ | $w_{13,i}c_i$ | $w_{13,i}b_i$ | $w_{13,i}a_i$ |
| $w_{17,i}d_i$ | $w_{17,i}c_i$ | $w_{17,i}b_i$ | $w_{17,i}a_i$ |
| $w_{21,i}d_i$ | $w_{21,i}c_i$ | $w_{21,i}b_i$ | $w_{21,i}a_i$ |
| $w_{25,i}d_i$ | $w_{25,i}c_i$ | $w_{25,i}b_i$ | $w_{25,i}a_i$ |
| $w_{29,i}d_i$ | $w_{29,i}c_i$ | $w_{29,i}b_i$ | $w_{29,i}a_i$ |
| $w_{33,i}d_i$ | $w_{33,i}c_i$ | $w_{33,i}b_i$ | $w_{33,i}a_i$ |
| $w_{37,i}d_i$ | $w_{37,i}c_i$ | $w_{37,i}b_i$ | $w_{37,i}a_i$ |
| $w_{41,i}d_i$ | $w_{41,i}c_i$ | $w_{41,i}b_i$ | $w_{41,i}a_i$ |
| $w_{45,i}d_i$ | $w_{45,i}c_i$ | $w_{45,i}b_i$ | $w_{45,i}a_i$ |
| $w_{49,i}d_i$ | $w_{49,i}c_i$ | $w_{49,i}b_i$ | $w_{49,i}a_i$ |
| $w_{53,i}d_i$ | $w_{53,i}c_i$ | $w_{53,i}b_i$ | $w_{53,i}a_i$ |
| $w_{57,i}d_i$ | $w_{57,i}c_i$ | $w_{57,i}b_i$ | $w_{57,i}a_i$ |
| $w_{61,i}d_i$ | $w_{61,i}c_i$ | $w_{61,i}b_i$ | $w_{61,i}a_i$ |

| $2000_2$ | | | |
|---|---|---|---|
| $w_{2,i}d_i$ | $w_{2,i}c_i$ | $w_{2,i}b_i$ | $w_{2,i}a_i$ |
| $w_{6,i}d_i$ | $w_{6,i}c_i$ | $w_{6,i}b_i$ | $w_{6,i}a_i$ |
| $w_{10,i}d_i$ | $w_{10,i}c_i$ | $w_{10,i}b_i$ | $w_{10,i}a_i$ |
| $w_{14,i}d_i$ | $w_{14,i}c_i$ | $w_{14,i}b_i$ | $w_{14,i}a_i$ |
| $w_{18,i}d_i$ | $w_{18,i}c_i$ | $w_{18,i}b_i$ | $w_{18,i}a_i$ |
| $w_{22,i}d_i$ | $w_{22,i}c_i$ | $w_{22,i}b_i$ | $w_{22,i}a_i$ |
| $w_{26,i}d_i$ | $w_{26,i}c_i$ | $w_{26,i}b_i$ | $w_{26,i}a_i$ |
| $w_{30,i}d_i$ | $w_{30,i}c_i$ | $w_{30,i}b_i$ | $w_{30,i}a_i$ |
| $w_{34,i}d_i$ | $w_{34,i}c_i$ | $w_{34,i}b_i$ | $w_{34,i}a_i$ |
| $w_{38,i}d_i$ | $w_{38,i}c_i$ | $w_{38,i}b_i$ | $w_{38,i}a_i$ |
| $w_{42,i}d_i$ | $w_{42,i}c_i$ | $w_{42,i}b_i$ | $w_{42,i}a_i$ |
| $w_{46,i}d_i$ | $w_{46,i}c_i$ | $w_{46,i}b_i$ | $w_{46,i}a_i$ |
| $w_{50,i}d_i$ | $w_{50,i}c_i$ | $w_{50,i}b_i$ | $w_{50,i}a_i$ |
| $w_{54,i}d_i$ | $w_{54,i}c_i$ | $w_{54,i}b_i$ | $w_{54,i}a_i$ |
| $w_{58,i}d_i$ | $w_{58,i}c_i$ | $w_{58,i}b_i$ | $w_{58,i}a_i$ |
| $w_{62,i}d_i$ | $w_{62,i}c_i$ | $w_{62,i}b_i$ | $w_{62,i}a_i$ |

| $2000_3$ | | | |
|---|---|---|---|
| $w_{3,i}d_i$ | $w_{3,i}c_i$ | $w_{3,i}b_i$ | $w_{3,i}a_i$ |
| $w_{7,i}d_i$ | $w_{7,i}c_i$ | $w_{7,i}b_i$ | $w_{7,i}a_i$ |
| $w_{11,i}d_i$ | $w_{11,i}c_i$ | $w_{11,i}b_i$ | $w_{11,i}a_i$ |
| $w_{15,i}d_i$ | $w_{15,i}c_i$ | $w_{15,i}b_i$ | $w_{15,i}a_i$ |
| $w_{19,i}d_i$ | $w_{19,i}c_i$ | $w_{19,i}b_i$ | $w_{19,i}a_i$ |
| $w_{23,i}d_i$ | $w_{23,i}c_i$ | $w_{23,i}b_i$ | $w_{23,i}a_i$ |
| $w_{27,i}d_i$ | $w_{27,i}c_i$ | $w_{27,i}b_i$ | $w_{27,i}a_i$ |
| $w_{31,i}d_i$ | $w_{31,i}c_i$ | $w_{31,i}b_i$ | $w_{31,i}a_i$ |
| $w_{35,i}d_i$ | $w_{35,i}c_i$ | $w_{35,i}b_i$ | $w_{35,i}a_i$ |
| $w_{39,i}d_i$ | $w_{39,i}c_i$ | $w_{39,i}b_i$ | $w_{39,i}a_i$ |
| $w_{43,i}d_i$ | $w_{43,i}c_i$ | $w_{43,i}b_i$ | $w_{43,i}a_i$ |
| $w_{47,i}d_i$ | $w_{47,i}c_i$ | $w_{47,i}b_i$ | $w_{47,i}a_i$ |
| $w_{51,i}d_i$ | $w_{51,i}c_i$ | $w_{51,i}b_i$ | $w_{51,i}a_i$ |
| $w_{55,i}d_i$ | $w_{55,i}c_i$ | $w_{55,i}b_i$ | $w_{55,i}a_i$ |
| $w_{59,i}d_i$ | $w_{59,i}c_i$ | $w_{59,i}b_i$ | $w_{59,i}a_i$ |
| $w_{63,i}d_i$ | $w_{63,i}c_i$ | $w_{63,i}b_i$ | $w_{63,i}a_i$ |

FIG. 26

METHOD AND APPARATUS FOR PERFORMING MATRIX MULTIPLICATION

PRIORITY APPLICATION

The present application is a divisional of U.S. patent application Ser. No. 16/397,401 entitled "Efficient Architectures For Deep Learning Algorithms" filed Apr. 29, 2019. The invention title was later amended to "COMPUTER SYSTEM USING A PLURALITY OF SINGLE INSTRUCTION MULTIPLE DATA (SIMD) ENGINES FOR EFFICIENT MATRIX OPERATIONS".

FIELD OF THE INVENTION

Multiple energy efficient architectures are provided that use single instruction multiple data (SIMD) engines to perform computations such as matrix multiplication and convolution. These operations are at the heart of various machine learning algorithms that are currently being implemented in various applications such as computer vision, machine translation and automatic speech recognition.

BACKGROUND

Conventional dot products and matrix multiplication are described in detail below. The dot product of two vectors can be defined as follows. Let p=[p1 p2 ... pn] and q=[q1 q2 ... qn] be two vectors of length n. The dot product of p and q, denoted by p·q is defined as:

$$p \cdot q = \sum_{i=1}^{i=n} pi * qi \qquad (1)$$

Computing the dot product of two vectors of length n requires n multiplications and (n−1) additions.

The multiplication of two vectors can be defined as follows. Let A be an (m×n) matrix (i.e., A is a matrix with m rows (horizontal) and n columns (vertical)). Let $a_{i,j}$ denote an element in the $i^{th}$ row and $j^{th}$ column of matrix A. Let B be an (n×k) matrix. Matrices A and B are represented below.

$$A = \begin{bmatrix} a_{1,1} & a_{1,2} & a_{1,3} & \ldots & a_{1,n} \\ a_{2,1} & a_{2,2} & a_{2,3} & \ldots & a_{2,n} \\ \vdots & \vdots & \vdots & \ddots & \vdots \\ a_{m,1} & a_{m,2} & a_{m,3} & \ldots & a_{m,n} \end{bmatrix} \qquad (2)$$

$$B = \begin{bmatrix} b_{1,1} & b_{1,2} & b_{1,3} & \ldots & b_{1,k} \\ b_{2,1} & b_{2,2} & b_{2,3} & \ldots & b_{2,k} \\ \vdots & \vdots & \vdots & \ddots & \vdots \\ b_{n,1} & b_{n,2} & b_{n,3} & \ldots & b_{n,k} \end{bmatrix}$$

The matrices A and B can be multiplied only if their dimensions are compatible (i.e., if the number of columns in A is equal to the number of rows in B). The product C of matrices A and B is defined below.

$$c_{i,j} = \sum_{r=1}^{r=n} a_{i,r} * b_{r,i} \qquad (3)$$

$$\forall \, i \in \{1, 2, \ldots, m\} \text{ and } \forall \, j \in \{1, 2, \ldots, k\}$$

From equation (3), it can be seen that the matrix C has m rows and k columns. It should also be noted that it is possible that A×B exists, but B×A does not exist.

One way to think about matrix multiplication is as follows. The element in the $i^{th}$ row and $j^{th}$ column in matrix C is the dot product of the $i^{th}$ row in matrix A and the $j^{th}$ column in matrix B. If the $i^{th}$ row in matrix A is denoted by $a_{i,:}$ and the $j^{th}$ column in matrix B is denoted by $b_{:,j}$, then $$c_{i,j} = a_{i,:} \cdot b_{:,j} \qquad (4)$$

Hence, the multiplication of two matrices of dimensions (m×n) and (n×k) consists of computing (m×k) dot products of n length vectors.

As noted above, computing the dot product of two vectors of length n requires n multiplications and (n−1) additions. The dot product computation is generally implemented as a series of multiply-accumulate operations. The multiply-accumulate operation computes the product of two numbers and adds that product to an accumulator. This can be represented as:

$$c \leftarrow c + a*b \qquad (5)$$

where a and b are the two numbers that are multiplied and c is the accumulator. The hardware unit that performs the multiply-accumulate operation is known as a multiplier-accumulator (MAC) unit. In this document, we also refer to the multiply-accumulate operation as MAC. FIG. 1 is a block diagram of a simple MAC unit 100 that includes input operand registers 101 and 102, which store operands a and b, respectively, multiply circuit 103, addition circuit 104 and accumulator register 105, which stores the accumulator value c.

As described above, matrix multiplication involves computing multiple dot products. Hence, matrix multiplication can be parallelized by employing multiple MACs. FIG. 2 is a block diagram of a system 200 that includes multiple parallel MACs 201-204 for performing multiple dot products in parallel. MACs 201, 202, 203, and 204 include operand registers 211-212, 213-214, 215-216 and 217-218, respectively, multiplier circuits 221, 222, 223 and 224, respectively, addition circuits 231, 232, 233 and 234, respectively, and accumulators 241, 242, 243 and 244, respectively.

System 200 includes four parallel MACs in which MAC 201 computes the dot product of $a_{1,:}$ with $b_{:,1}$, MAC 202 computes the dot product of $a_{2,:}$ with $b_{:,1}$, MAC 203 computes the dot product of $a_{3,:}$ with $b_{:,1}$ and MAC 204 computes the dot product of $a_{4,:}$ with $b_{:,1}$. It should be noted that while the four MACs 201-204 use different rows of matrix A, they all use the same column of matrix B. Supplying the MACs 201-204 with the input data is a challenge that needs to be solved. It would therefore be desirable to have efficient ways to supply computation units such as MACs 201-204 with the required data.

It is noted that all the MAC units 201-204 of FIG. 2 are performing the same operations, but with different inputs. Hence, instead of providing separate instructions to each of the MACs 201-204, it is possible to group all the MACs 201-204 together to form a single instruction multiple data (SIMD) engine that operates in response to a common instruction.

FIG. 3 is a block diagram of a SIMD engine 300 that groups operand registers 211, 213, 215 and 217 of MACs 201-204 to form a first operand register 301, and groups operand registers 212, 214, 216 and 218 of MACs 201-204 to form a second operand register 302. The multiplier circuits 221-224 of MACs 201-204 are combined to form multiplier 321, and the addition circuit 231-234 of MACs 201-204 are combined to form addition circuit 331. The accumulators 241-244 of MACs 201-204 are combined to form an accumulator 341. In this manner, the various elements of parallel MACs 201-204 are combined to form SIMD engine 300. It is important to note that the scalar inputs for the different MACs 201-204 are be combined to form vector inputs in the SIMD engine 300. In addition, the output of the accumulator 341 of the SIMD engine 300 will also be a vector.

It is noted that SIMD engines can accomplish much more than a simple multiply-accumulate operation using vector inputs. Generally, a SIMD engine is designed as a block with an instruction set that allows it to carry out different operations. A few of the operations that a SIMD engine can be built to handle include (but not limited to): vector addition, vector multiplication, dot product of two vectors and vector comparison (min and max).

Another important feature of a SIMD engine is the ability to handle different levels of precision. For example, a SIMD engine with input vector width of 128 bits can interpret the input vector as: 1 scalar of 128 bits, 2 scalars each of 64 bits, 4 scalars each of 32 bits, 8 scalars each of 16 bits, or 16 scalars each of 8 bits. Thus, the SIMD engine can operate in different 'modes' such as 8-bit mode, 16-bit mode or 32-bit mode.

While SIMD engines are efficient in processing vectors and are capable of executing a variety of instructions, they require significant control logic and local memory. It can be seen that in order to get the maximum number of operations per unit silicon area, the number of SIMD engines needs to be maximized. One way to achieve this is to have a design in which multiple SIMD engines can share control logic and memory resources. However, this imposes restrictions on the type of operations that can be performed by the SIMD engines and may require additional logic to drive the SIMD engines. It would therefore be desirable to have improved computer architectures that include SIMD engines.

SUMMARY

Accordingly, the present invention provides an improved computer architecture that includes a plurality of single instruction, multiple data (SIMD) engines that operate in parallel. An Operand A register file stores a first set of one or more operand values (Operand A values), wherein each of the Operand A values includes a plurality of operand words. An Operand B register file stores a second plurality of one or more operand values (Operand B values), wherein each of the Operand B values includes a plurality of operand words. In a particular embodiment, each of the Operand A and Operand B values includes four 32-bit operand words. In another embodiment, each of the Operand A and Operand B values includes eight 16-bit operand words.

An input distribution block that includes an Operand A distribution circuit and an Operand B distribution circuit.

The Operand A distribution circuit is coupled to receive an Operand A value from the Operand A register file. The Operand A distribution circuit selectively routes one or more of the operand words of the received Operand A value to create a plurality of input Operand A values, wherein each of the input Operand A values is routed to a corresponding one of the plurality of SIMD engines.

In one mode, the Operand A distribution circuit is controlled to route the received Operand A value to each of the SIMD engines in parallel. For example, if the received Operand A value includes four operand words [w, x, y, z], and there are four parallel SIMD engines, then each of the SIMD engines would receive the four operand words [w, x, y, z].

In another mode, the Operand A distribution circuit is controlled to route a single one of the operand words of the received Operand A value to each of the SIMD engines in parallel. In this mode, the selected single one of the operand words is repeated multiple to create each of the input Operand A values. For example, if the received Operand A value includes four operand words [w, x, y, z], operand word [w] is selected, and there are four parallel SIMD engines, then each of the SIMD engines would receive an input Operand A value that includes four operand words [w, w, w, w].

In yet another mode, the Operand A distribution circuit is controlled to route a different operand word of the received Operand A value to each of the SIMD engines in parallel. In this mode, each different operand word is repeated multiple times to create each of the input Operand A values. For example, if the received Operand A value includes four operand words [w, x, y, z] and there are four parallel SIMD engines, then one of the four SIMD engines would receive input Operand A value [w, w, w, w], one of the four SIMD engines would receive input Operand A value [x, x, x, x], one of the four SIMD engines would receive input Operand A value [y, y, y, y], and one of the four SIMD engines would receive input Operand A value [z, z, z, z].

The Operand B distribution circuit is coupled to receive one or more Operand B values from the Operand B register file. The Operand B distribution circuit selectively routes one or more of the operand words from one or more of the received Operand B values to create a plurality of input Operand B values, wherein each of the input Operand B values is routed to a corresponding one of the plurality of SIMD engines.

In one mode, the Operand B distribution circuit is controlled to route a received Operand B value to each of the SIMD engines in parallel. For example, if the received Operand B value includes four operand words [a, b, c, d], and there are four parallel SIMD engines, then each of the SIMD engines would receive the four operand words [a, b, c, d].

In another mode, the Operand B distribution circuit includes a plurality of buffers to store a plurality of Operand B values. Operand B select logic is used to select which of the SIMD engines receive which of the buffered Operand B values. For example, if the buffered Operand B values include [a, b, c, d], [e, f, g, h], [i, j, k, l] and [m, n, o, p], and there are four parallel SIMD engines, then then one of the four SIMD engines could receive input Operand B value [a, b, c, d], one of the four SIMD engines could receive input Operand B value [e, f, g, h], one of the four SIMD engines could receive input Operand B value [i, j, k, l], and one of the four SIMD engines could receive input Operand B value and [m, n, o, p]. Alternately, two of the four SIMD engines could receive input Operand B value [a, b, c, d], one of the four SIMD engines could receive input Operand B value [e, f, g, h], and one of the four SIMD engines could receive input Operand B value [i, j, k, l].

In various embodiments, the Operand B register file can include a single register file (such that the plurality of Operand B values are loaded into the Operand B buffers in a serial manner), or a plurality of register files (such that the plurality of Operand B values are loaded into the Operand B buffers in parallel). If Operand B register file is implemented using a plurality of register files, then the Operand B buffers can be implemented using a double buffer configuration, wherein Operand B values are transferred from the Operand B register file to the Operand B distribution circuit at the same time that Operand B value are transferred from the Operand B distribution circuit to the SIMD engines.

In yet another mode, the Operand B distribution circuit receives a plurality of Operand B values in parallel from the Operand B register file. These received Operand B values are provided to a shift logic circuit within the Operand B distribution circuit. Control logic specifies an amount of shift (in operand words) that the shift logic circuit introduces to the received Operand B values. The shifted Operand B values are buffered within the Operand B distribution circuit, and are then routed to the SIMD engines in parallel.

The improved computer architecture also includes a plurality of output register sets, each coupled to a corresponding one of the plurality of SIMD engines. Data (e.g., dot product values) are selectively transferred between the output register sets and the corresponding SIMD engines, enabling operations such as multiply-accumulate operations. In one embodiment, each of the plurality of output register sets is independently addressed, providing flexibility to the operations performed.

In particular embodiments, the computer architecture of the present invention enables efficient sparse matrix multiplication.

The present invention will be more fully understood in view of the following description and drawings.

BRIEF DESCRIPTION OF THE DRAWINGS

FIG. 24 is a diagram illustrating two matrices I and J to be multiplied by the computer architecture of FIG. 23 in accordance with one embodiment of the present invention.

FIG. 26 is a block diagram illustrating the manner in which results of the multiplication of Matrix I and Matrix J of FIG. 24 are stored within the output register sets of the computer architecture of FIG. 23 in accordance with one embodiment of the present invention.

DETAILED DESCRIPTION

The following subsections describe various efficient SIMD engine architectures. Specifically, ways to operate multiple SIMD engines in parallel are proposed, and manners for supplying the SIMD engines with inputs are described. While the following description uses examples that implement 128-bit wide input operands and 4 SIMD engines, it is noted that the described examples can be extended to smaller or larger input operand widths and/or fewer or more SIMD engines.

Figure 4:
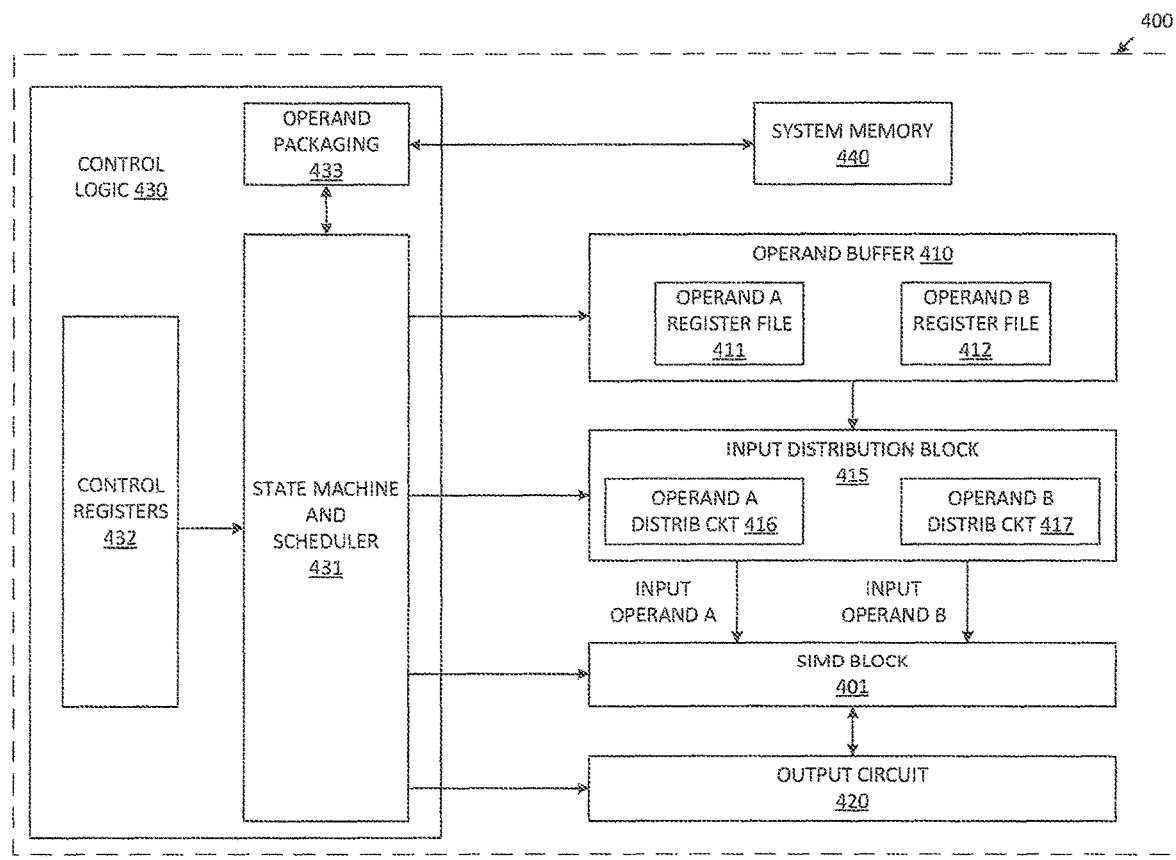
FIG. 4 is a block diagram of a computer system in accordance with one embodiment of the present invention.

FIG. 4 is a block diagram of a computer system 400 that includes various hardware resources needed for operating a SIMD block 401 in accordance with one embodiment. These resources include an operand buffer 410 (which includes Operand A register file 411 and Operand B register file 412), input distribution block 415 (which includes operand A distribution circuit 416 and operand B distribution circuit 417), SIMD block 401, output circuit 420, control logic 430 (which includes state machine and scheduler 431, control registers 432 and operand packaging circuit 433), and system memory 440. The important parameters for the SIMD operation are the operands, the type of operation and the addresses for the output circuit. These parameters are described in more detail in the subsequent sections.

In general, control logic 430 controls writing operand values (e.g., matrix entries) into Operand A register file 411 and Operand B register file 412. More specifically, state machine and scheduler 431 causes operand packaging circuit 433 to retrieve matrix entries that are stored in system memory 440. Operand packaging circuit 433 packages these matrix entries to form operand values in accordance with the operation to be performed. In one embodiment, the various operations are defined by entries in the control registers 432. As described in more detail below, some operations (e.g., sparse matrix multiplication) require that matrix entries having zero values are omitted from the operand values provided to the operand buffer 410. State machine and scheduler 431 controls the writing of operand values provided by the operand packaging circuit 433 to the Operand A register file 411 and the Operand B register file 412. State machine and scheduler 431 also controls the reading of operand values from Operand A register file 411 and Operand B register file 412, wherein these read values are provided to Operand A distribution circuit 416 and Operand B distribution circuit 417 within input distribution block 415.

In general, state machine and scheduler 431 provides addresses to input distribution block 415, wherein these addresses control the manner in which the Operand A distribution circuit 416 routes the Operand A values received from Operand A register file 411 to SIMD block 401, and also control the manner in which the Operand B distribution circuit 417 routes the Operand B values received from Operand B register file 412 are routed to SIMD block 401. As described in more detail below, Operand B distribution circuit 417 may include buffers to store multiple Operand B values, as well as shift logic that controls an amount of shift to be applied to the Operand B values received from Operand B register file 412.

State machine and scheduler 431 also provides addresses used to access memory banks included within the output circuit 420. These addresses include read addresses, which enable accumulation values stored in the memory banks to be routed to the SIMD block 401 for multiply-accumulate operations, as well as write addresses, which enable updated accumulation values provided by SIMD block 401 to be written back to the memory banks within output circuit 420.

Control registers 432 store values that control the manner in which the state machine and scheduler 431 generates the various addresses for different modes of operation (which are described in more detail below). The operation of the various elements of computer system 400 is described in more detail below for various modes (i.e., architectures).

Architectures for Operand A

Figure 1:
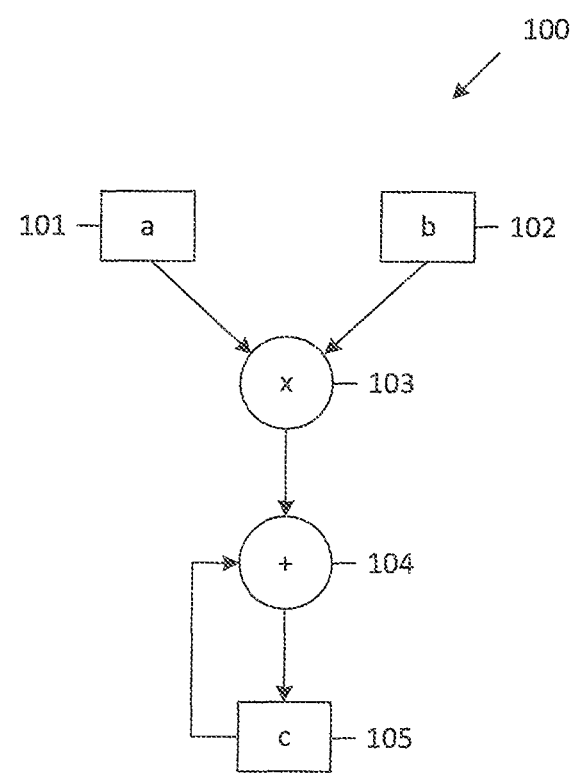
FIG. 1 is a block diagram of a conventional multiplier-accumulator (MAC) unit.
Figure 2:
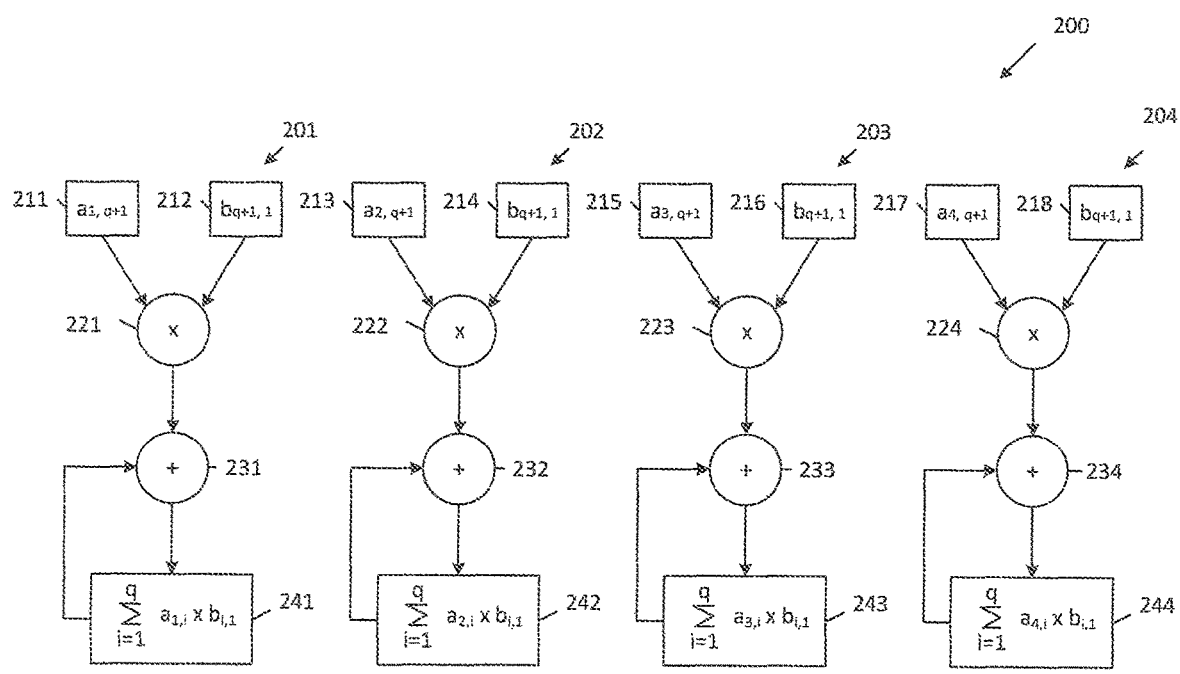
FIG. 2 is a block diagram of a conventional system that includes multiple parallel MAC units for calculating multiple dot products in parallel.
Figure 3:
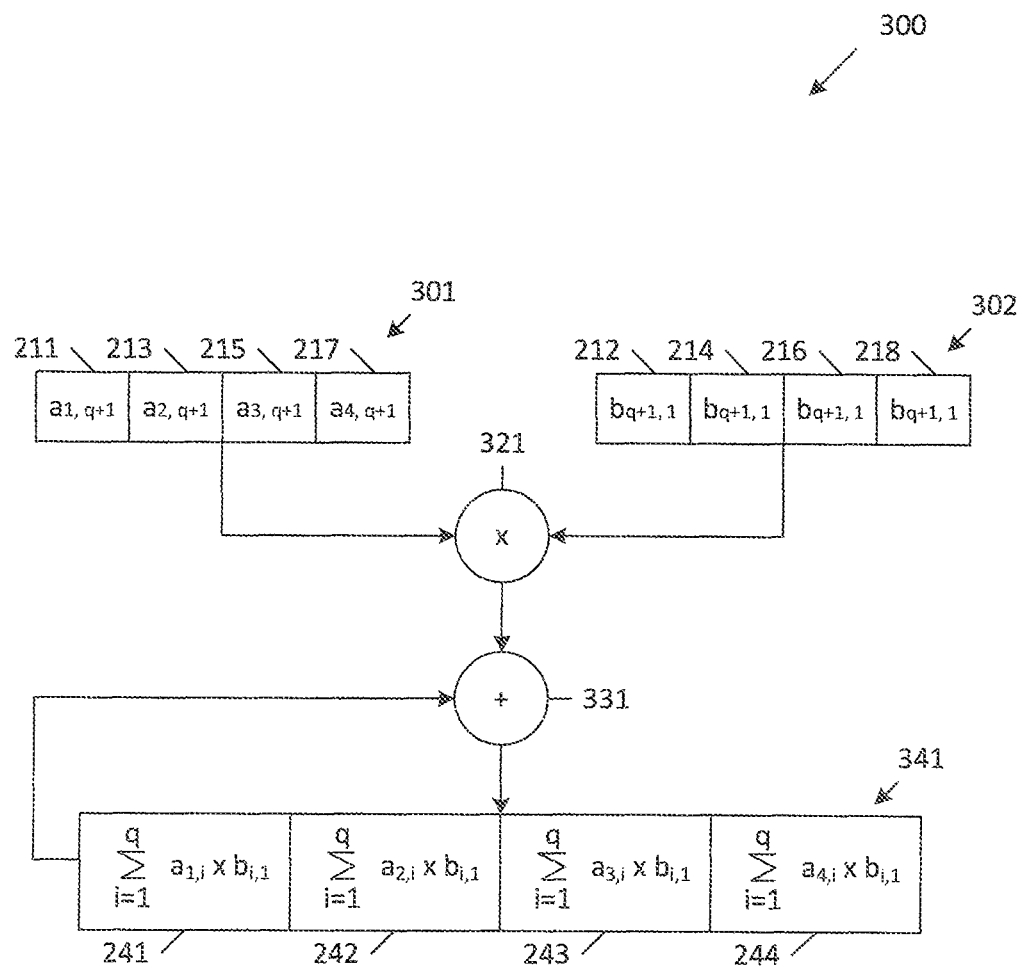
FIG. 3 is a block diagram of a conventional single instruction multiple data (SIMD) engine that is created by grouping various elements of the multiple parallel MAC units of FIG. 2.

Three architectures, which are described in more detail below, are proposed for input Operand A. In these following examples, the SIMD block 401 includes four SIMD engines operating in parallel, wherein each of the four SIMD engines receives a corresponding input Operand A having a width of 128 bits. A single entry from the Operand A register file 411 (which is included in operand buffer 410) is 128 bits. This entry is hereinafter referred to as a register file word. In the described embodiments, each of the four SIMD engines within SIMD block 401 is identical to the SIMD engine 300 of FIG. 3.

Architecture 1A

In a first architecture for providing Operand A to the SIMD block 401 (Architecture 1A), each of the four SIMD engines ($SIMD_0$, $SIMD_1$, $SIMD_2$, $SIMD_3$) included in the SIMD block 401 receives a full register file word (which includes four 32-bit word values w, x, y and z) as the input Operand A.

Figure 5:
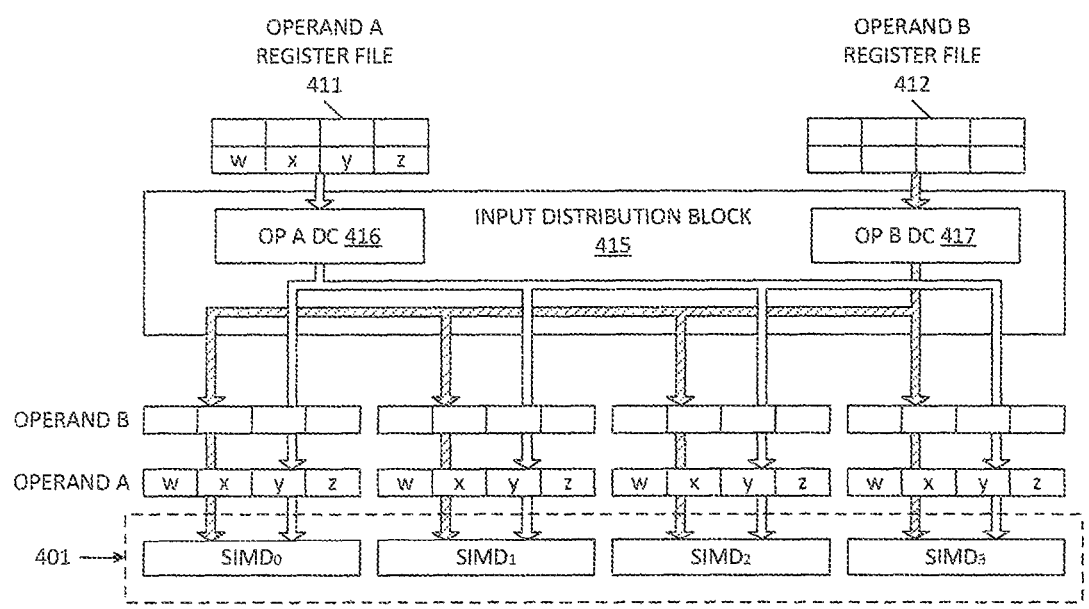
FIG. 5 is a block diagram illustrating an architecture (Architecture 1A) for routing a first operand value (Operand A) having four 32-bit operand words from an Operand A register file to a plurality of SIMD engines in accordance with one embodiment of the present invention.

FIG. 5 is a block diagram illustrating one embodiment of the first Operand A architecture (Architecture 1A), wherein four 32-bit input words [w, x, y, z] stored in Operand A register file 411 are routed to Operand A distribution circuit 416. In one embodiment, Operand A distribution circuit 416 includes a buffer that stores the received input words [w, x, y, z]. Operand A distribution circuit 416 also includes circuitry for performing a switching/demultiplexing function, wherein the buffered input words [w, x, y, z] are routed in parallel to each of the four SIMD engines ($SIMD_0$, $SIMD_1$, $SIMD_2$, $SIMD_3$) included in the SIMD block 401. Thus, in Architecture 1A, each of the SIMD engines ($SIMD_0$, $SIMD_1$, $SIMD_2$, $SIMD_3$) receives the full register file word [w, x, y, z] as input Operand A.

Figure 6:
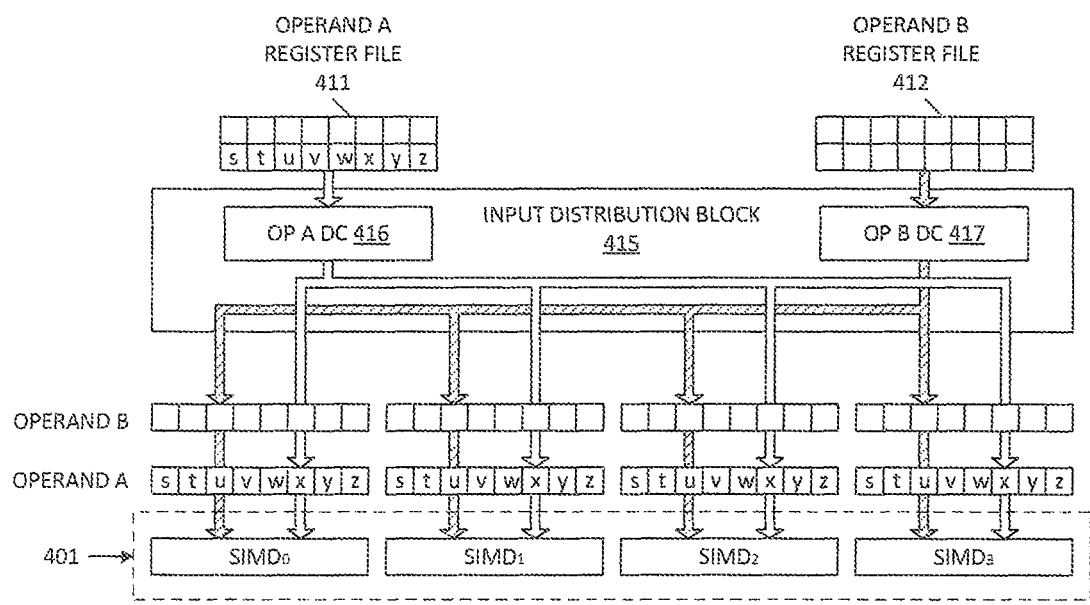
FIG. 6 is a block diagram illustrating an architecture (Architecture 1A) for routing a first operand value (Operand A) having eight 16-bit operand words from an Operand A register file to a plurality of SIMD engines in accordance with one embodiment of the present invention.

FIG. 6 is a block diagram illustrating another embodiment of the first Operand A architecture (Architecture 1A), wherein eight 16-bit input words [s, t, u, v, w, x, y, z] stored in Operand A register file 411 are routed to Operand A distribution circuit 416. These input words [s, t, u, v, w, x, y, z] are buffered within Operand A distribution circuit 416, and are then routed in parallel to each of the four SIMD engines ($SIMD_0$, $SIMD_1$, $SIMD_2$, $SIMD_3$) included in the SIMD block 401. Again, in Architecture 1A, each of the SIMD engines ($SIMD_0$, $SIMD_1$, $SIMD_2$, $SIMD_3$) receives the full register file word [s, t, u, v, w, x, y z] as input Operand A.

Architecture 2A

In a second architecture for providing Operand A to the SIMD block 401 (Architecture 2A), each of the four SIMD engines ($SIMD_0$, $SIMD_1$, $SIMD_2$, $SIMD_3$) included in the SIMD block 401 receives a single input word from the operand A register file 411, wherein this single input word is repeated a number of times to match the input width of Operand A. Input distribution block 415 selects the single input word by specifying the index of the single input word to be broadcast within the operand A register file 411.

Figure 7:
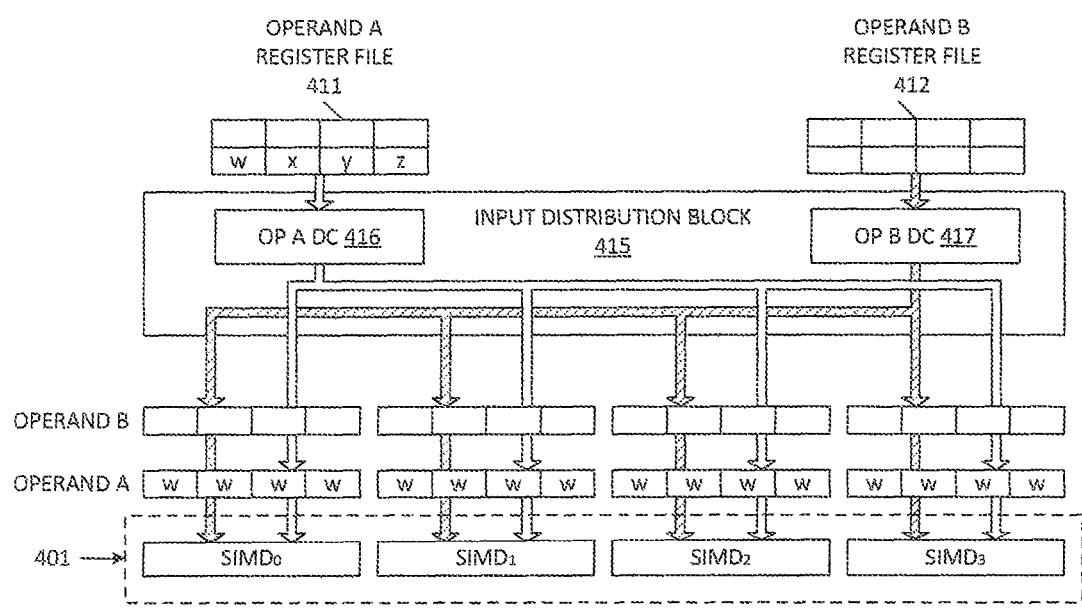
FIG. 7 and FIG. 8 are block diagrams illustrating an architecture (Architecture 2A), for routing a first operand value (Operand A) having four 32-bit operand words from an Operand A register file to a plurality of SIMD engines in accordance with one embodiment of the present invention.

FIG. 7 is a block diagram illustrating one embodiment of the second Operand A architecture (Architecture 2A), wherein four 32-bit input words [w, x, y, z] stored in Operand A register file 411 are routed to Operand A distribution circuit 416. As described above, Operand A distribution circuit 416 includes a buffer that stores the received input words [w, x, y, z]. State machine and scheduler 431 provides an index value to Operand A distribution circuit 416, wherein this index value specifies the input word [w]. In response, Operand A distribution circuit 416 performs a switching/demultiplexing operation, wherein the input word [w] is routed in parallel to each of the four SIMD engines ($SIMD_0$, $SIMD_1$, $SIMD_2$, $SIMD_3$) included in the SIMD block 401. That is, the 32-bit input word [w] is effectively repeated four times to provide a 128-bit input Operand A, which consists of the 32-bit word [w] repeated four times. This 128-bit input Operand A [w, w, w, w] is provided to each of the SIMD engines ($SIMD_0$, $SIMD_1$, $SIMD_2$, $SIMD_3$) in parallel.

Figure 8:
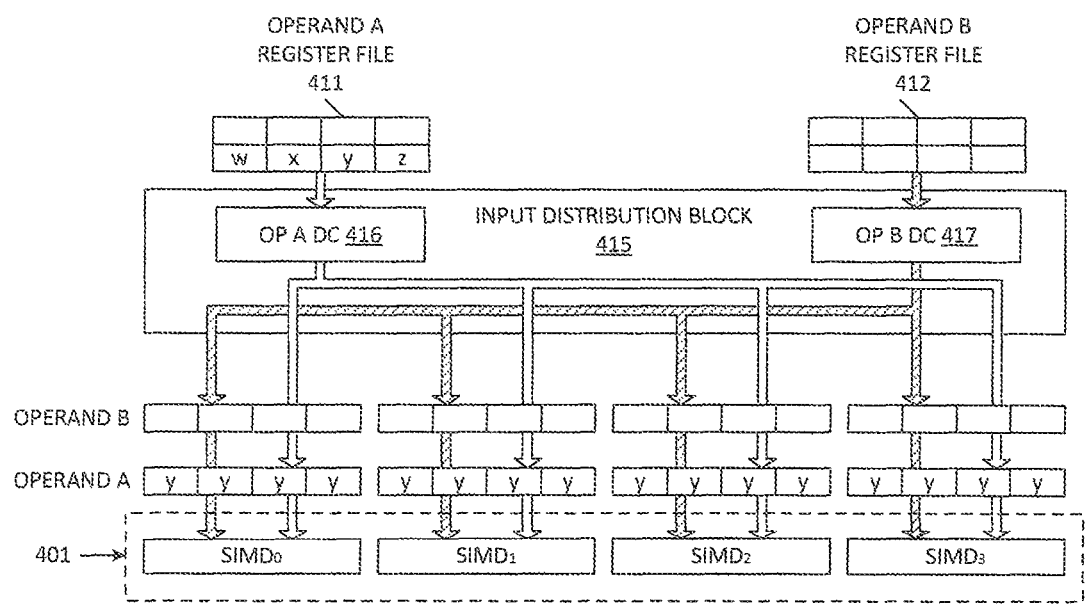

FIG. 8 is a block diagram illustrating another example of the second Operand A architecture (Architecture 2A), wherein the state machine and scheduler 431 provides an index value that specifies the input word y to Operand A distribution circuit 416. In response, Operand A distribution circuit 416 performs a switching/demultiplexing operation, wherein the input word [y] is routed in parallel to each of the four SIMD engines ($SIMD_0$, $SIMD_1$, $SIMD_2$, $SIMD_3$) included in the SIMD block 401. That is, the 32-bit input word [y] is effectively repeated four times to provide a 128-bit input Operand A [y, y, y, y], which is provided to each of the SIMD engines ($SIMD_0$, $SIMD_1$, $SIMD_2$, $SIMD_3$) in parallel.

Figure 9:
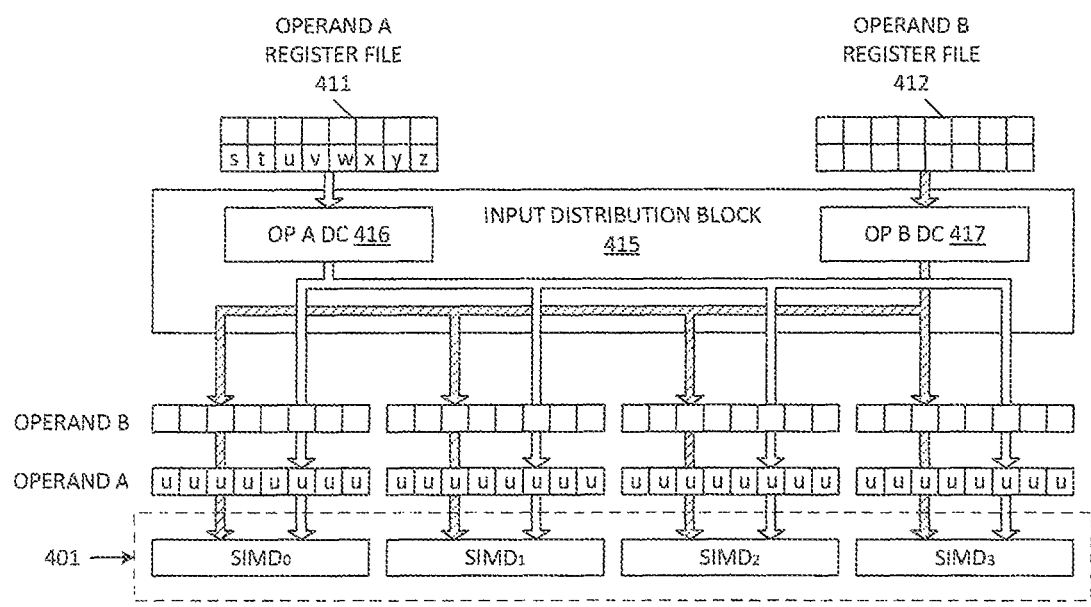
FIG. 9 and FIG. 10 are block diagrams illustrating an architecture (Architecture 2A), for routing a first operand value (Operand A) having eight 16-bit operand words from an Operand A register file to a plurality of SIMD engines in accordance with one embodiment of the present invention.

FIG. 9 is a block diagram illustrating another embodiment of the second Operand A architecture (Architecture 2A), wherein eight 16-bit input words [s, t, u, v, w, x, y, z] from Operand A register file 411 are buffered in Operand A distribution circuit 416. State machine and scheduler 431 provides an index value to Operand A distribution circuit 416, wherein this index value specifies the input word [u]. In response, Operand A distribution circuit 416 performs a switching/demultiplexing operation, wherein the input word [u] is routed in parallel to each of the four SIMD engines ($SIMD_0$, $SIMD_1$, $SIMD_2$, $SIMD_3$) included in the SIMD block 401. That is, the 16-bit input word [u] is effectively repeated eight times to provide a 128-bit input Operand A [u, u, u, u, u, u, u, u], which is provided to each of the SIMD engines ($SIMD_0$, $SIMD_1$, $SIMD_2$, $SIMD_3$) in parallel.

Figure 10:
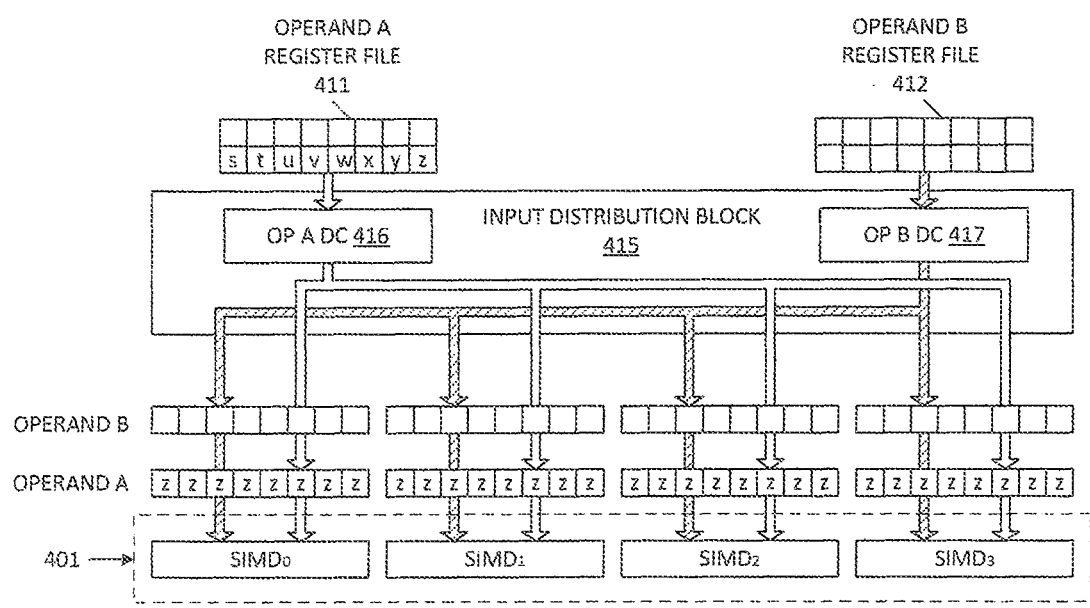

FIG. 10 is a block diagram illustrating another example of the second Operand A architecture (Architecture 2A), wherein eight 16-bit input words [s, t, u, v, w, x, y, z] from Operand A register file 411 are buffered in Operand A distribution circuit 416. State machine and scheduler 431 provides an index value to Operand A distribution circuit 416, wherein this index value specifies the input word [z]. In response, Operand A distribution circuit 416 performs a switching/demultiplexing operation, wherein the input word [z] is routed in parallel to each of the four SIMD engines ($SIMD_0$, $SIMD_1$, $SIMD_2$, $SIMD_3$) included in the SIMD block 401. That is, the 16-bit input word [z] is effectively repeated eight times to provide a 128-bit input Operand A [z, z, z, z, z, z, z, z], which is provided to each of the SIMD engines ($SIMD_0$, $SIMD_1$, $SIMD_2$, $SIMD_3$) in parallel.

Architecture 3A

In a third architecture for providing the input Operand A to the SIMD block 401 (Architecture 3A), each of the four SIMD engines ($SIMD_0$, $SIMD_1$, $SIMD_2$, $SIMD_3$) included in the SIMD block 401 receives a single input word from the operand A register file 411, wherein this single input word is repeated a number of times to match the input width of Operand A. However, different SIMD engines are provided with different input words. In one embodiment, the input words are assigned to the SIMD engines in a round-robin manner. Input distribution block 415 selects the single input word for each SIMD by specifying the index of each input word to be provided to each SIMD.

Figure 11:
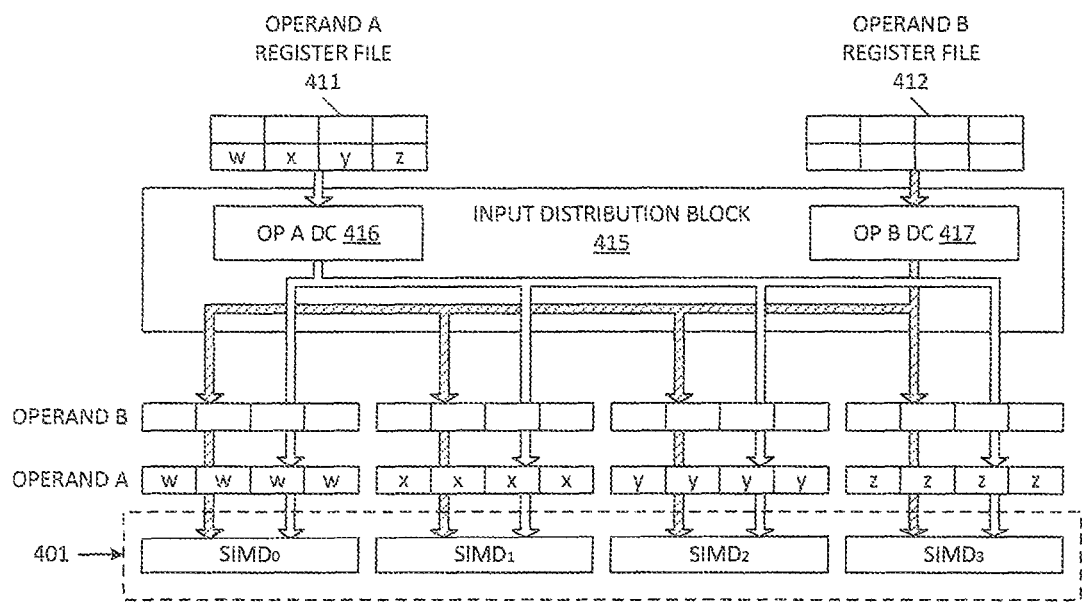
FIG. 11 is a block diagram illustrating an architecture (Architecture 3A) for routing a first operand value (Operand A) having four 32-bit operand words from an Operand A register file to a plurality of SIMD engines in accordance with one embodiment of the present invention.

FIG. 11 is a block diagram illustrating one embodiment of the third Operand A architecture (Architecture 3A), wherein four 32-bit input words [w, x, y, z] stored in Operand A register file 411 are received by (and buffered in) Operand A distribution circuit 416. State machine and scheduler 431 provides index values to Operand A distribution circuit 416, wherein these index values specify which of the input words [w, x, y, z] are to be provided to the SIMD engines. In the present example, the index values specify that the input words w, x, y and z are to be provided to $SIMD_0$, $SIMD_1$, $SIMD_2$ and $SIMD_3$, respectively. In response to the index values, Operand A distribution circuit 416 performs switching/demultiplexing operations, wherein: the 32-bit input word [w] is repeated four times to create a 128-bit Operand A value of [w, w, w, w], which is routed to $SIMD_0$; the 32-bit input word [x] is repeated four times to create a 128-bit Operand A value of [x, x, x, x], which is routed to $SIMD_1$; the 32-bit input word [y] is repeated four times to create a 128-bit Operand A value of [y, y, y, y], which is routed to $SIMD_2$; and the 32-bit input word [z] is repeated four times to create a 128-bit Operand A value of [z, z, z, z], which is routed to $SIMD_3$. In the foregoing manner, the four 32-bit entries [w, x, y, z] of the 128-bit register file word are distributed to the four SIMD engines in a round-robin manner (i.e., $SIMD_0$ is assigned w, $SIMD_1$ is assigned x, $SIMD_2$ is assigned y and $SIMD_3$ is assigned z).

Figure 12:
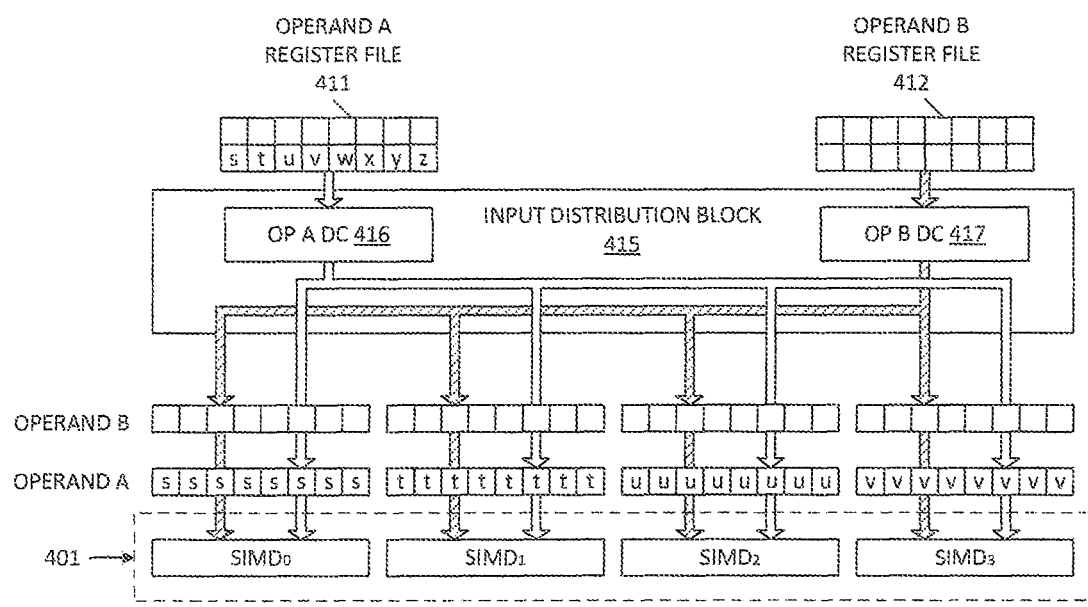
FIG. 12 and FIG. 13 are block diagrams illustrating an architecture (Architecture 3A) for routing a first operand value (Operand A) having eight 16-bit operand words from an Operand A register file to a plurality of SIMD engines in accordance with one embodiment of the present invention.

FIG. 12 is a block diagram illustrating another embodiment of the third Operand A architecture (Architecture 3A), wherein eight 16-bit input words [s, t, u, v, w, x, y, z] stored in Operand A register file 411 are received by (and buffered in) Operand A distribution circuit 416. State machine and scheduler 431 provides index values to Operand A distribution circuit 416, wherein these index values specify which of the input words [s, t, u, v, w, x, y, z] are to be provided to the SIMD engines. In the present example, the index values specify that the input words s, t, u and v are to be provided to $SIMD_0$, $SIMD_1$, $SIMD_2$ and $SIMD_3$, respectively. In response to the index values, Operand A distribution circuit 416 performs switching/demultiplexing operations, wherein: the 16-bit input word [s] is repeated eight times to create a 128-bit Operand A value of [s, s, s, s, s, s, s, s], which is routed to $SIMD_0$; the 16-bit input word [t] is repeated eight times to create a 128-bit Operand A value of [t, t, t, t, t, t, t, t], which is routed to $SIMD_1$; the 16-bit input word [u] is repeated eight times to create a 128-bit Operand A value of [u, u, u, u, u, u, u, u], which is routed to $SIMD_2$; and the 16-bit input word [v] is repeated eight times to create a 128-bit Operand A value of [v, v, v, v, v, v, v, v], which is routed to $SIMD_3$. In the foregoing manner, the four 16-bit entries [s, t, u, v] of the 128-bit register file word are distributed to the four SIMD engines in a round-robin manner.

Note that in the 16-bit input mode represented by FIG. 12, there are more entries (8) in the register file word than the number of SIMD engines (4). So, the same register file word can be used two times: once to distribute the first four entries to the four SIMD engines (shown in FIG. 12) and another time to distribute the last four entries to the four SIMD engines (shown in FIG. 13). In one embodiment, index values provided by state machine and scheduler 431 specify which four entries of the register file word are distributed to provide the input operand A.

Figure 13:
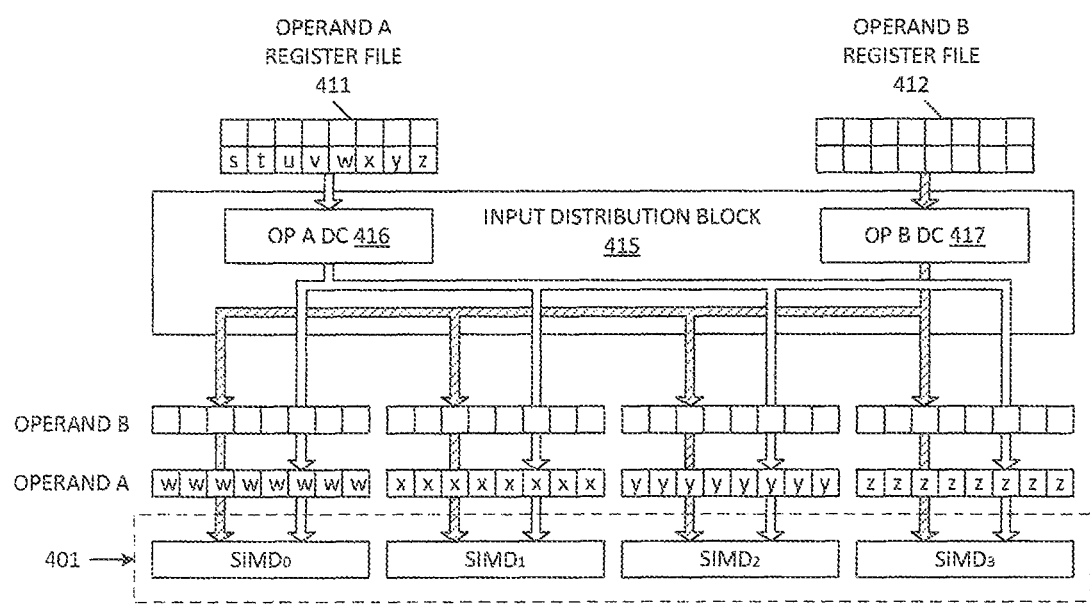

FIG. 13 is a block diagram illustrating the continuation of the distribution started by FIG. 12, wherein the 16-bit input word [w] is repeated eight times to create a 128-bit Operand A value of [w, w, w, w, w, w, w, w], which is routed to $SIMD_0$; the 16-bit input word [x] is repeated eight times to create a 128-bit Operand A value of [x, x, x, x, x, x, x, x], which is routed to $SIMD_1$; the 16-bit input word [y] is repeated eight times to create a 128-bit Operand A value of [y, y, y, y, y, y, y, y], which is routed to $SIMD_2$; and the 16-bit input word [z] is repeated eight times to create a 128-bit Operand A value of [z, z, z, z, z, z, z, z], which is routed to $SIMD_3$.

More details regarding the routing of input operand A in accordance with Architectures 1A, 2A and 3A are provided below in connection with FIG. 22.

Note that the preceding descriptions of Architectures 1A, 2A and 3A implement 32-bit input and 16-bit input modes. However, these embodiments are provided for illustration purpose only. The ideas are general and can be extended in a straightforward manner to other input modes (e.g., 8-bit input mode). Moreover, although the Architectures 1A, 2A and 3A have been described in connection with embodiments that include 4 SIMD engines and a 128-bit register file word, other numbers of SIMD engines and register file word widths can be used in other embodiments in a straightforward manner.

In actual hardware implementation, multiple architectures can be implemented together by sharing hardware resources. The hardware can be programmed to operate different architectures as modes that can be chosen by some register settings. For example, control registers 432 (FIG. 4) can store values that cause state machine and scheduler 431 implement Architecture 1A, Architecture 2A or Architecture 3A for Operand A in the manners described above. That is, the switching and demultiplexing logic implemented in the Operand A distribution circuit 416 can be driven by settings stored by control registers 432.

For example, in Architecture 2A, the index of the single value to be broadcast needs to be provided to the Operand A distribution circuit 416. The index can have different interpretations depending on whether the data is 8-bit, 16-bit or 32-bit wide (which could be specified by a control register setting).

Similarly, in Architecture 3A, the index of the value to be broadcast to $SIMD_0$ needs to be provided to the Operand A distribution circuit 416. From this index, the indices for the values to be broadcast to the other SIMD engines ($SIMD_1$, $SIMD_2$ and $SIMD_3$) can be inferred by the hardware by incrementing. Or all the four indices can be provided to the Operand A distribution circuit 416.

The data stored in the buffers of the Operand A distribution circuit 416 can be reused over multiple cycles so that the register file words do not need to be read every cycle from the Operand A register file 411. Separate control logic can supply a flag specifying which cycles need to load the data from the Operand A register file 411. Additionally, the Operand A distribution circuit 416 can contain multiple buffers to hold the register file word data with control logic specifying the buffer indices to use for writing and reading. In one embodiment, the Operand A distribution circuit 416 contains two buffers: one for writing and one for reading, which are used in a ping-pong manner. The state machine and scheduler 431 automatically manages the read and write indices. This scheme is generally known as double buffering. In such cases, no additional control logic is needed to specify buffer indices for read and write.

Architectures for Operand B

In accordance other embodiments, multiple architectures are used to provide the input Operand B to the SIMD block 401. As described below, Operand B distribution circuit 417 can be configured in four different architectures (Architecture 1B, Architecture 2B, Architecture 3B and Architecture 4B) to provide the input Operand B to SIMD block 401.

Architecture 1B

In a first architecture for providing Operand B to the SIMD block 401 (Architecture 1B), each of the four SIMD engines ($SIMD_0$, $SIMD_1$, $SIMD_2$, $SIMD_3$) included in the SIMD block 401 receives a full register file word (which includes four 32-bit word values a, b, c and d) as the input Operand B. Note that Architecture 1B for providing Operand B to the SIMD block 401 is similar to Architecture 1A for providing Operand A to the SIMD block 401.

Figure 14:
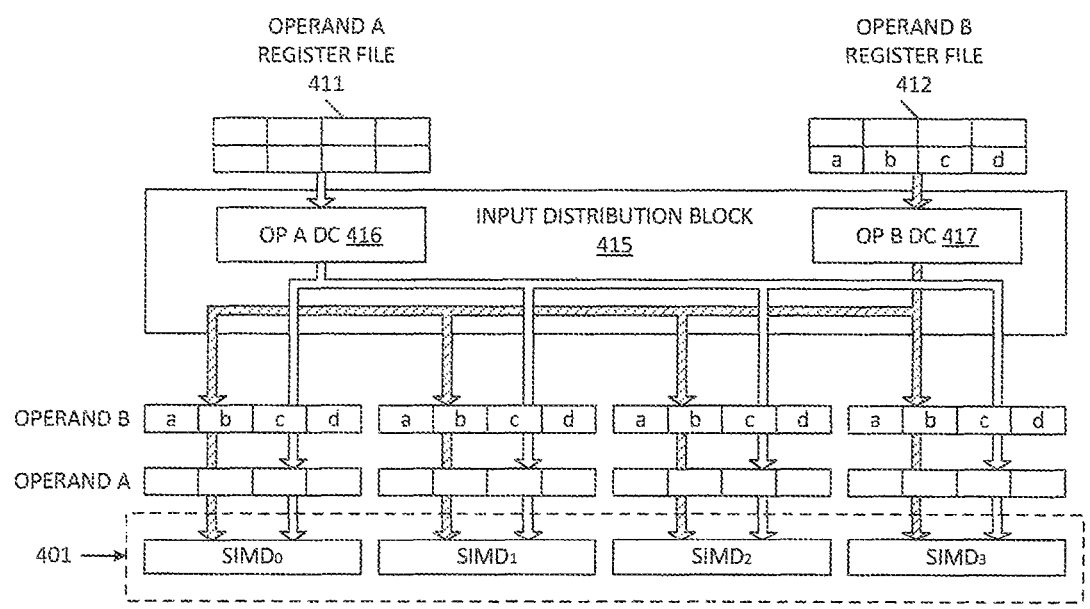
FIG. 14 is a block diagram illustrating an architecture (Architecture 1B) for routing a second operand value (Operand B) having four 32-bit operand words from an Operand B register file to a plurality of SIMD engines in accordance with one embodiment of the present invention.

FIG. 14 is a block diagram illustrating one embodiment of the first Operand B architecture (Architecture 1B), wherein four 32-bit input words [a, b, c, d] stored in Operand B register file 412 are routed to Operand B distribution circuit 417. In one embodiment, Operand B distribution circuit 417 includes a buffer that stores the received input words [a, b, c, d]. Operand B distribution circuit 417 also includes circuitry for performing a switching/demultiplexing function, wherein the buffered input words [a, b, c, d] are routed in parallel to each of the four SIMD engines ($SIMD_0$, $SIMD_1$, $SIMD_2$, $SIMD_3$) included in the SIMD block 401. Thus, in Architecture 1B, each of the SIMD engines ($SIMD_0$, $SIMD_1$, $SIMD_2$, $SIMD_3$) receives the full register file word [a, b, c, d] as input Operand B.

Figure 15:
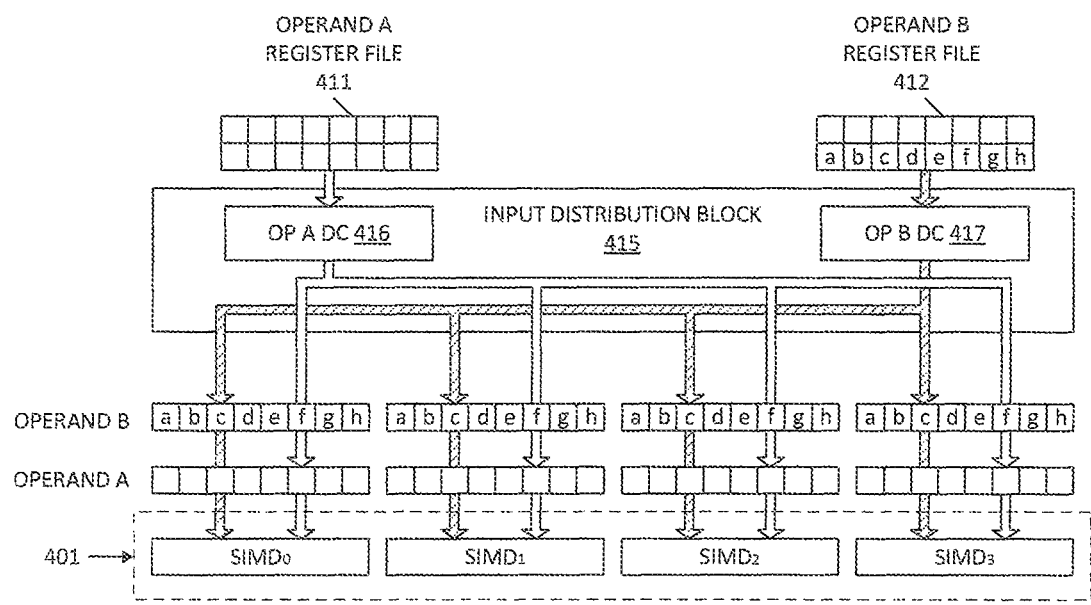
FIG. 15 is a block diagram illustrating an architecture (Architecture 1B) for routing a second operand value (Operand B) having eight 16-bit operand words from an Operand B register file to a plurality of SIMD engines in accordance with one embodiment of the present invention.

FIG. 15 is a block diagram illustrating another embodiment of the first Operand B architecture (Architecture 1B), wherein eight 16-bit input words [a, b, c, d, e, f, g, h] stored in Operand B register file 412 are routed to Operand B distribution circuit 417. These input words [a, b, c, d, e, f, g, h] are buffered within Operand B distribution circuit 417, and are then routed in parallel to each of the four SIMD engines ($SIMD_0$, $SIMD_1$, $SIMD_2$, $SIMD_3$) included in the SIMD block 401. Again, in Architecture 1B, each of the SIMD engines ($SIMD_0$, $SIMD_1$, $SIMD_2$, $SIMD_3$) receives the full register file word [a, b, c, d, e, f, g, h] as input Operand B.

Architecture 2B

In the architectures considered so far (for Operand A as well as for Operand B), all the SIMD engines use data from a single register file word at a given time. This can make the architectures rigid in terms of the type of operations they can support. In accordance with one embodiment, different SIMD engines are provided with different register file words from the operand register files.

One method to achieve this would be to allow multiple reads to the register file simultaneously. While this is possible, the hardware complexity can be prohibitive.

In one embodiment, multiple entries (not necessarily distinct) can be read simultaneously from Operand B register file 412. The most general way to implement this is to use a multi-read-port memory to implement this register file 412. A memory with four read ports can be used to simultaneously read four entries from the Operand B register file 412. However, such a memory configuration has a high hardware complexity (occupies a relatively large area and consumes a relatively high power). Thus, preferred embodiments of the present invention include low complexity methods and structures for supplying the different SIMD engines with (possibly) different input Operand B values. While these preferred embodiments may not provide as much generality as the broad (multiple read port) method, they are efficient for the purposes of the algorithms to be implemented.

In accordance with one embodiment, a second architecture (Architecture 2B) for providing input Operand B to the SIMD engines is provided, wherein a small number of entries from the Operand B register file 412 are buffered in the Operand B distribution circuit 417 and then distributed to the SIMD engines of SIMD block 401. Intuitively, this can be thought of as an approach that gives some flexibility for each SIMD by allowing them to address any entry from a small number of entries. This keeps hardware complexity small.

The main characteristics of the second architecture (Architecture 2B) for providing the input Operand B to the SIMD block 401 can be defined as follows. The Operand B distribution circuit 417 includes a plurality of Operand B buffers to hold values read from the Operand B register file 412. Each of these Operand B buffers can hold one full register file word. Each SIMD can receive the register file word stored in any one of the Operand B buffers. A buffer select mechanism is used to specify which of the Operand B buffers is coupled to each of the SIMD engines. The Operand B buffers are filled one at a time from the Operand B register file 412. When a new register file word needs to be loaded into the Operand B buffers from Operand B register file 412, one of the previous Operand B buffers is overwritten. There can be multiple schemes to determine which Operand B buffer needs to be overwritten. One simple scheme is that the Operand B buffer with oldest data is overwritten (i.e., the Operand B buffers are used in a round-robin fashion). In another scheme, control logic 430 can specify which Operand B buffer needs to be overwritten.

It is not necessary to load the data from the Operand B register file 412 into the operand B buffers during every cycle. Separate control logic 430 can specify a flag for every cycle to indicate if new data needs to be read from the Operand B register file 412 into the Operand B buffers of Operand B distribution circuit 417. In the actual hardware implementation, each Operand B buffer may use a double buffering scheme so that read and write operations to an Operand B buffer do not occur in the same cycle.

Figure 16:
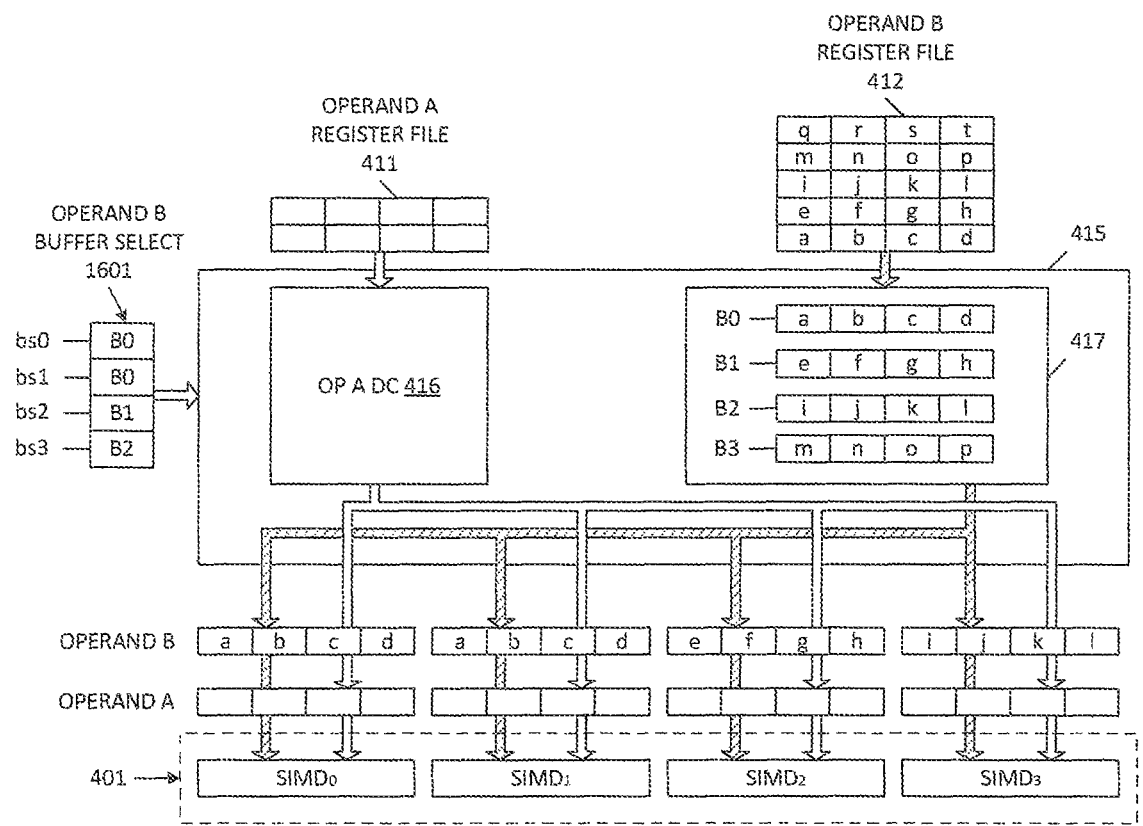
FIG. 16 is a block diagram illustrating an architecture (Architecture 2B) for routing a second operand value (Operand B) having four 32-bit operand words from an Operand B register file and a plurality of Operand B buffers to a plurality of SIMD engines in accordance with one embodiment of the present invention.

FIG. 16 is a block diagram of the second architecture (Architecture 2B) for providing input Operand B to the SIMD engines in accordance with one embodiment. In the illustrated example, Operand B distribution logic 417 includes four Operand B buffers B0-B3, each of which is capable of storing a full register word from Operand B register file 412. Although four Operand B buffers are shown, it is understood that the number of operand buffers can be any number greater than one. In the illustrated example, Operand B buffers B0-B3 store register file words received from operand B register file 412. More specifically, Operand B buffers B0, B1, B2 and B3 store values [a, b, c, d], [e, f, g, h], [i, j, k, l] and [m, n, o, p], respectively (wherein each of the values a-p is a 32-bit word).

Operand B buffer select logic 1601 (which may be included in the state machine and scheduler 431 of control logic 430) is used to determine the manner in which the contents of Operand B buffers B0, B1, B2 and B3 are provided to $SIMD_0$, $SIMD_1$, $SIMD_2$ and $SIMD_3$. In one embodiment, Operand B buffer select logic 1601 includes four buffer select entries bs0, bs1, bs2 and bs3, which store values that specify which of the Operand B buffers B0-B3 provide their contents to $SIMD_0$, $SIMD_1$, $SIMD_2$ and $SIMD_3$, respectively. In the illustrated example, the four entries bs0, bs1, bs2 and bs3 specify operand B buffers B0, B0, B1 and B2, respectively, indicating that the contents of operand B buffer BC (i.e., [a, b, c, d]) are provided to $SIMD_0$ and $SIMD_1$, the contents of operand B buffer B1 (i.e., [e, f, g, h]) are provided to $SIMD_2$, and the contents of operand B buffer B2 (i.e., [i, j, k, l]) are provided to $SIMD_3$. In subsequent cycles, the buffer selection may change by changing the buffer select entries bs0, bs1, bs2 and bs3. It is noted that if the number of operand buffers is reduced to 1, then Architecture 2B would be equivalent to Architecture 1B.

Architecture 3B

Another approach to effectively allow for multiple reads from the operand B register file 412 is to implement the operand B register file 412 using a plurality of register files, each of which allows a single read operation to be performed at a time. As noted before, having one large memory with 4 read ports can be more expensive than four smaller memories with one read port each. However, it is worth noting that the larger memory with 4 read ports offers more flexibility in terms of the data that can be read. When four smaller memories with single read port are used, four entries can be read at a given time, but each of the entries has to belong to a different memory. This is not the case with a 4 read-port memory that allows any 4 entries to be read simultaneously.

The main characteristics of the third architecture (Architecture 3B) for providing the input Operand B to the SIMD block 401 can be defined as follows. There is more than one Register File for Operand B. In one specific case, the number of Register Files for Operand B is equal to the number of SIMD engines included in SIMD block 401. Thus, if there are four SIMD engines, then there will be four corresponding Operand B register files. However, other cases are possible and it is easy to extend the architecture to those cases.

The multiple Operand B Register Files can be read simultaneously. In a simple case, each SIMD receives its input Operand B directly from one of the Operand B register files. If the number of SIMD engines is equal to the number of operand B register files, then each of the SIMD engines can receive an input Operand B from a corresponding one of the Operand B register files.

In the general case, the Operand B distribution circuit 417 can contain operand buffers (similar to Architecture 2B) to hold the data read from the Operand B register files. This can allow multiple cycles to use same data. Also, the Operand B register files need not be read every cycle due to reuse of the buffered data. A load flag can specify the cycles in which data needs to be read from the Operand B register files to the Operand B distribution circuit 417. A separate block can also specify the address of the buffer to load for every SIMD, as described above in connection with Architecture 2B.

Figure 17:
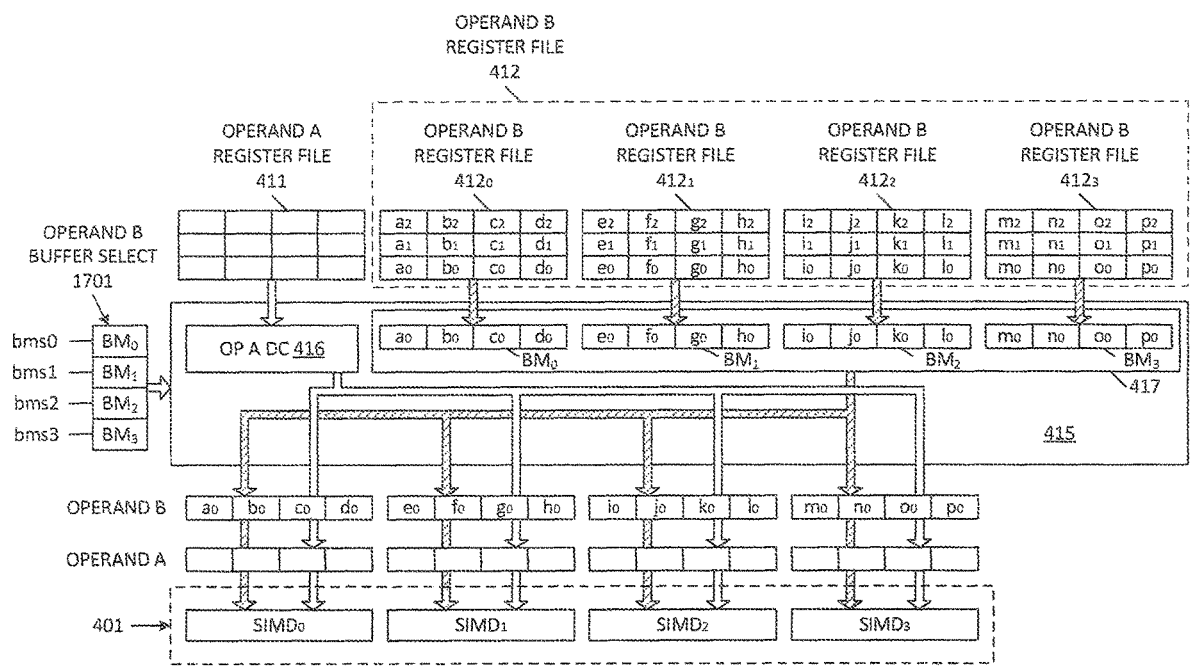
FIG. 17 is a block diagram illustrating an architecture (Architecture 3B) for routing a second operand value (Operand B) having four 32-bit operand words from a plurality of parallel Operand B register files and a plurality of Operand B buffers to a plurality of SIMD engines in accordance with one embodiment of the present invention.

FIG. 17 is a block diagram of the third architecture (Architecture 3B) for providing the input Operand B to the SIMD block 401 in accordance with one embodiment. In the illustrated example, four Operand B register files $412_0$, $412_1$, $412_2$ and $413_3$ provide four corresponding Operand B register words (e.g., [a0, b0, c0, d0] [e0, f0, g0, h0] [i0, j0, k0, l0] and [m0, n0, o0, p0]) to Operand B distribution circuit 417. In the illustrated example, the Operand B distribution circuit 417 routes the register file words provided by operand B register files $412_0$, $412_1$, $412_2$ and $413_3$ to buffer memories $BM_0$, $BM_1$, $BM_2$ and $BM_3$, respectively, within Operand B distribution circuit 417.

Operand B buffer select logic 1701 (which may be included in the state machine and scheduler 431 of control logic 430) is used to determine the manner in which the contents of Operand B buffers $BM_0$, $BM_1$, $BM_2$ and $BM_3$ are provided to $SIMD_0$, $SIMD_1$, $SIMD_2$ and $SIMD_3$. In one embodiment, Operand B buffer select logic 1701 includes four buffer select entries bms0, bms1, bms2 and bms3, which store values that specify which of the Operand B buffers $BM_0$-$BM_3$ provide their contents to $SIMD_0$, $SIMD_1$, $SIMD_2$ and $SIMD_3$, respectively. In the illustrated example, the four entries bms0, bms1, bms2 and bms3 specify operand B buffers $BM_0$, $BM_1$, $BM_2$ and $BM_3$, respectively, indicating that the contents of operand B buffer $BM_0$ (i.e., [a0, b0, c0, d0]) are provided to $SIMD_0$, the contents of operand B buffer $BM_1$ (i.e., [e0, f0, g0, h0]) are provided to $SIMD_1$, the contents of operand B buffer $BM_2$ (i.e., [i0, j0, k0, l0]) are provided to $SIMD_2$, and the contents of operand B buffer $BM_3$ (i.e., [m0, n0, o0, p0]) are provided to $SIMD_3$. In subsequent cycles, the buffer selection may change by changing the buffer memory select entries bms0, bms1, bms2 and bms3.

Figure 18:
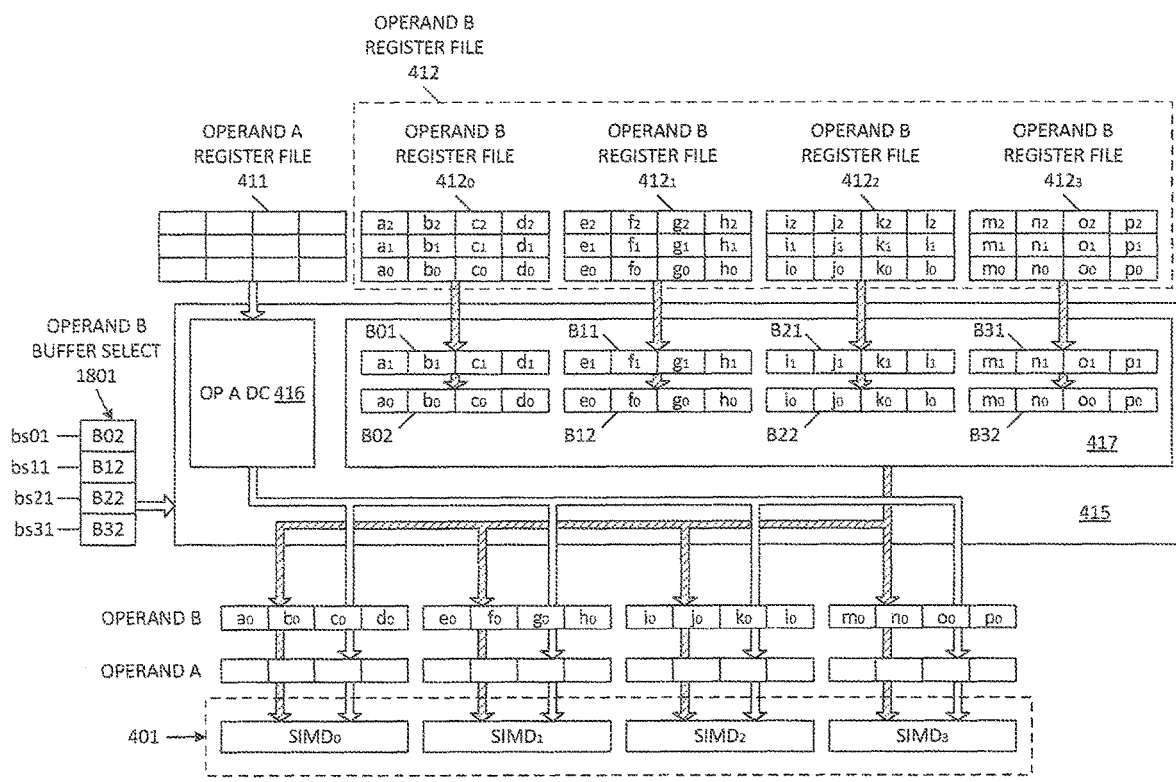
FIG. 18 is a block diagram illustrating an architecture (Architecture 3B) for routing a second operand value (Operand B) having four 32-bit operand words from a plurality of parallel Operand B register files and a plurality of Operand B double buffers to a plurality of SIMD engines in accordance with one embodiment of the present invention.

FIG. 18 is a block diagram of the third architecture (Architecture 3B) for providing input Operand B to the SIMD block 401 in accordance with an alternate embodiment. In the embodiment of FIG. 18, Operand B distribution circuit 417 includes double Operand B buffers B01-B02, B11-B12, B21-B22 and B31-B32, which store data provided by the Operand B register files $412_0$, $412_1$, $412_2$ and $413_3$, respectively. In the illustrated example, Operand B register file words [a0, b0, c0, d0] and [a1, b1, c1, d1] from operand B register file $412_0$ are stored in Operand B buffers B02 and B01, respectively. Operand B register file words [e0, f0, g0, h0] and [e1, f1, g1, h1] from operand B register file $412_1$ are stored in Operand B buffers B12 and B11, respectively. Operand B register file words [i0, j0, k0, l0] and [i1, j1, k1, l1] from operand B register file $412_2$ are stored in Operand B buffers B22 and B21, respectively. Operand B register file words [m0, n0, o0, p0] and [m1, n1, o1, p1] from operand B register file $412_3$ are stored in Operand B buffers B32 and B31, respectively.

Operand B buffer select logic 1801 (which may be included in the state machine and scheduler 431 of control logic 430) is used to determine the manner in which the contents of Operand B buffers B01-B02, B11-B12, B21-B22 and B31-B32 are provided to $SIMD_0$, $SIMD_1$, $SIMD_2$ and $SIMD_3$. In one embodiment, Operand B buffer select logic 1801 includes four buffer select entries bs01, bs11, bs21 and bs31, which store values that specify which of the Operand B buffers B01-B02, B11-B12, B21-B22 and B31-B32 provide their contents to $SIMD_0$, $SIMD_1$, $SIMD_2$ and $SIMD_3$, respectively. In the illustrated example, the four entries bs01, bs11, bs21 and bs31 specify operand B buffers B02, B12, B22 and B32, respectively, indicating that the contents of Operand B buffer B02 (i.e., [a0, b0, c0, d0]) are provided to $SIMD_0$, the contents of Operand B buffer B12 (i.e., [e0, f0, g0, h0]) are provided to $SIMD_1$, the contents of Operand B buffer B22 (i.e., [i0, j0, k0, l0]) are provided to $SIMD_2$, and the contents of Operand B buffer B32 (i.e., [m0, n0, o0, p0]) are provided to $SIMD_3$. In one embodiment, Operand B distribution circuit 417 includes switching/demultiplexing circuitry that performs the above-described routing in response to the buffer select entries bs01, bs11, bs21 and bs31. Note that Operand B buffer select logic 1801 can select any of the operand buffers B01-B02, B11-B12, B21-B22 and B31-B32 to provide input Operand B to any of the SIMD engines. For example, buffer select entry bs01 may store a value (B31) that causes the contents of Operand B buffer B31 (i.e., [m1, n1, o1, p1] to be routed to $SIMD_0$. In subsequent cycles, the buffer selection may change by changing the buffer select entries bs01, bs11, bs21 and bs31. Note that in other embodiments, different numbers of Operand B buffers can be included in Operand B distribution circuit 417.

Architecture 4B

In a fourth architecture for providing Operand B to the SIMD block 401 (Architecture 4B), an architecture similar to Architecture 3B is provided, with the added feature that each Operand B register file allows reading two entries at a time and choosing one register file word worth of data by applying some shifting operations. Control logic 340 specifies the addresses of two rows to be read from each Operand B register file, as well as the amount of shift to be applied to the entries read from these two rows. This functionality is typically realized in hardware by implementing each Operand B register file memory as two banks of memory. This allows reading two entries at the same time. The two register file words are then fed into a shifting logic module that receives an amount of shift as an input parameter and outputs one register file word worth of data. The addresses for the two banks and the amount of shift are supplied by state machine and scheduler 431.

Figure 19:
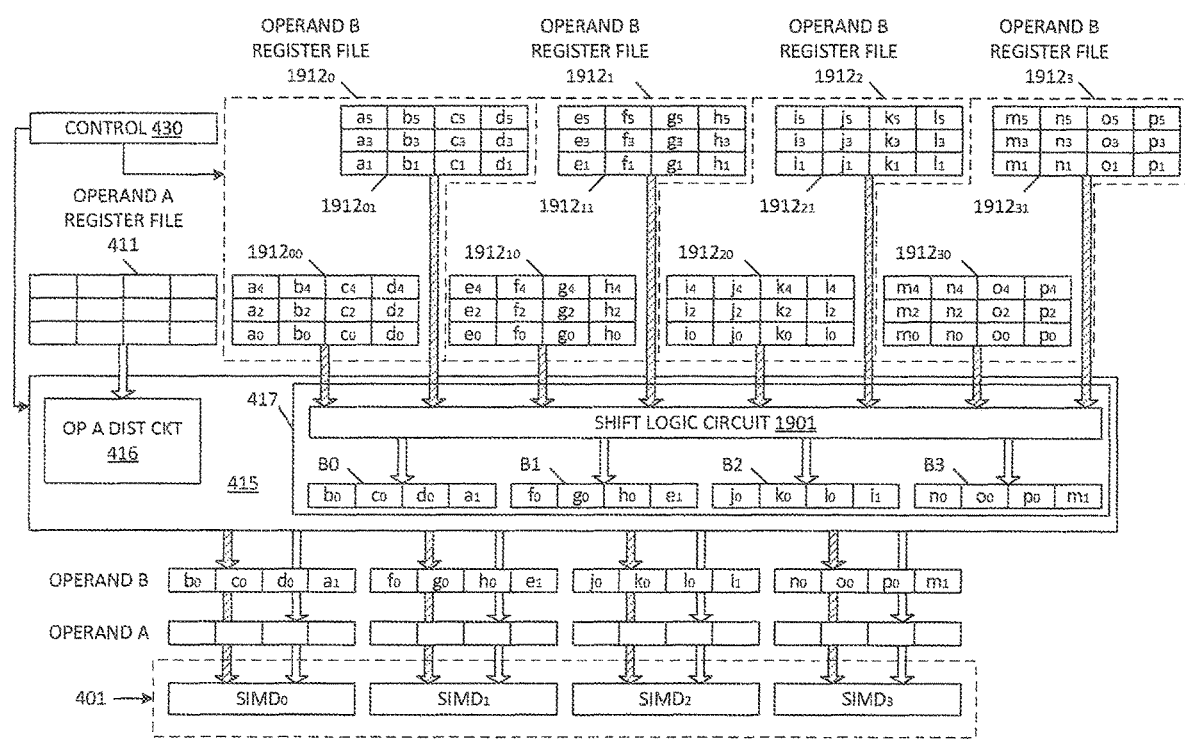
FIG. 19 is a block diagram illustrating an architecture (Architecture 4B) for routing a second operand value (Operand B) having four 32-bit operand words from a plurality of parallel Operand B register files, a shift logic circuit and a plurality of Operand B buffers to a plurality of SIMD engines in accordance with one embodiment of the present invention.

FIG. 19 is a block diagram of the fourth architecture (Architecture 4B) for providing input Operand B to the SIMD block 401 in accordance with one embodiment. In the illustrated embodiment, there are four Operand B register files $1912_0$-$1912_3$, wherein each of these Operand B register files includes two memory banks. Thus, Operand B register files $1912_0$, $1912_1$, $1912_2$, and $1912_3$ include memory banks $1912_{00}$-$1912_{01}$, $1912_{10}$-$1912_{11}$, $1912_{20}$-$1912_{21}$ and $1912_{30}$-$1912_{31}$, respectively. Each of the memory bank pairs $1912_{00}$-$1912_{01}$, $1912_{10}$-$1912_{11}$, $1912_{20}$-$1912_{21}$ and $1912_{30}$-$1912_{31}$ store different register file words. In the illustrated example, memory bank $1912_{00}$ stores register file words [a0, b0, c0, d0], [a2, b2, c2, d2] and [a4, b4, c4, d4] and memory bank $1912_{01}$ stores register file words [a1, b1, c1, d1], [a3, b3, c3, d3] and [a5, b5, c5, d5].

Memory bank $1912_{10}$ stores register file words [e0, f0, g0, h0], [e2, f2, g2, h2] and [e4, f4, g4, h4] and memory bank $1912_{11}$ stores register file words [e1, f1, g1, h1], [e3, f3, g3, h3] and [e5, f5, g5, h5].

Memory bank $1912_{20}$, stores register file words [i0, j0, k0, l0], [i2, j2, k2, l2] and [i4, j4, k4, l4] and memory bank $1912_{21}$ stores register file words [i1, j1, k1, l1], [i3, j3, k3, l3] and [i5, j5, k5, l5].

Memory bank $1912_{30}$, stores register file words [m0, n0, o0, p0], [m2, n2, o2, p2] and [m4, n4, o4, p4] and memory bank $1912_{31}$ stores register file words [m1, n1, o1, p1], [m3, n3, o3, p3] and [m5, n5, o5, p5].

Register file words read from the memory bank pairs $1912_{00}$-$1912_{01}$, $1912_{10}$-$1912_{11}$, $1912_{20}$-$1912_{21}$ and $1912_{30}$-$1912_{31}$ are provided to shift logic circuit 1901 in Operand B distribution circuit 417. Outputs of shift logic circuit 1901 are provided to Operand B buffers B0, B1, B2 and B3 in Operand B distribution circuit 417.

Control logic 430 (and more specifically, state machine and scheduler 431) controls the register file words read from memory banks $1912_{00}$-$1912_{01}$, $1912_{10}$-$1912_{11}$, $1912_{20}$-

$1912_{21}$ and $1912_{30}$-$1912_{31}$. In general, control logic 430 causes register file words to be simultaneously read from the memory banks $1912_{00}$-$1912_{01}$, $1912_{10}$-$1912_{11}$, $1912_{20}$-$1912_{21}$ and $1912_{30}$-$1912_{31}$. The addresses provided to each of the memory bank pairs may selected such that two different consecutive register file words are read from each of the memory banks, thereby providing the register file words necessary to perform a shifting operation. For example, register file words [a0, b0, c0, d0] and [a1, b1, c1, d1] may be simultaneously read from memory banks $1912_{00}$ and $1912_{01}$, respectively; register file words [e0, f0, g0, h0] and [e1, f1, g1, h1] may be simultaneously read from memory banks $1912_{10}$ and $1912_{11}$, respectively; register file words [i0, j0, k0, l0] and [i1, j1, k1, l1] may be simultaneously read from memory banks $1912_{20}$ and $1912_{21}$, respectively; and register file words [m0, n0, o0, p0] and [m1, n1, o1, p1] may be simultaneously read from memory banks $1912_{30}$ and $1912_{31}$, respectively. The shift logic circuit 1901 receives the eight register file words provided by Operand B register files $1912_0$-$1912_3$.

Control logic 340 also controls the amount of shift introduced by shift logic circuit 1901. In general, Table 1 below defines the values provided by shift logic circuit 1901 to operand buffers B0-B3 in the present example, for various shift values. Note that each shift value introduces an additional 32-bit shift to the received pairs of register file words. FIG. 19 illustrates the results for a shift value of 1.

TABLE 1

| Shift | B0 | B1 | B2 | B3 |
| --- | --- | --- | --- | --- |
| 0 | [a0 b0 c0 d0] | [e0 f0 g0 h0] | [i0 j0 k0 l0] | [m0 n0 o0 p0] |
| 1 | [b0 c0 d0 a1] | [f0 g0 h0 e1] | [j0 k0 l0 i1] | [n0 o0 p0 m1] |
| 2 | [c0 d0 a1 b1] | [g0 h0 e1 f1] | [k0 l0 i1 j1] | [o0 p0 m1 n1] |
| 3 | [d0 a1 b1 c1] | [h0 e1 f1 g1] | [l0 i1 j1 k1] | [p0 m1 n1 o1] |
| 4 | [a1 b1 c1 d1] | [e1 f1 g1 h1] | [i1 j1 k1 l1] | [m1 n1 o1 p1] |

The contents of operand B buffers B0, B1, B2 and B3 are routed to $SIMD_0$, $SIMD_1$, $SIMD_2$ and $SIMD_3$, respectively, as input operand B. In the foregoing manner, shifting may be efficiently performed within the register file words stored by Operand B register files $1912_0$-$1912_3$.

Again, in actual hardware implementation, multiple architectures can be implemented together by sharing hardware resources. The hardware can be programmed to operate different architectures as modes that can be chosen by a register.

More details regarding the routing of input Operand B in accordance with Architectures 1B, 2B, 3B and 4B are provided below in connection with FIG. 22.

Although the preceding descriptions of Architectures 1B, 2B, 3B and 4B implement 32-bit input and 16-bit input modes, it is understood that these architectures can easily be modified to implement input modes of other widths (e.g., 8-bit input mode). Moreover, although the Architectures 1B, 2B, 3B and 4B have been described in connection with embodiments that include 4 SIMD engines and a 128-bit register file word, other numbers of SIMD engines and register file word widths can be used in other embodiments in a straightforward manner.

In actual hardware implementation, multiple architectures can be implemented together by sharing hardware resources. The hardware can be programmed to operate different architectures as modes that can be chosen by some register settings. For example, control registers 432 (FIG. 4) can store values that configure Operand B distribution circuit 415 to implement Architecture 1B, 2B, 3B or 4B for Operand B in the manners described above.

Output Circuitry

Output circuit 420 (FIG. 4) is used for storing (and specifying addresses for) the outputs of the SIMD engines ($SIMD_0$, $SIMD_1$, $SIMD_2$ and $SIMD_3$). Each SIMD can write the output of an operation performed within the SIMD to certain number of output registers within output circuit 420.

Figure 20:
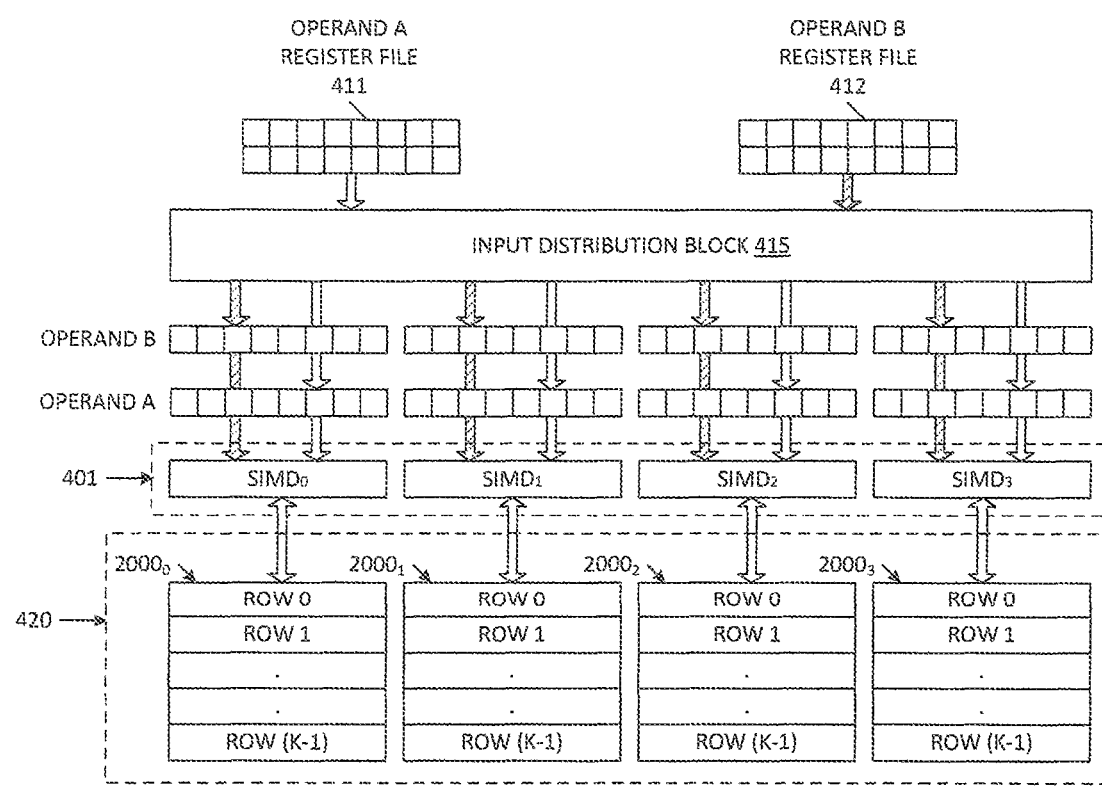
FIG. 20 is a block diagram of a computer system that includes a SIMD block having four parallel SIMD engines and an output circuit having four parallel output register sets in accordance with one embodiment of the present invention.

FIG. 20 is a block diagram that shows each of the SIMD engines ($SIMD_0$, $SIMD_1$, $SIMD_2$ and $SIMD_3$) coupled to corresponding memory banks $2000_0$-$2000_3$, wherein each memory bank includes k rows, with each row forming an output register. In the case of accumulation operations, the control logic 340 specifies a row address within each of the memory banks $2000_0$-$2000_3$, such that previously stored accumulation values are read from the addressed output registers of the memory banks $2000_0$-$2000_3$, and are provided to the corresponding SIMD engines, $SIMD_0$-$SIMD_3$. In response, the SIMD engines ($SIMD_0$-$SIMD_3$) perform multiply-accumulate operations to generate updated accumulation values, which are then written back to the addressed output registers within the corresponding memory banks $2000_0$-$2000_3$.

As described in more detail below, the row addresses of the output registers associated with each SIMD can be thought of as input signals to the SIMD engines. The row address is the index of the row within the SIMD (referred to as relative index within the SIMD).

Figure 21:
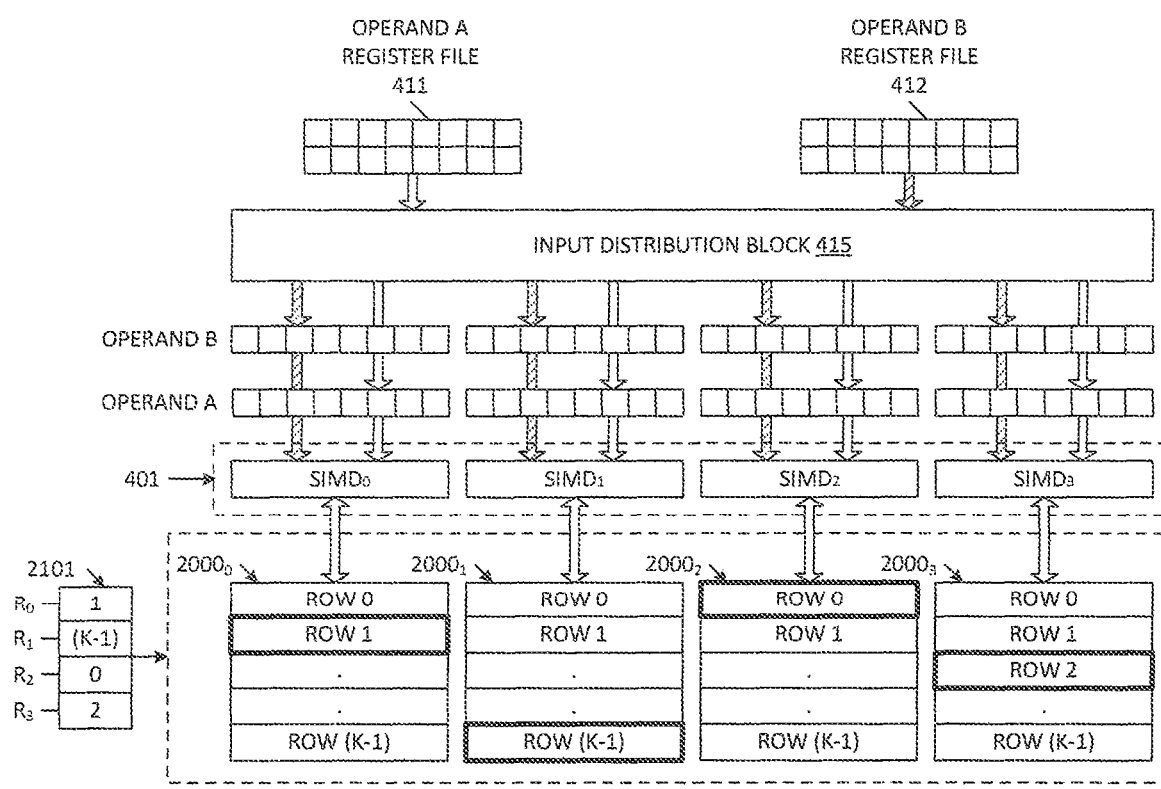
FIG. 21 is a block diagram of the computer system of FIG. 20, which illustrates the addressing of the four parallel output register sets in accordance with one embodiment of the present invention.

FIG. 21 is a block diagram that shows register select logic 2101 used to determine the manner in which the contents of output register sets $2000_0$, $2000_1$, $2000_2$ and $2000_3$ are provided to SIMD engines $SIMD_0$, $SIMD_1$, $SIMD_2$ and $SIMD_3$, respectively. Register select logic 2101 is implemented within state machine and scheduler 431 of control logic 430. In one embodiment, register select logic 2101 includes four register select entries R0, R1, R2 and R3, which store row address values that specify which of the output registers within output register sets $2000_0$, $2000_1$, $2000_2$ and $2000_3$ provide their contents to $SIMD_0$, $SIMD_1$, $SIMD_2$ and $SIMD_3$, respectively (or store values received from $SIMD_0$, $SIMD_1$, $SIMD_2$ and $SIMD_3$, respectively). In the illustrated example, the four register select entries R0, R1, R2 and R3 specify the output registers in Row 1, Row(K−1), Row 0 and Row 2 of output register sets $2000_0$, $2000_1$, $2000_2$ and $2000_3$, respectively (indicating that the contents of these output registers are provided to $SIMD_0$, $SIMD_1$, $SIMD_2$ and $SIMD_3$, respectively). Note that the selected output registers are highlighted in FIG. 21. In subsequent cycles, the register selection may change by changing the register select entries R0, R1, R2 and R3.

A Unified Architecture

Figure 22:
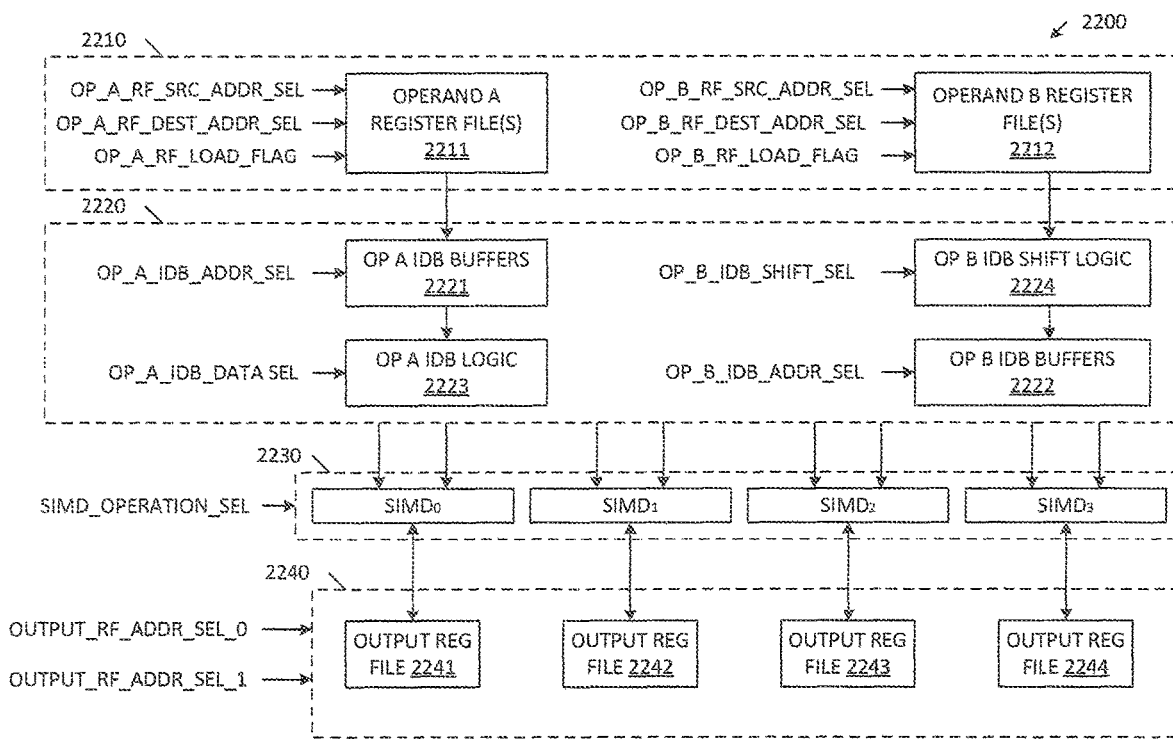
FIG. 22 is a block diagram of a hardware system that unifies the various architectures and features for different operands and outputs specified by FIGS. 4-21 in accordance with one embodiment of the present invention.

FIG. 22 is a block diagram of a hardware system 2200 that unifies the various architectures and features proposed above for the different operands and outputs. The system 2200 includes (1) an operand block 2210 that includes one or more register files for storing each of the operands (Operand A and Operand B), (2) an input distribution block (IDB) 2220 that includes one or more buffers for each of the operands and a logic block for each of the operands, (3) a SIMD block 2230 that includes one or more SIMD engines, and (4) an output block 2240 that includes one or more output register files for each of the SIMD engines. In the illustrated system 2200, operand block 2210 includes operand A register file(s) 2211 and operand B register file(s) 2212, which may be used to implement the various embodiments of Operand A register file 411 and Operand B register file 412 described above. Input distribution block (IDB)

2220 includes Operand A IDB buffers 2221 and Operand A IDB logic 2223, which may be used to implement the various embodiments of Operand A distribution circuit 416 described above. Input distribution block 2220 also includes Operand B IDB buffers 2222 and Operand B IDB shift logic 2224, which may be used to implement the various embodiments of Operand B distribution circuit 417 described above. SIMD block 2240, which may be used to implement the various embodiments of SIMD block 401 described above, includes $SIMD_0$, $SIMD_1$, $SIMD_2$ and $SIMD_3$. Output block 2240, which may be used to implement the various embodiments of output circuit 420 described above, includes output register files 2241, 2242, 2243 and 2244, which are coupled to $SIMD_0$, $SIMD_1$, $SIMD_2$ and $SIMD_3$, respectively.

The operand block 2210 is responsible for holding the operand data. The data from operand register files 2211 and 2212 is transferred to the input distribution block 2220 based on control signals that are explained below. In one embodiment of the unified architecture of system 2200, Operand A register file 2211 includes one register file, and Operand B register files 2212 include four register files. Further, the four register files for Operand B allow two simultaneous reads (i.e., the memory is split into two banks). While the general system can contain arbitrary number of register files for each of the operands, the optimal hardware should be designed such that it uses the least number of register files but supports all required operations.

In the illustrated, three control signals, OP_A_RF_SRC_ADDR_SEL, OP_A_RF_DEST_ADDR_SEL and OP_A_RF_LOAD_FLAG, are used to control the operation of Operand A register files 2211. Similarly, three control signals, OP_B_RF_SRC_ADDR_SEL, OP_B_RF_DEST_ADDR_SEL and OP_B_RF_LOAD_FLAG, are used to control the operation of Operand B register files 2212.

The OP_A_RF_LOAD_FLAG and OP_B_RF_LOAD_FLAG signals specify if data needs to be transferred from the Operand A register files 2211 and the Operand B register files 2212, respectively, to the Operand A IDB buffers 2221 and Operand B IDB buffers 2222, respectively. If the OP_A_RF_LOAD_FLAG signal has a value of 1, then the two associated control signals (OP_A_RF_SRC_ADDR_SEL and OP_A_RF_DEST_ADDR_SEL) specify the source and destination addresses for the Operand A data. Similarly, if the OP_B_RF_LOAD_FLAG signal has a value of 1, then the two associated control signals (OP_B_RF_SRC_ADDR_SEL and OP_B_RF_DEST_ADDR_SEL) specify the source and destination addresses for the Operand B data. Note that not all embodiments will require destination addresses for the Operand A and Operand B data (i.e., if there is only one possible destination for the Operand A or Operand B data). If the OP_A_RF_LOAD_FLAG signal or the OP_B_RF_LOAD_FLAG signal has a value of 0, no data is read or transferred from the corresponding Operand A register files 2211 or the Operand B register files 2212. The OP_A_RF_LOAD_FLAG signal and the OP_B_RF_LOAD_FLAG signal can be generated by state machine and scheduler 431 of control logic 430.

The OP_A_RF_SRC_ADDR_SEL signal specifies the row address in the Operand A register file(s) 2211 to be read. In the modes of operation described above, the OP_A_RF_SRC_ADDR_SEL signal will include just one address, which specifies Operand A register file to be read. The OP_B_RF_SRC_ADDR_SEL signal specifies the row address(es) in the Operand B register file(s) 2212 to be read. Depending on the mode of the operation, the OP_B_RF_SRC_ADDR_SEL signal can be just one address (Architecture 1B or 2B) or four addresses (Architecture 3B) or 8 addresses (Architecture 4B). The hardware has appropriate modes to handle the different cases, wherein these modes are specified by control registers 432 of control logic 430. The above-described source addresses can be generated in hardware by state machine and scheduler 431 of control logic 430.

The OP_A_RF_DEST_ADDR_SEL signal specifies the destination address in the Operand A IDB buffers 2221, into which the data read from the Operand A register files 2211 is transferred. Similarly, the OP_B_RF_DEST_ADDR_SEL signal specifies the destination addresses in the Operand B IDB buffers 2222 (or shift logic 2224) to which the data read from the Operand B register files 2212 is transferred. Again depending on the mode of operation, these addresses can be a single address or multiple addresses. The addresses can be generated in hardware by state machine and scheduler 431 of control logic 430.

Note that multiple SIMD engines share the operand register files and control logic. This results in higher compute density i.e., more computation capacity per unit silicon area. Sharing of operand register files and control logic also saves power and SRAM bandwidth. The savings in SRAM bandwidth come from the fact that only two operand register files need to be written into to support multiple SIMD engines.

The input distribution block 2220 includes buffers 2221-2222 to hold the Operand data and logic blocks 2223-2224 to manipulate the data. As illustrated by FIG. 22, Operand A values from register files 2211 are stored in buffers 2221 before being provided to Operand A IDB logic 2223 (which performs the switching/demultiplexing functions described above). In contrast, Operand B values from register files 2212 are routed through shift logic 2224 before being stored in buffers 2222. Thus, for Operand A, data is first loaded and is then manipulated to obtain the inputs to SIMD engine 2230, whereas for Operand B, data is first manipulated (shifted) and then buffered.

Instead of feeding SIMD engines directly from operand register files, the input distribution block 2220 acts as a small cache from which the SIMD engines are fed the operands. Input distribution block 2220 allows multiple SIMD engines to run in parallel using a single control circuit. As described above, the data from Operand A register file 2211 can be manipulated so that it provides distinct data to multiple SIMD engines.

The OP_A_IDB_ADDR_SEL signal specifies the address of the Operand A IDB buffer to be used for each SIMD. In all the architectures discussed, we have used only one register file word data for Operand A, but in the general case buffers 2221 can hold multiple register file words and each of the SIMD engines can possibly choose a different register file word from the buffers 2221. Typically there is only one Operand A buffer in the optimal architecture. However, this single buffer is actually implemented using a double buffer so that read and write do not happen to the same buffer in one cycle. The hardware manages this double buffer in a transparent way. Hence, this signal is internally managed by hardware in most cases.

The OP_A_IDB_DATA_SEL signal, which controls the Operand A IDB logic 2223, specifies the data that needs to be transferred to each SIMD. For example, in Architecture 2A, a single value is effectively replicated and broadcast to all SIMD engines. This signal specifies the index of the value that needs to be replicated. Similarly, in Architecture 3A, four consecutive values are taken from a register file word and each one of them is effectively replicated and sent to one SIMD. In this case, the OP_A_IDB_DATA_SEL signal specifies the index of the value that needs to be replicated for $SIMD_0$. For the other SIMD engines ($SIMD_1$-$SIMD_3$), the index values are incremental. For Architecture 1A, since the full register word stored in buffer 2221 is sent to all of the SIMD engines, the OP_A_IDB_DATA_SEL signal is not needed.

The OP_B_IDB_SHIFT_SEL signal, which controls the Operand B IDB shift logic 2224, is used to control the manner in which register file words received from Operand B register files 2212 are shifted (i.e., when two register file words from the same register file for Operand B are read. Note that the OP_B_IDB_SHIFT_SEL signal (and the Operand B IDB shift logic 2224) is only required when the system 2200 is implementing Architecture 4B. In this case, the OP_B_IDB_SHIFT_SEL signal specifies how the two register file words need to be manipulated to produce one register file word (in the manner described above).

Convolution operations typically involve data shifts. Locating the Operand B shift logic 2224 between the Operand B register files 2212 and the SIMD engines advantageously reduces hardware overhead by allowing data to be read from the Operand B register files 2212 multiple times, with different shifts applied to the data each time. If the shift logic 2224 is not implemented in this manner, the shifted data would need to be written to Operand B register file 2212, and therefore could not be reused as many times as in the proposed architecture.

The OP_B_IDB_ADDR_SEL value specifies the addresses of the Operand B IDB buffers that will provide their contents as inputs for each of the SIMD engines. This signal was illustrated for Architecture 2B in FIG. 16. This is one of the most important signals in the architecture, and provides a lot of flexibility on the type of computations that can be done. The OP_B_IDB_ADDR_SEL value typically comes from state machine and scheduler 431 for the mode corresponding to Architecture 2B but can also be managed by hardware in cases where data access patterns are predictable.

The use of multiple Operand B buffers 2222 in the input distribution block 2220 allows different SIMD engines to potentially get different Operand B data at a given cycle. Using four Operand B buffers 2222 (i.e., the same as the number of SIMD engines) allows four simultaneous reads, so that each SIMD receives different data. This is much less expensive (from a hardware perspective), than implementing the Operand B register file 2212 with a four port memory (which would also allow four simultaneous read operations to supply $SIMD_0$-$SIMD_3$). Providing Operand B buffers 2222 to buffer a small number of register words from the Operand B register files 2212 effectively provides a small cache that can be accessed by any of $SIMD_0$-$SIMD_3$. This presents a good compromise between hardware complexity and the required flexibility for some classes of algorithms.

The SIMD block 2230 includes one or more SIMD engines which perform the actual computations on the data provided by the input distribution block 2220. Because SIMD engines can support different type of operations, the operation to be performed should be provided as an input. Thus, the SIMD_OPERATION_SEL value is used to specify the operations to be performed by the SIMD engines. Theoretically, different SIMD engines can perform different operations, but in general, the same operation select value SIMD_OPERATION_SEL is used to drive all the SIMD engines.

The result of the computations performed by the SIMD engines need to be written to output register files 2241-2244 within output block 2240. Also, for operations like accumulation, previously accumulated values need to be read from the output register files 2241-2244 (and provided to the SIMD engines). Generally, the accumulated values are written back into the same location as the previously accumulated values. However, for the sake of generality, two control values OUTPUT_RF_ADDR_SEL_0 and OUTPUT_RF_ADDR_SEL_1 are provided to output block 2240, thereby allowing the read and write addresses of each of the output register files 2241-2244 to be specified separately. In one embodiment, the control value OUTPUT_RF_ADDR_SEL_0 specifies the write addresses to each of the output register files 2241-2244, and the control value OUTPUT_RF_ADDR_SEL_1 specifies the read addresses to each of the output register files 2241-2244. An illustration of specifying the output addresses was given using FIG. 21 when discussing the architectures for output circuit 420.

Note that including multiple output registers in each of the output register files 2241-2244 advantageously provides flexibility with regard to the type of operations that can be performed by the described system architecture. Some examples of this flexibility are described in more detail below.

Various examples for operating a computer architecture in accordance with a particular embodiment of the present invention will now be described.

Figure 23:
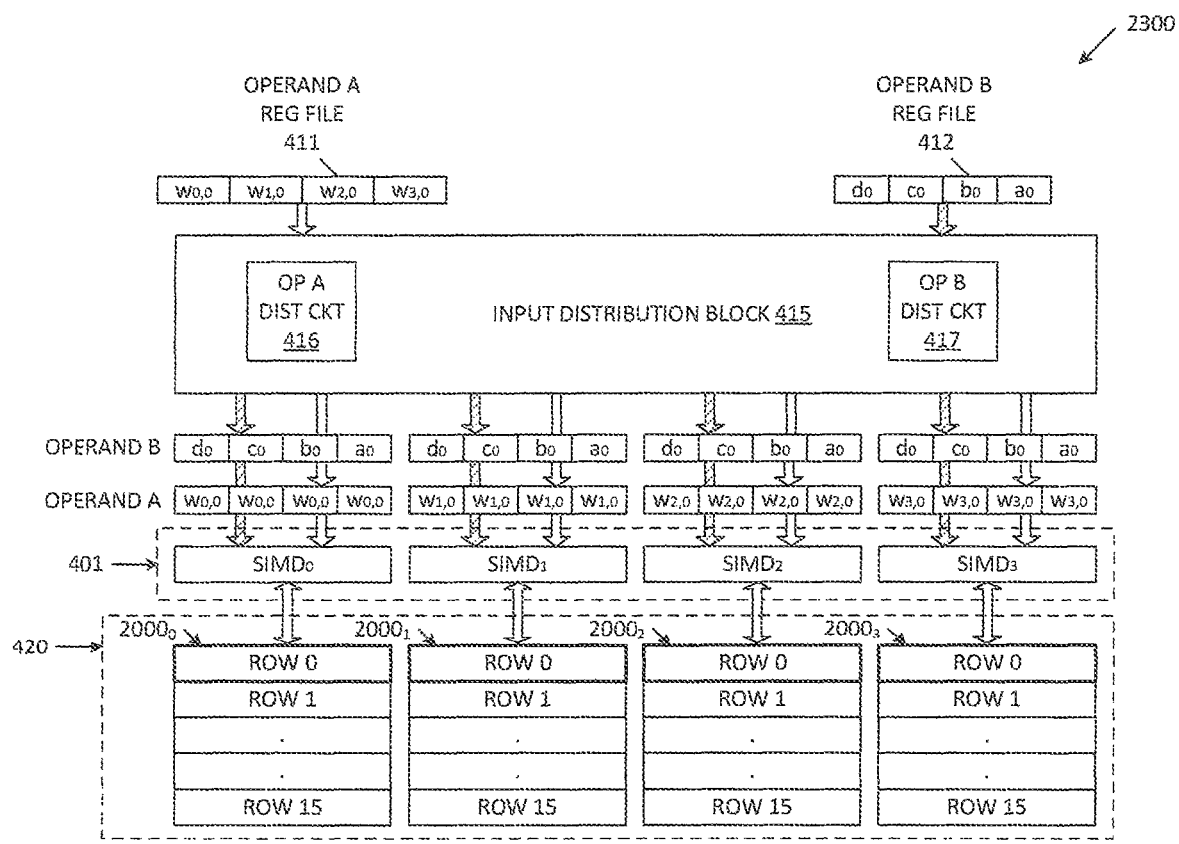
FIG. 23 is a block diagram of a computer architecture used to perform matrix multiplication in accordance with one embodiment of the present invention.

FIG. 23 is a block diagram of a computer architecture 2300 which can be used to perform matrix multiplication in accordance with one embodiment of the present invention.

FIG. 24 is a diagram illustrating two matrices I and J to be multiplied by the computer architecture 2300 of FIG. 23. Matrix I has 64 rows and 16 columns, and matrix J has 16 rows and 4 columns. Each row of matrix I may represent a weight vector, while each column of matrix J may represent an activation vector in a machine learning system. Matrix I includes 1024 (32-bit) values $w_{0,0}$ to $w_{63,15}$, as illustrated. Matrix J includes 64 (32-bit) values $a_{02}$-$a_{15}$, $b_0$-$b_{15}$, $c_0$-$c_{15}$ and $d_0$-$d_{15}$, as illustrated.

Figure 25:
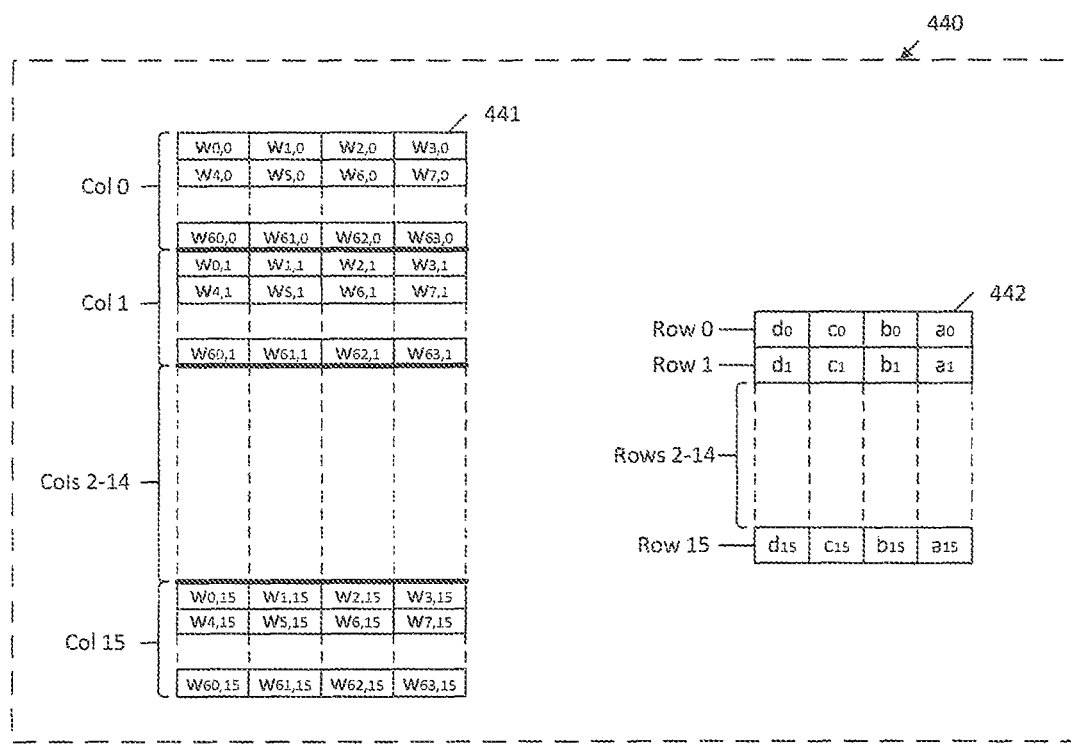
FIG. 25 is a block diagram illustrating the manner in which the contents of Matrix I and Matrix J of FIG. 24 are logically stored within system memory in accordance with one embodiment of the present invention.

Matrix I and Matrix J are stored in system memory 440 (FIG. 4). FIG. 25 is a block diagram illustrating the manner in which the contents of Matrix I and Matrix J are logically stored within system memory 440. Matrix I is stored in an Operand A memory block 441 that includes 256 rows, each row including four weight values. For example, the first row of Operand A memory block 441 (Row 0) includes weight values [$w_{0,0}$, $w_{1,0}$, $w_{2,0}$, $w_{3,0}$]. The first column (Col 0) of Matrix I (i.e., values $w_{i,0}$, wherein i=0 to 63) is stored in the first sixteen consecutive rows of Operand A memory block 441. The second column (Col 1) of Matrix I (i.e., values $w_{i,1}$, wherein i=0 to 63) is stored in the second set of sixteen consecutive rows of Operand A memory block 441. The remaining columns (Col. 2-Col. 15) of Matrix I are stored in consecutive sets of sixteen consecutive rows within Operand A memory block 441 as illustrated.

Matrix J is stored in an Operand B memory block 442 that includes 16 rows, each row including four activation values. For example, the first row of Operand B memory block 442 includes activation values [$d_0$, $c_0$, $b_0$, $a_0$] included in the first row of Matrix J. The remaining rows (Row 1-Row 15) of Matrix J are stored in consecutive rows (Row 1-Row 15) of Operand B memory block 442.

The multiplication of Matrix I and Matrix J is performed as follows.

State machine and scheduler 431 (FIG. 4) causes operand packaging logic 433 to retrieve the entries $w_{0,0}$, $w_{1,0}$, $w_{2,0}$ and $w_{3,0}$ from the first row of Operand A memory block 441, and to retrieve the entries $a_0$, $b_0$, $c_0$ and $d_0$ from the first row of Operand B memory block 442. State machine and scheduler 431 writes the retrieved entries $w_{0,0}$, $w_{1,0}$, $w_{2,0}$ and $w_{3,0}$ to Operand A register file 411, and writes the retrieved entries $a_0$, $b_0$, $c_0$ and $d_0$ to Operand B register file 412. This result is illustrated in FIG. 23. Operand A distribution circuit 416 within input distribution block 415 is controlled to route the entries $w_{0,0}$, $w_{1,0}$, $w_{2,0}$ and $w_{3,0}$ from Operand A register file 411 as 'Operand A' to $SIMD_0$, $SIMD_1$, $SIMD_2$ and $SIMD_3$, respectively (in the manner specified by FIG. 11 above). Operand B distribution circuit 417 within input distribution block 415 is controlled to route the entries $a_0$, $b_0$, $c_0$ and $d_0$ from Operand B register file 412 to each of $SIMD_0$, $SIMD_1$, $SIMD_2$ and $SIMD_3$ (in the manner specified by FIG. 14 above).

Each of the SIMD engines ($SIMD_0$-$SIMD_3$) multiplies the corresponding entries of Operand A and Operand B (e.g., $SIMD_0$ performs ($a_0 \times w_{0,0}$), ($b_0 \times w_{0,0}$), ($c_0 \times w_{0,0}$) and ($d_0 \times w_{0,0}$)) to generate corresponding products.

FIG. 26 illustrates the mapping of the contents of the output register sets $2000_0$, $2000_1$, $2000_2$ and $2000_3$ in accordance with the present example. Each entry of the output register sets $2000_0$, $2000_1$, $2000_2$ and $2000_3$ is initially set to a zero value. Each entry of the output register sets $2000_0$, $2000_1$, $2000_2$ and $2000_3$ corresponds with a dot product of the matrix multiplication. Each dot product is specified by a row of matrix I and a column of matrix J. For example, the entry of output register set $2000_0$ labeled ($w_{0,i}$ $a_i$) stores the dot product of Row 0 of matrix I ($w_{0,0}$, $w_{0,1}$, $w_{0,2}$ ... $w_{0,15}$) and column 0 of matrix J ($a_0$, $a_i$, $a_2$, ... $a_{15}$). Similarly, the entry of output register set $2000_2$ labeled ($w_{26,i}$ $d_i$) stores the dot product of row 26 of matrix I ($w_{26,0}$, $w_{26,1}$, $w_{26,2}$ ... $w_{26,15}$) and column 3 of matrix J ($d_0$, $d_1$, $d_2$, ... $d_{15}$).

State machine and scheduler 431 controls addressing of the output register sets $2000_0$, $2000_1$, $2000_2$ and $2000_3$ in parallel. During the initial calculation (described above and illustrated in FIG. 23), state machine and scheduler 431 addresses Row 0 of each of the output register sets $2000_0$-$2000_3$. As a result, the zero values stored in Row 0 of the output register sets $2000_0$-$2000_3$ are provided to $SIMD_0$-$SIMD_3$, respectively.

During the initial calculation, each of $SIMD_0$, $SIMD_1$, $SIMD_2$ and $SIMD_3$ performs accumulation operations, wherein the zero values retrieved from the output register sets $2000_0$-$2000_3$ are added to the products calculated by $SIMD_0$-$SIMD_3$. The accumulated values are then written back to Row 0 of the corresponding output register sets $2000_0$-$2000_3$.

For example, the zero values from the entries ($w_{0,i}$ $d_i$), ($w_{0,i}$ $c_i$), ($w_{0,i}$ $b_i$) and ($w_{0,i}$ $a_i$) of Row 0 of output register set $2000_0$ are provided to $SIMD_0$. $SIMD_0$ then adds the calculated products ($w_{0,0} \times d_0$), ($w_{0,0} \times c_0$), ($w_{0,0} \times b_0$) and ($w_{0,0} \times a_0$) to these retrieved zero values to create accumulated values. $SIMD_0$ then writes these accumulated values back to the entries ($w_{0,i}$ $d_i$), ($w_{0,i}$ $c_i$), ($w_{0,i}$ $b_i$) and ($w_{0,i}$ $a_i$) of Row 0 of output register set $2000_0$. Similar operations are performed by $SIMD_1$-$SIMD_3$.

State machine and scheduler 431 then increments address used to access Operand A memory block 441, causing the next row of values (i.e., $w_{4,0}$, $w_{5,0}$, $w_{6,0}$, and $w_{7,0}$) to be retrieved and stored in Operand A register file 411. Operand A distribution circuit 416 routes these received values in the same manner described above in connection with FIG. 23. That is, the values $w_{4,0}$, $w_{5,0}$, $w_{6,0}$, and $w_{7,0}$ are provided to $SIMD_0$, $SIMD_1$, $SIMD_2$ and $SIMD_3$, respectively. Operand B remains unchanged at this time.

Each of the SIMD engines ($SIMD_0$-$SIMD_3$) multiplies the corresponding entries of Operand A and Operand B (e.g., $SIMD_0$ performs ($a_0 \times w_{4,0}$), ($b_0 \times w_{4,0}$), ($c_0 \times w_{4,0}$) and ($d_0 \times w_{4,0}$)) thereby providing corresponding products.

During this second calculation, state machine and scheduler 431 increments the row address of each of the output register sets $2000_0$-$2000_3$, thereby addressing Row 1 within each of these output register sets. As a result, the zero values stored in Row 1 of the output register sets $2000_0$-$2000_3$ are provided to $SIMD_0$-$SIMD_3$.

During the second calculation, each of $SIMD_0$, $SIMD_1$, $SIMD_2$ and $SIMD_3$ performs accumulation operations, wherein the zero values retrieved from the output register sets $2000_0$-$2000_3$ are added to the products calculated by the SIMD engines. The accumulated values are then written back to the output register sets $2000_0$-$2000_3$.

For example, the zero values from the entries ($w_{4,i}$ $d_i$), ($w_{4,i}$ $c_i$), ($w_{4,i}$ $b_i$) and ($w_{4,i}$ $a_i$) of Row 1 of output register set $2000_0$ are provided to $SIMD_0$. $SIMD_0$ then adds the calculated products ($w_{4,0} \times d_0$), ($w_{4,0} \times c_0$), ($w_{4,0} \times b_0$) and ($w_{4,0} \times a_0$) to these retrieved zero values to create accumulated values. $SIMD_0$ then writes these accumulated values back to the entries ($w_{4,i}$ $d_i$), ($w_{4,i}$ $c_i$), ($w_{4,i}$ $b_i$) and ($w_{4,i}$ $a_i$) of Row 1 of output register set $2000_0$. Similar operations are performed by $SIMD_1$-$SIMD_3$.

The above-described process is repeated until Operand A distribution circuit 416 sequentially routes all (64) of the weight values $w_{0,0}$ to $w_{63,0}$ from the first column (Col 0) of Matrix I to $SIMD_0$-$SIMD_3$ as Operand A values in the manner described above.

After the weight values from the first column (Col 0) of Matrix I have been used to perform multiply-accumulate operations (e.g., after products associated with values $w_{0,0}$ to $w_{63,0}$ have been calculated), state machine and scheduler 431 resets the addresses of output register sets $2000_0$-$2000_3$ to Row 0. In addition, state machine and scheduler 431 increments the address used to access Operand A memory block 441, such that the values ($w_{0,1}$, $w_{i,1}$, $w_{2,1}$, $w_{3,1}$) are retrieved and stored in Operand A register file 411. Operand A distribution circuit 416 routes these values ($w_{0,1}$, $w_{1,1}$, $w_{2,1}$, $w_{3,1}$) to $SIMD_0$, $SIMD_1$, $SIMD_2$ and $SIMD_3$, respectively (in the same manner described above in connection with FIG. 23).

State machine and scheduler 431 also increments the address used to access Operand B memory block 442 by one, such that values ($a_i$, $b_i$, $c_i$, $d_i$) from Row 1 of Operand B memory block 442 are retrieved and stored in Operand B register file 412. Operand B distribution circuit 417 routes these values ($a_i$, $b_i$, $c_i$, $d_i$) to each of $SIMD_0$, $SIMD_1$, $SIMD_2$ and $SIMD_3$ (in the same manner that values ($a_0$, $b_0$, $c_0$, $d_0$) were previously routed to $SIMD_0$, $SIMD_1$, $SIMD_2$ and $SIMD_3$ in FIG. 23).

$SIMD_0$, $SIMD_1$, $SIMD_2$ and $SIMD_3$ perform multiply-accumulate operations on the received values, and the results are stored in Row 0 of the output registers $2000_0$, $2000_1$, $2000_2$ and $2000_3$, respectively, in the manner described above.

State machine and scheduler 431 then increments address used to access Operand A memory block 441, causing the next row of values (i.e., $w_{4,0}$, $w_{5,0}$, $w_{6,0}$, and $w_{7,0}$) to be retrieved and stored in Operand A register file 411. Operand A distribution circuit 416 routes these received values in the same manner described above in connection with FIG. 23. That is, the values $w_{4,0}$, $w_{5,0}$, $w_{6,0}$, and $w_{7,0}$ are provided to $SIMD_0$, $SIMD_1$, $SIMD_2$ and $SIMD_3$, respectively. Operand B ($a_1$, $b_1$, $c_1$, $d_1$) remains unchanged at this time. $SIMD_0$, $SIMD_1$, $SIMD_2$ and $SIMD_3$ perform multiply-accumulate operations on these received values, and the results are stored in Row 1 of the output registers $2000_0$, $2000_1$, $2000_2$ and $2000_3$, respectively, in the manner described above.

The above-described process is repeated until Operand A distribution circuit 416 sequentially routes all (64) of the weight values $w_{0,1}$ to $w_{63,1}$ from the second column (Col 1) of Matrix I to $SIMD_0$-$SIMD_3$ as Operand A values (while Operand B ($a_1$, $b_1$, $c_1$, $d_1$) remains unchanged).

The above-described process is then repeated, such that multiply-accumulate operations are performed for each of the columns (Col 0 to Col 15) of Matrix I and each of the rows (Row 0 to Row 15) of Matrix J. At the end of this process, the output register sets $2000_0$-$2000_3$ store the dot product of each row of matrix I with each column of matrix J. For example, the entry ($w_{0,i}$ $a_i$) of output register set $2000_0$ stores the dot product of Row 0 of matrix I and Col 0 of matrix J, and the entry ($w_{29,i}$ $d_i$) of output register set $2000_1$ stores the dot product of Row 29 of matrix I and Col 3 of matrix J.

Advantageously, the present invention provides an efficient structure for multiplying matrix I and matrix J. $SIMD_0$-$SIMD_3$ provide a high degree of processing parallelism (e.g., sixteen parallel multiply-accumulate operations at a time), which advantageously reduces the time required to perform the matrix multiplication. In addition, the control circuitry required to implement the matrix multiplication is advantageously simple. Address inputs to Operand A memory block 441 and output register sets $2000_0$-$2000_3$ are simply incremented after each multiply-accumulate operation, and the address input to Operand B memory block 442 is simply incremented after every 16 multiply-accumulate operations. Input distribution block 415 advantageously maintains the same configuration during the entire matrix multiplication.

A matrix that contains a large number of zero value entries is referred to as a 'sparse' matrix. For example, a matrix that includes ⅞ zero value entries or more may be referred to as a sparse matrix. Multiplication involving a sparse matrix may involve a large number of unnecessary operations. In the example provided above, assume that ⅞ of the entries of Matrix I include zero values. In this case, only 512 (16×16×16×(⅛)) multiply-accumulate operations are required to multiply matrix I and matrix J. However, all 4096 operations (16×16×16) described above would be performed by the method described above in connection with FIGS. 23-26. Thus, in accordance with another embodiment of the present invention, a method for using the structure of FIGS. 23-26 for performing multiplication with a sparse matrix is provided.

Assume that Matrix I is a sparse matrix, wherein only one eighth of the entries of Matrix I have non-zero values. As described above, processing is sequentially performed for each column of Matrix I (e.g., column 0 of Matrix I is initially processed, followed by column 1 of Matrix I, etc.). Thus, the processing of the first column of Matrix I will be described, with the understanding that the remaining columns of Matrix I are processed in the same manner.

In a first example, it is assumed that only the following eight entries (of the 64 total entries) of Column 0 of Matrix I have non-zero values: $w_{3,0}$, $w_{5,0}$, $w_{8,0}$, $w_{10,0}$, $w_{11,0}$, $w_{24,0}$, $w_{58,0}$, and $w_{61,0}$.

Initially, operand packaging logic 433 identifies the row addresses of the non-zero values within Matrix I. Thus, in the present example, operand packing logic 433 determines that the non-zero values $w_{3,0}$, $w_{5,0}$, $w_{8,0}$, $w_{10,0}$, $w_{11,0}$, $w_{24,0}$, $w_{58,0}$, and $w_{61,0}$ are located in rows 3, 5, 8, 10, 11, 24, 58 and 61, respectively, of Matrix I. Using this row address information, operand packing logic 433 determines which of the output register sets $2000_0$-$2000_3$ are used to store the dot products associated with the identified non-zero values. In general, this determination is made by dividing the row address of the non-zero value within Operand Matrix I by '4', and then using the remainder (R) of this division operation to identify the output register set (wherein the remainder (R) identifies output register set $2000_R$).

Operand packing logic 433 also determines the row within the output register set where the dot product is stored. In general, this determination is made by dividing the row address of the non-zero value within Matrix I by '4', and ignoring the remainder (R).

In the present example, non-zero values $w_{8,0}$ and $w_{24,0}$, are located in rows 8 and 24 of Matrix I. Dividing these row numbers by 4 result in remainders of '0', thereby indicating that the dot products of non-zero values $w_{8,0}$ and $w_{24,0}$ are located in output register set $2000_0$. Moreover, because 8/4=2 and 24/4=6, the dot products of non-zero values $w_{8,0}$ and $w_{24,0}$ are located in Row 2 and Row 6, respectively, of output register set $2000_0$. This result is confirmed by FIG. 26, which shows that output register set $2000_0$ includes the dot products [($w_{8,i}$ $d_i$), ($w_{8,i}$ $c_i$), ($w_{8,i}$ $b_i$), ($w_{8,i}$ $a_i$)] in Row 2 of output register set $2000_0$, and the dot products [($w_{24,i}$ $d_i$), ($w_{24,i}$ $c_i$), ($w_{24,i}$ $b_i$), ($w_{24,i}$ $a_i$)] in Row 6 of output register set $2000_0$.

In the present example, non-zero values $w_{5,0}$ and $w_{61,0}$, are located in rows 5 and 61 of matrix I. Dividing these row numbers by 4 result in remainders of '1', thereby indicating that the dot products of non-zero values $w_{5,0}$ and $w_{61,0}$ are located in output register set $2000_1$. Moreover, because 5/4=1 (remainder 1) and 61/4=15 (remainder 1), the dot products of non-zero values $w_{5,0}$ and $w_{61,0}$ are located in Row 1 and Row 15, respectively, of output register set $2000_1$. This result is confirmed by FIG. 26, which shows that output register set $2000_1$ includes the dot products [($w_{5,i}$ $d_i$), ($w_{5,i}$ $c_i$), ($w_{5,i}$ $b_i$), ($w_{5,i}$ $a_i$)] in Row 1 of output register set $2000_1$, and the dot products [($w_{61,i}$ $d_i$), ($w_{61,i}$ $c_i$), ($w_{61,i}$ $b_i$), ($w_{61,i}$ $a_i$)] in Row 15 of output register set $2000_1$.

In the present example, non-zero values $w_{10,0}$ and $w_{58,0}$, are located in rows 10 and 58 of matrix I. Dividing these row numbers by 4 results in remainders of '2', thereby indicating that the dot products of non-zero values $w_{10,0}$ and $w_{58,0}$ are located in output register set $2000_2$. Moreover, because 10/4=2 (remainder 2) and 58/4=14 (remainder 2), the dot products of non-zero values $w_{10,0}$ and $w_{58,0}$ are located in Row 2 and Row 14, respectively, of output register set $2000_2$. This result is confirmed by FIG. 26, which shows that output register set $2000_2$ includes the dot products [($w_{10,i}$ $d_i$), ($w_{10,i}$ $c_i$), ($w_{10,i}$ $b_i$), ($w_{10,i}$ $a_i$)] in Row 2 of output register set $2000_2$, and the dot products [($w_{58,i}$ $d_i$), ($w_{58,i}$ $c_i$), ($w_{58,i}$ $b_i$), ($w_{58,i}$ $a_i$)] in Row 14 of output register set $2000_2$.

In the present example, non-zero values $w_{3,0}$ and $w_{11,0}$, are located in rows 3 and 11 of matrix I. Dividing these row numbers by 4 result in remainders of '3', thereby indicating that the dot products of non-zero values $w_{3,0}$ and $w_{11,0}$ are located in output register set $2000_3$. Moreover, because 3/4=0 (remainder 3) and 11/4=2 (remainder 3), the dot products of non-zero values $w_{3,0}$ and $w_{11,0}$ are located in Row 0 and Row 2, respectively, of output register set $2000_3$. This result is confirmed by FIG. 26, which shows that output register set $2000_3$ includes the dot products [($w_{3,i}$ $d_i$), ($w_{3,i}$ $c_i$), ($w_{3,i}$ $b_i$), ($w_{3,i}$ $a_i$)] in Row 0 of output register set $2000_3$, and the dot products [($w_{11,i}$ $d_i$), ($w_{11,i}$ $c_i$), ($w_{11,i}$ $b_i$), ($w_{11,i}$ $a_i$)] in Row 2 of output register set $2000_3$.

Upon making the determinations specified above, operand packing logic 433 sorts (packs) the non-zero values $w_{3,0}$, $w_{5,0}$, $w_{8,0}$, $w_{10,0}$, $w_{11,0}$, $w_{24,0}$, $w_{58,0}$, and $w_{61,0}$ of Column 0 of matrix I into Operand A memory block 441 as follows. See new statement later in document.

The first non-zero values to have dot products stored in output register sets $2000_0$, $2000_1$, $2000_2$ and $2000_3$ are stored in the first row (Row 0) of Operand A memory block 441. Thus, in the present example, non-zero values $w_{8,0}$, $w_{5,0}$, $w_{10,0}$ and $w_{3,0}$, which have dot products in output register sets $2000_0$, $2000_1$, $2000_2$ and $2000_3$, respectively, are stored in Row 0 of Operand A memory block 441.

The next non-zero values to have dot products stored in output register sets $2000_0$, $2000_1$, $2000_2$ and $2000_3$ are stored in the second row (Row 1) of Operand A memory block 441. Thus, in the present example, non-zero values $w_{24,0}$, $w_{61,0}$, $w_{58,0}$, and $w_{11,0}$, which have dot products in output register sets $2000_0$, $2000_1$, $2000_2$ and $2000_3$, respectively, are stored in Row 1 of Operand A memory block 441. The above-described sorting/packing of the non-zero values of Column 0 of matrix I into the Operand A memory block 441 is illustrated in FIG. 27.

Figure 27:
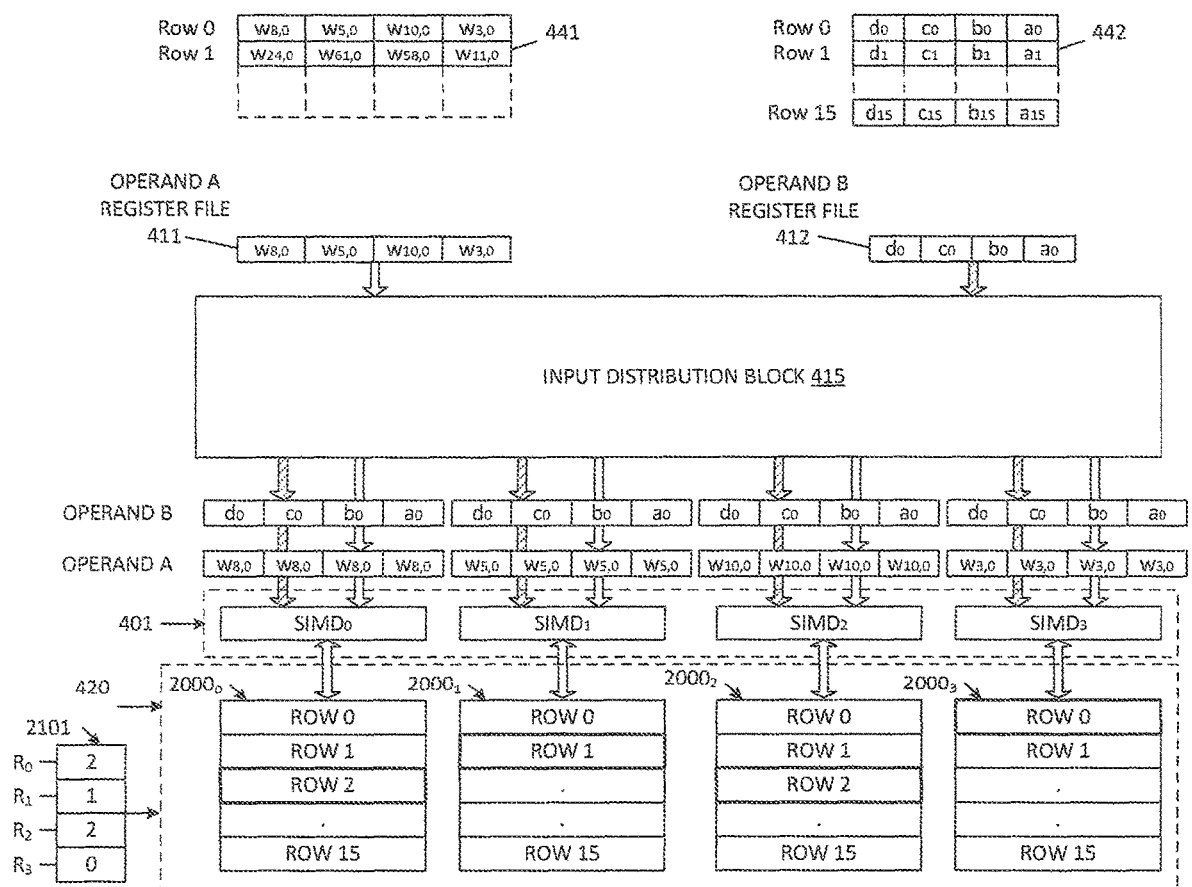
FIG. 27 and FIG. 28 are block diagrams of a computer architecture during various stages of a sparse matrix multiplication in accordance with one embodiment of the present invention.

Initially, the state machine and scheduler 431 causes the first rows of Operand A memory block 441 and Operand B memory block 442 to be retrieved and loaded into Operand A register file 411 and Operand B register file 412, respectively, as illustrated by FIG. 27. Thus, Operand A register file 411 stores the non-zero weight values $w_{8,0}$, $w_{5,0}$, $w_{10,0}$ and $w_{3,0}$ of Matrix I, and Operand B register file 412 stores the activation values $d_0$, $c_0$, $b_0$ and $a_0$ of Matrix J. State machine and scheduler 431 causes Operand A distribution circuit 416 to route the non-zero values $w_{8,0}$, $w_{5,0}$, $w_{10,0}$ and $w_{3,0}$, from Operand A register file 411 to $SIMD_0$, $SIMD_1$, $SIMD_2$ and $SIMD_3$, respectively, as Operand A. At the same time, state machine and scheduler 431 causes Operand B distribution circuit 417 to route the values $d_0$, $c_0$, $b_0$ and $a_0$ to each of the SIMD engines as Operand B. These values $d_0$, $c_0$, $b_0$ and $a_0$ are routed from Row 0 of the Operand B memory block 442 (i.e., Row 0 of Matrix J) because each of the Operand A values $w_{8,0}$, $w_{5,0}$, $w_{10,0}$ and $w_{3,0}$ are from Column 0 of Matrix I. FIG. 27 is a block diagram illustrating the above-described configuration.

$SIMD_0$, $SIMD_1$, $SIMD_2$ and $SIMD_3$ multiply the received Operands A and B in the manner described above. State machine and scheduler 431 independently addresses the previously determined rows in output register sets $2000_0$, $2000_1$, $2000_2$ and $2000_3$ that are associated with the non-zero values $w_{8,0}$, $w_{5,0}$, $w_{10,0}$ and $w_{3,0}$. That is, state machine and scheduler 431 addresses Row 2, Row 1, Row 2 and Row 0 within output register sets $2000_0$, $2000_1$, $2000_2$ and $2000_3$, respectively. As described above, all rows of the output register sets store initially store '0' values.

$SIMD_0$, $SIMD_1$, $SIMD_2$ and $SIMD_3$ perform accumulate operations, wherein the calculated products are added to the zero values retrieved from the output register sets $2000_0$, $2000_1$, $2000_2$ and $2000_3$, respectively. $SIMD_0$, $SIMD_1$, $SIMD_2$ and $SIMD_3$ then write the accumulated values to the addressed rows (Row 2, Row 1, Row 2 and Row 0, respectively) of the output register sets $2000_0$, $2000_1$, $2000_2$ and $2000_3$, respectively.

Figure 28:
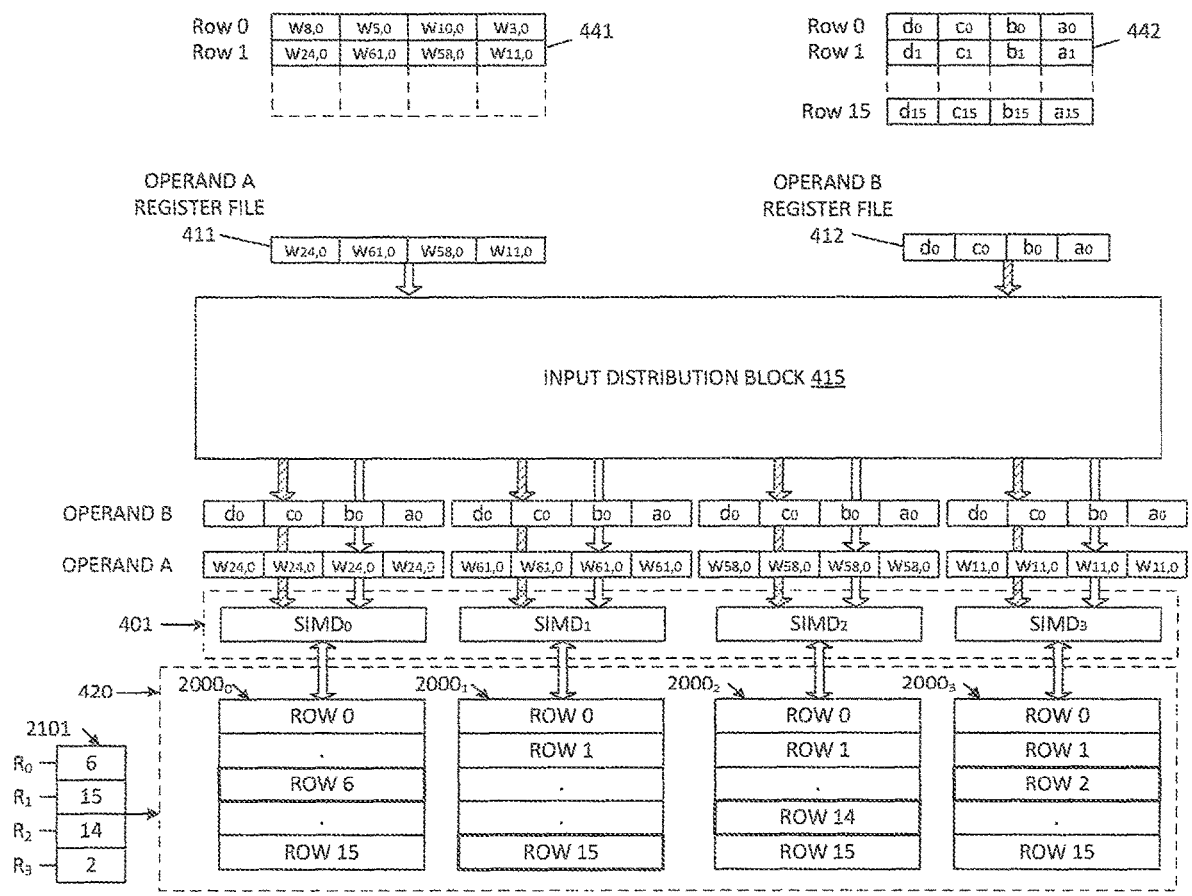

As illustrated by FIG. 28, state machine and scheduler 431 then retrieves the non-zero values $w_{24,0}$, $w_{61,0}$, $w_{58,0}$ and $w_{11,0}$, from the second row of Operand A memory block 441, and stores these non-zero values in Operand A register file 411.

Thus, Operand A register file 411 stores the non-zero weight values $w_{24,0}$, $w_{61,0}$, $w_{58,0}$ and $w_{11,0}$ of Matrix I, and Operand B register file 412 stores the activation values $d_0$, $c_0$, $b_0$ and $a_0$ of Matrix J. State machine and scheduler 431 causes Operand A distribution circuit 416 to route the non-zero values $w_{24,0}$, $w_{61,0}$, $w_{58,0}$ and $w_{11,0}$, from Operand A register file 411 to $SIMD_0$, $SIMD_1$, $SIMD_2$ and $SIMD_3$, respectively, as Operand A. At the same time, state machine and scheduler 431 continues to cause Operand B distribution circuit 417 to route the values $d_0$, $c_0$, $b_0$ and $a_0$ to each of the SIMD engines as Operand B. These values $d_0$, $c_0$, $b_0$ and $a_0$ are routed from Row 0 of the Operand B memory block 442 (i.e., Row 0 of Matrix J) because each of the Operand A values $w_{24,0}$, $w_{61,0}$, $w_{58,0}$ and $w_{11,0}$ are from Column 0 of Matrix I. FIG. 28 is a block diagram illustrating the above-described configuration.

$SIMD_0$, $SIMD_1$, $SIMD_2$ and $SIMD_3$ multiply the received Operands A and B in the manner described above. State machine and scheduler 431 independently addresses the previously determined rows in output register sets $2000_0$, $2000_1$, $2000_2$ and $2000_3$ that are associated with the non-zero values $w_{24,0}$, $w_{61,0}$, $w_{58,0}$ and $w_{11,0}$. That is, state machine and scheduler 431 addresses Row 6, Row 15, Row 14 and Row 2 within output register sets $2000_0$, $2000_1$, $2000_2$ and $2000_3$, respectively.

$SIMD_0$, $SIMD_1$, $SIMD_2$ and $SIMD_3$ perform accumulate operations, wherein the calculated products are added to the zero values retrieved from the output register sets $2000_0$, $2000_1$, $2000_2$ and $2000_3$, respectively. $SIMD_0$, $SIMD_1$, $SIMD_2$ and $SIMD_3$ then write the accumulated values to the addressed rows (Row 6, Row 15, Row 14 and Row 2, respectively) of the output register sets $2000_0$, $2000_1$, $2000_2$ and $2000_3$, respectively.

The above-described operations complete the processing of the first column (Col 0) of Matrix I. The same processing steps are performed for each of the remaining 15 columns of Matrix I, thereby completing the multiplication of 'sparse' Matrix I and Matrix J. Note that in these processing steps, non-zero values in Column 1 of Matrix I are multiplied by values in Row 1 of Matrix J (i.e., $a_i$, $b_i$, $c_i$ and $d_i$), non-zero values in Column 2 of Matrix I are multiplied by values in Row 2 of Matrix J (i.e., $a_2$, $b_2$, c2 and $d_2$), etc.). Advantageously, the SIMD engines are kept busy (i.e., perform multiply-accumulate operations for non-zero matrix values), while minimizing the number of multiply-accumulate operations required to perform the multiplication of 'sparse' Matrix I and Matrix J. In the foregoing manner, the computer architecture performs multiplication of a sparse matrix in a highly efficient (and fast) manner.

The sparse matrix multiplication example described above includes non-zero values of Matrix I that are evenly distributed among the output register sets $2000_0$-$2000_3$ (e.g., eight non-zero values in Column 0 of Matrix I are distributed such that each of the output register sets $2000_0$-$2000_3$ is associated with two non-zero values). However, in other examples, the distribution of the non-zero values may not be as uniform. Another embodiment of the present invention handles a non-uniform distribution of non-zero values in a manner described in more detail below.

Suppose that the first sixteen non-zero entries in the first three columns of Matrix I are entries $w_{2,0}$ $w_{12,0}$, $w_{32,0}$, $w_{38,0}$, $w_{43,0}$, $w_{56,0}$ (in Col. 0 of Matrix I), $w_{7,1}$, $w_{14,1}$ $w_{21,1}$, $w_{25,1}$, $w_{37,1}$, $w_{43,1}$ (in Col. 1 of Matrix I), $w_{8,2}$, $w_{10,2}$, $w_{23,2}$ and $w_{51,2}$ (in Col. 2 of Matrix I).

Operand packing logic 433 identifies the row addresses of the non-zero values within Matrix I (e.g., non-zero entry $w_{2,0}$ is located in row 2 of Matrix I). Using this row address information, operand packing logic 433 determines which of the output register sets $2000_0$-$2000_3$ are used to store the dot products associated with the identified non-zero values in the manner described above. Operand packing logic 433 also determines the row within the output register set where the dot product is stored, in the manner described above.

Thus, in the present example, operand packing logic 433 determines that the dot products associated with non-zero entries $w_{12,0}$, $w_{32,0}$, $w_{56,0}$ and $w_{8,2}$ are mapped to rows 3, 8, 14 and 2, respectively, of output register set $2000_0$; the dot products associated with non-zero entries $w_{45,0}$, $w_{21,0}$, $w_{25,0}$ and $w_{37,2}$ are mapped to rows 11, 5, 6 and 9, respectively, of output register set $2000_1$; the dot products associated with non-zero entries $w_{2,0}$, $w_{38,0}$, $w_{14,1}$ and $w_{10,2}$ are mapped to rows 0, 9, 3 and 2, respectively, of output register set $2000_2$; and the dot products associated with non-zero entries $w_{7,1}$, $w_{43,1}$, $w_{23,2}$ and $w_{51,2}$ are mapped to rows 7, 10, 5 and 12, respectively, of output register set $2000_3$.

Note that three non-zero entries ($w_{12,0}$, $w_{32,0}$ and $w_{56,0}$) of column 0 of Matrix I are mapped to output register set $2000_0$, one non-zero entry ($w_{45,0}$) of column 0 of Matrix I is mapped to output register set $2000_1$, two non-zero entries ($w_{2,0}$ and $w_{38,0}$) of column 0 of Matrix I are mapped to output register set $2000_2$, and no non-zero entry of column 0 of Matrix I is mapped to output register set $2000_3$.

No non-zero entries of column 1 of Matrix I are mapped to output register set $2000_0$, three non-zero entries ($w_{21,1}$, $w_{25,1}$, $w_{37,1}$) of column 1 of Matrix I are mapped to output register set $2000_1$, one non-zero entry ($w_{14,1}$) of column 1 of Matrix I is mapped to output register set $2000_2$, and two non-zero entries ($w_{7,1}$ and $w_{43,1}$) of column 0 of Matrix I is mapped to output register set $2000_3$.

One non-zero entry ($w_{8,2}$) of column 2 of Matrix I is mapped to output register set $2000_0$, no non-zero entries of column 2 of Matrix I are mapped to output register set $2000_1$, one non-zero entry ($w_{10,2}$) of column 2 of Matrix I is mapped to output register set $2000_2$, and two non-zero entries ($w_{23,2}$ and $w_{51,2}$) of column 2 of Matrix I is mapped to output register set $2000_3$.

Upon making the determinations specified above, operand packing logic 433 sorts (packs) the non-zero values of columns 0, 1 and 2 of Matrix I into Operand A memory block 441 as follows. The first non-zero values to have dot products stored in output register sets $2000_0$, $2000_1$, $2000_2$ and $2000_3$ are stored in the first row (Row 0) of Operand A memory block 441. Thus, in the present example, non-zero values $w_{12,0}$, $w_{45,0}$, $w_{2,0}$ and $w_{7,1}$, which have dot products in output register sets $2000_0$, $2000_1$, $2000_2$ and $2000_3$, respectively, are stored in Row 0 of Operand A memory block 441.

The next non-zero values to have dot products stored in output register sets $2000_0$, $2000_1$, $2000_2$ and $2000_3$ are stored in the second row (Row 1) of Operand A memory block 441. Thus, in the present example, non-zero values $w_{32,0}$, $w_{21,1}$, $w_{38,0}$, and $w_{23,2}$, which have dot products in output register sets $2000_0$, $2000_1$, $2000_2$ and $2000_3$, respectively, are stored in Row 1 of Operand A memory block 441.

The next non-zero values to have dot products stored in output register sets $2000_0$, $2000_1$, $2000_2$ and $2000_3$ are stored in the third row (Row 2) of Operand A memory block 441. Thus, in the present example, non-zero values $w_{8,2}$, $w_{37,1}$, $w_{10,2}$, and $w_{43,1}$, which have dot products in output register sets $2000_0$, $2000_1$, $2000_2$ and $2000_3$, respectively, are stored in Row 2 of Operand A memory block 441.

Figure 29:
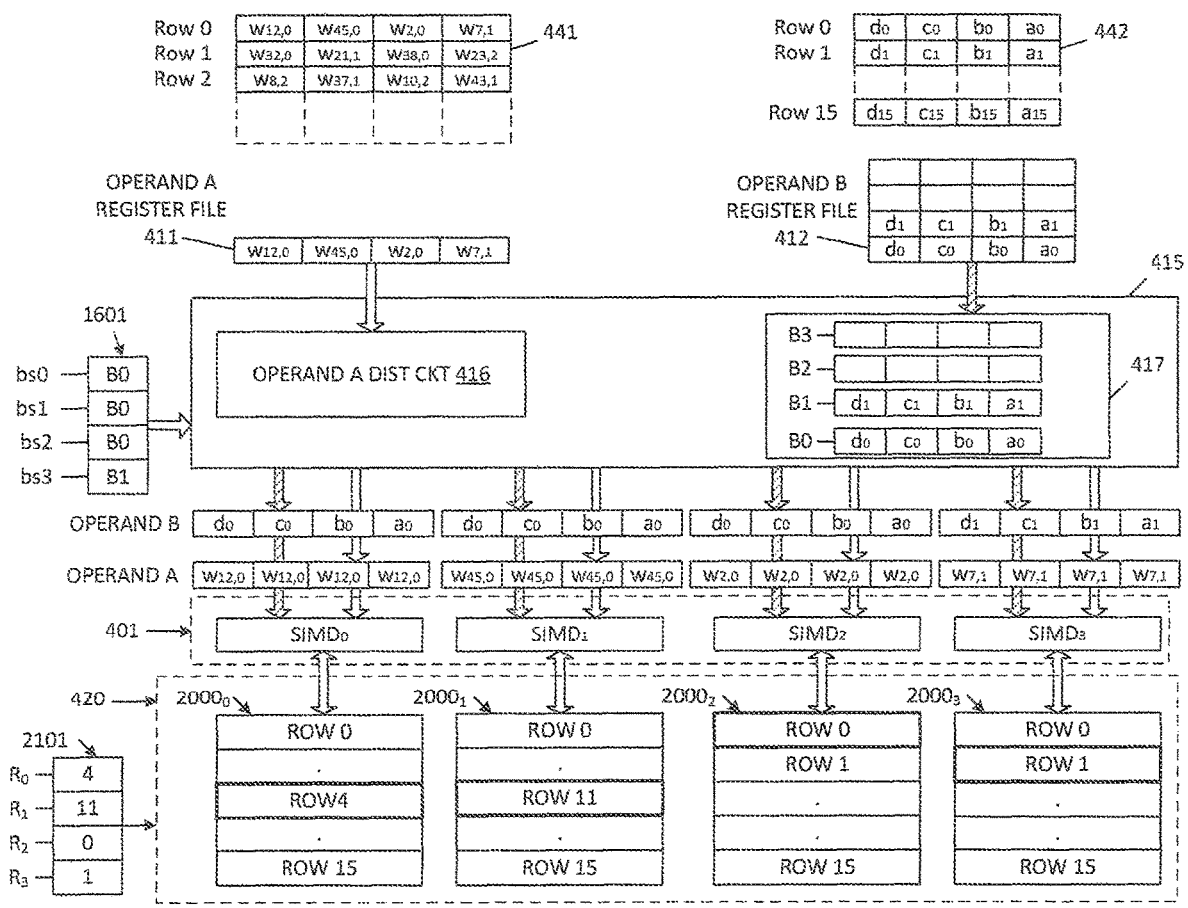
FIG. 29, FIG. 30 and FIG. 31 are block diagrams of a computer architecture during various stages of a sparse matrix multiplication in accordance with an alternate embodiment of the present invention.

The above-described sorting/packing of the non-zero values of Columns 0, 1 and 2 of Matrix I into the Operand A memory block 441 is illustrated in FIG. 29.

Initially, the state machine and scheduler 431 causes Row 0 of Operand A memory block 441 to be retrieved and loaded into Operand A register file 411, and then transferred to Operand A distribution circuit 416. Thus, Operand A register file 411 stores the non-zero weight values $w_{12,0}$, $w_{43,0}$, $w_{2,0}$ and $w_{7,1}$ of Matrix I. Note that in an alternate embodiment, these non-zero weight values $w_{12,0}$, $w_{45,0}$, $w_{2,0}$ and $w_{7,1}$ are stored in a buffer within Operand A distribution circuit 416.

State machine and scheduler 431 also causes Row 0 and Row 1 of Operand B memory block 442 to be retrieved and loaded into Operand B register file 412, and then transferred into Operand B buffers BC and B1, respectively, within Operand B distribution circuit 417. Thus, Operand B register file 412 and Operand B buffer BC store the activation values $d_0$, $c_0$, $b_0$ and $a_0$ of Matrix J, and Operand B register file 412 and Operand B buffer B1 store the activation values $d_1$, $c_1$, $b_1$ and $a_1$ of Matrix J. This condition is shown in FIG. 29.

Note that state machine and scheduler 431 retrieves the activation values from Row 0 and Row 1 of Operand B memory block 432 because these two activation values are required to calculate the required dot products associated with the retrieved weight values included in Operand A (which were taken from the first two columns of Matrix I). Also note that Operand B register file 412 can be loaded in series or parallel from Operand B memory block 442, and that the buffers B0-B3 of Operand B distribution circuit 417 can be loaded in series (FIG. 16) or parallel (FIGS. 17-18) from Operand B register file 412.

State machine and scheduler 431 causes Operand A distribution circuit 416 to route the non-zero values $w_{12,0}$, $w_{43,0}$, $w_{2,0}$, and $w_{7,1}$ from Operand A register file 411 to $SIMD_0$, $SIMD_1$, $SIMD_2$ and $SIMD_3$, respectively, as Operand A. At the same time, state machine and scheduler 431 causes Operand B distribution circuit 417 to route the values $d_0$, $c_0$, $b_0$ and $a_0$ to each of $SIMD_0$, $SIMD_1$ and $SIMD_2$ as Operand B, and also causes Operand B distribution circuit 417 to route the values $d_i$, $c_i$, $b_i$ and $a_i$ to $SIMD_3$. In the embodiment illustrated by FIG. 29, the Operand B selection register 1601 stores the Operand B select signals that enable the routing of these Operand B values.

$SIMD_0$, $SIMD_1$, $SIMD_2$ and $SIMD_3$ multiply the received Operands A and B in the manner described above. State machine and scheduler 431 independently addresses the previously determined rows in output register sets $2000_0$, $2000_1$, $2000_2$ and $2000_3$ that are associated with the non-zero values $w_{12,0}$, $w_{43,0}$, $w_{2,0}$ and $w_{7,1}$. That is, state machine and scheduler 431 addresses Row 4, Row 11, Row 0 and Row 1 within output register sets $2000_0$, $2000_1$, $2000_2$ and $2000_3$, respectively. As described above, all rows of the output register sets store initially store '0' values.

$SIMD_0$, $SIMD_1$, $SIMD_2$ and $SIMD_3$ perform accumulate operations, wherein the calculated products are added to the zero values retrieved from the output register sets $2000_0$, $2000_1$, $2000_2$ and $2000_3$, respectively. $SIMD_0$, $SIMD_1$, $SIMD_2$ and $SIMD_3$ then write the accumulated values to the addressed rows (Row 4, Row 11, Row 0 and Row 1, respectively) of the output register sets $2000_0$, $2000_1$, $2000_2$ and $2000_3$, respectively. In the embodiment illustrated by FIG. 29, the register select logic 2101 stores register select entries that enable the routing of values to/from output register sets $2000_0$, $2000_1$, $2000_2$ and $2000_3$.

Note that the multiply-accumulate operations implemented in FIG. 29 advantageously use non-zero weight values from both the first column of Matrix I (i.e., weight values $w_{12,0}$, $w_{45,0}$ and $w_{2,0}$), and the second column of Matrix I (i.e., weight value $w_{7,1}$), thereby increasing efficiency (because none of the SIMD engines are idle, even though there are not enough non-zero entries in the first column of Matrix I to supply all four of the SIMD engines).

Figure 30:
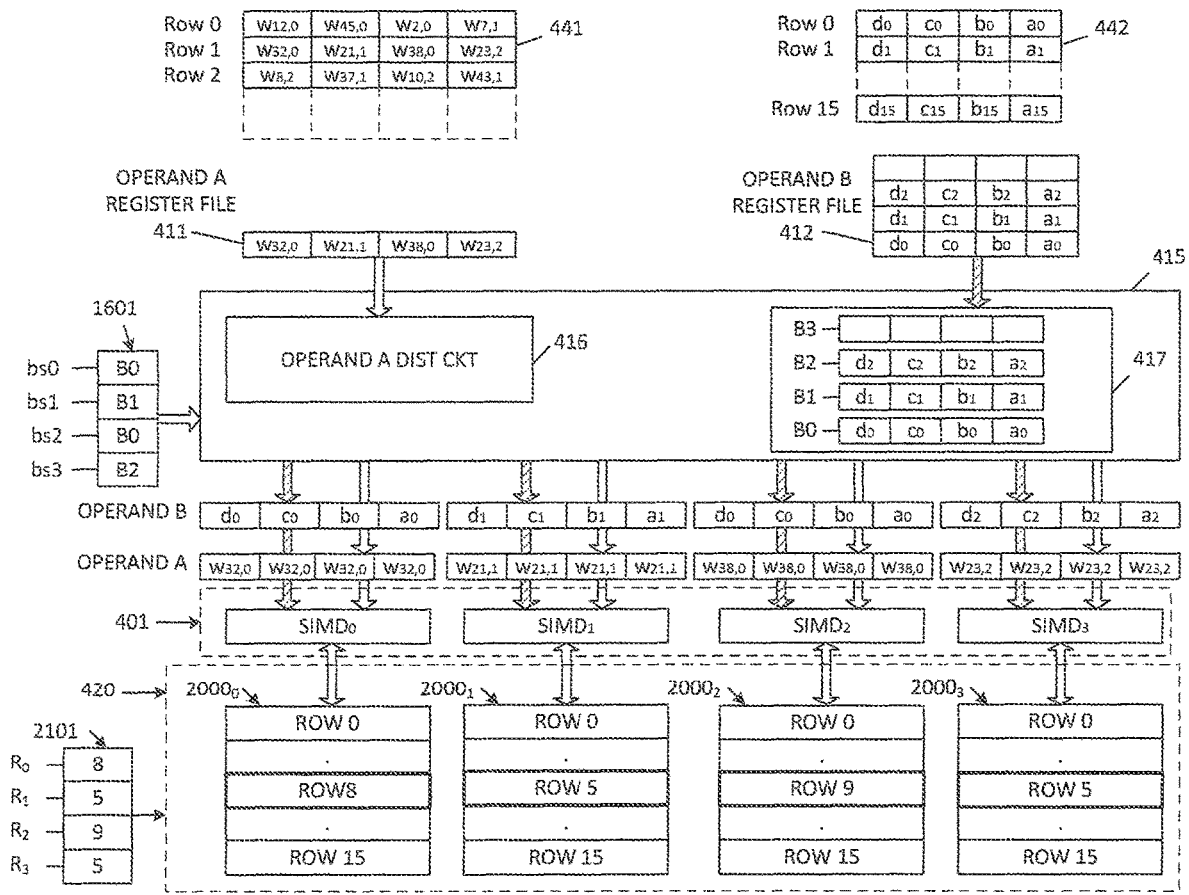

As illustrated by FIG. 30, state machine and scheduler 431 then causes Row 1 of Operand A memory block 441 to be retrieved and loaded into Operand A register file 411, and then transferred into an Operand A buffer within Operand A distribution circuit 416. Thus, Operand A register file 411 and Operand A distribution circuit 416 store the non-zero weight values $w_{32,0}$, $w_{21,1}$, $w_{38,0}$ and $w_{23,2}$ of Matrix I.

State machine and scheduler 431 also causes Row 2 of Operand B memory block 442 to be retrieved and loaded into Operand B register file 412, and then transferred into Operand B buffer B2 within Operand B distribution circuit 417. Thus, Operand B register file 412 and Operand B buffer BC store the activation values $d_0$, $c_0$, $b_0$ and $a_0$ of Matrix J, Operand B register file 412 and Operand B buffer B1 store the activation values $d_1$, $c_1$, $b_1$ and $a_1$, and Operand B register file 412 and Operand B buffer B2 store the activation values $d_2$, $c_2$, $b_2$ and $a_2$.

Note that state machine and scheduler 431 retrieves the activation values from Rows 0, 1 and 2 of Operand B memory block 432 because these three activation values are required to calculate the required dot products associated with the retrieved weight values included in Operand A (which were taken from the first three columns of Matrix I).

State machine and scheduler 431 causes Operand A distribution circuit 416 to route the non-zero values $w_{32,0}$, $w_{21,1}$, $w_{38,0}$ and $w_{23,2}$ from Operand A register file 411 to $SIMD_0$, $SIMD_1$, $SIMD_2$ and $SIMD_3$, respectively, as Operand A. At the same time, state machine and scheduler 431 causes Operand B distribution circuit 417 to route the values $d_0$, $c_0$, $b_0$ and $a_0$ to each of $SIMD_0$ and $SIMD_2$ as Operand B, causes Operand B distribution circuit 417 to route the values $d_i$, $c_i$, $b_i$ and $a_i$ to $SIMD_1$, and causes Operand B distribution circuit 417 to route the values $d_2$, $c_2$, $b_2$ and $a_2$ to $SIMD_3$.

$SIMD_0$, $SIMD_1$, $SIMD_2$ and $SIMD_3$ multiply the received Operands A and B in the manner described above. State machine and scheduler 431 independently addresses the previously determined rows in output register sets $2000_0$, $2000_1$, $2000_2$ and $2000_3$ that are associated with the non-zero values $w_{32,0}$, $w_{21,1}$, $w_{38,0}$ and $w_{23,2}$. That is, state machine and scheduler 431 addresses Row 8, Row 5, Row 9 and Row 5 within output register sets $2000_0$, $2000_1$, $2000_2$ and $2000_3$, respectively. As described above, all rows of the output register sets store initially store '0' values.

$SIMD_0$, $SIMD_1$, $SIMD_2$ and $SIMD_3$ perform accumulate operations, wherein the calculated products are added to the zero values retrieved from the output register sets $2000_0$, $2000_1$, $2000_2$ and $2000_3$, respectively. $SIMD_0$, $SIMD_1$, $SIMD_2$ and $SIMD_3$ then write the accumulated values to the addressed rows (Row 8, Row 5, Row 9 and Row 5, respectively) of the output register sets $2000_0$, $2000_1$, $2000_2$ and $2000_3$, respectively.

Note that the multiply-accumulate operations implemented in FIG. 30 advantageously use non-zero weight values from the first column of Matrix I (i.e., weight values $w_{32,0}$ and $w_{38,0}$), the second column of Matrix I (i.e., weight value $w_{21,1}$), and the third column of Matrix I (i.e., weight value $w_{23,2}$), thereby increasing operational efficiency (because none of the SIMD engines are idle).

Figure 31:
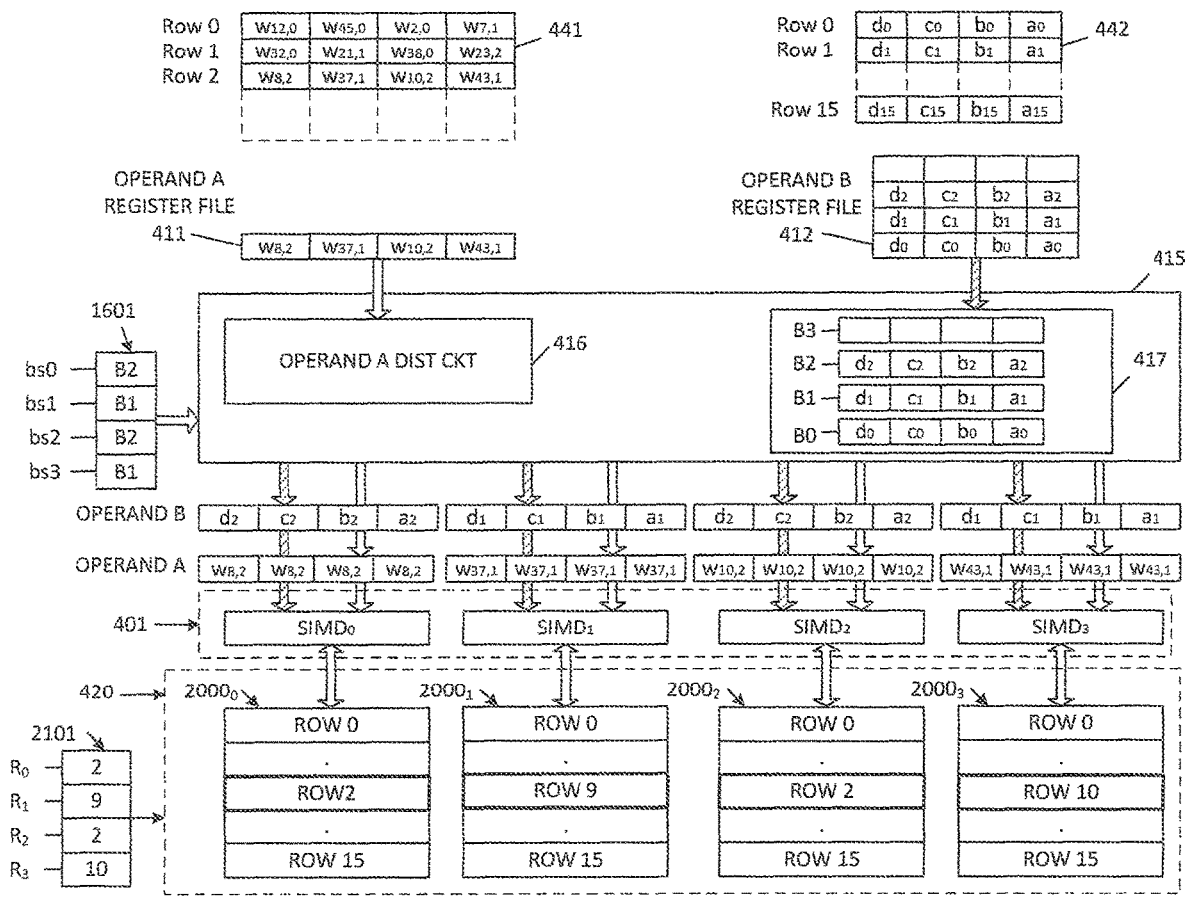

As illustrated by FIG. 31, state machine and scheduler 431 then causes Row 2 of Operand A memory block 441 to be retrieved and loaded into Operand A register file 411, and then transferred into an Operand A buffer within Operand A distribution circuit 416. Thus, Operand A register file 411 and Operand A distribution circuit 416 store the non-zero weight values $w_{8,2}$, $w_{37,1}$, $w_{10,2}$ and $w_{43,1}$ of Matrix I.

The activation values already stored in Operand B buffers B1-B2 of Operand B distribution are used in multiply-accumulate operations associated with the non-zero weight values $w_{8,2}$, $w_{37,1}$, $w_{10,2}$ and $w_{43,1}$ of Matrix I.

State machine and scheduler 431 causes Operand A distribution circuit 416 to route the non-zero values $w_{8,2}$, $w_{37,1}$, $w_{10,2}$ and $w_{43,1}$ from Operand A register file 411 to $SIMD_0$, $SIMD_1$, $SIMD_2$ and $SIMD_3$, respectively, as Operand A. At the same time, state machine and scheduler 431 causes Operand B distribution circuit 417 to route the values $d_2$, $c2$, $b_2$ and $a2$ to each of $SIMD_0$ and $SIMD_2$ as Operand B, and causes Operand B distribution circuit 417 to route the values $d_i$, $c_i$, $b_i$ and $a_i$ to $SIMD_1$ and $SIMD_3$.

$SIMD_0$, $SIMD_1$, $SIMD_2$ and $SIMD_3$ multiply the received Operands A and B in the manner described above. State machine and scheduler 431 independently addresses the previously determined rows in output register sets $2000_0$, $2000_1$, $2000_2$ and $2000_3$ that are associated with the non-zero values $w_{8,2}$, $w_{37,1}$, $w_{10,2}$ and $w_{43,1}$. That is, state machine and scheduler 431 addresses Row 2, Row 9, Row 2 and Row 10 within output register sets $2000_0$, $2000_1$, $2000_2$ and $2000_3$, respectively. As described above, all rows of the output register sets store initially store '0' values.

$SIMD_0$, $SIMD_1$, $SIMD_2$ and $SIMD_3$ perform accumulate operations, wherein the calculated products are added to the zero values retrieved from the output register sets $2000_0$, $2000_1$, $2000_2$ and $2000_3$, respectively. $SIMD_0$, $SIMD_1$, $SIMD_2$ and $SIMD_3$ then write the accumulated values to the addressed rows (Row 2, Row 9, Row 2 and Row 10, respectively) of the output register sets $2000_0$, $2000_1$, $2000_2$ and $2000_3$, respectively.

Note that the multiply-accumulate operations implemented in FIG. 31 advantageously use non-zero weight values from the second column of Matrix I (i.e., weight values $w_{37,1}$ and $w_{43,1}$) and the third column of Matrix I (i.e., weight values $w_{8,2}$ and $w_{10,2}$), thereby increasing operational efficiency (because none of the SIMD engines are idle).

Although the processing of only three columns of sparse Matrix I are described in the example of FIGS. 29-31, it is understood that the remaining columns of sparse Matrix I can be processed in the same manner as the first three columns. By packing the non-zero operand values of sparse Matrix I in the above-described manner, the number of operations required to multiply the sparse Matrix I and Matrix J are advantageously minimized.

Although operand packing logic 433 is shown as being a part of control logic 430 in the embodiments described above, it is understood that in an alternate embodiment, the functionality of operand packing logic 433 can be implemented external to system 400. In such an alternate embodiment, software can be used to identify the non-zero values of Matrix I (because the weight values for a network, as represented by the entries of Matrix I, are known), determine the output registers (and output register row addresses) associated with these non-zero values, identify the addresses of the values of the Matrix J required to perform the multiply-accumulate operations with the non-zero values of Matrix I, and determine the manner in which the non-zero values of Matrix I should be packed within the Operand A register file 411. Methods for performing these determinations are described in detail above. The packed Operand A values can then be loaded directly into Operand A register file 411 (and/or system memory 440). The addresses required to load and access Operand B register file 412 and the addresses required to access the output registers $2000_0$-$2000_3$ can be loaded into state machine and scheduler 431.

State machine and scheduler 431 then simply retrieves the non-zero values from memory and supplies the required address signals during runtime, without any extra hardware complexity. In this manner, this alternate embodiment advantageously reduces the hardware requirements of system 400.

Although the invention has been described in connection with several embodiments, it is understood that this invention is not limited to the embodiments disclosed, but is capable of various modifications, which would be apparent to a person skilled in the art. Accordingly, the present invention is limited only by the following claims.

We claim:

1. A method of performing matrix multiplication of a first matrix and a second matrix using a computer system including N single instruction multiple data (SIMD) engines and N corresponding output register sets, wherein N is a number equal to or greater than two, and wherein each of the output register sets includes a corresponding plurality of output registers, the method comprising:
   identifying a plurality of non-zero entries included in the first matrix, wherein each of the identified plurality of non-zero entries has a corresponding column address and a corresponding row address within the first matrix;
   for each of the identified plurality of non-zero entries, using the corresponding row address of the non-zero entry to identify a corresponding one of the N SIMD engines and a corresponding one of the N output register sets to process the non-zero entry;
   sorting the identified plurality of non-zero entries to select N non-zero entries, each having a different identified corresponding one of the N output register sets;
   routing each of the selected N non-zero entries to the identified corresponding one of the N SIMD engines to perform multiplication operations with entries of the second matrix, wherein each of the N SIMD engines generates a plurality of products;
   for each of the selected N non-zero entries, using the corresponding row address of the non-zero entry to identify one of the plurality of output registers within the identified corresponding one of the N output register sets; and
   for each of the selected N non-zero entries, using the identified corresponding one of the N SIMD engines to perform accumulate operations by accessing the identified one of the output registers within the identified corresponding one of the N output register sets.

2. The method of claim 1, further comprising:
   for each of the selected N non-zero entries:
      identifying a corresponding row of entries within the second matrix in response to the corresponding column address of the non-zero entry;
      routing the identified corresponding row of entries to the identified corresponding one of the N SIMD engines; and
      multiplying each of the selected N non-zero entries with the identified corresponding row of entries using the identified corresponding one of the N SIMD engines, thereby creating a corresponding plurality of products with each of the N SIMD engines.

3. The method of claim 1, further comprising:
   for each of the selected N non-zero entries, identifying a row within the corresponding one of the N output register sets in response to the corresponding row address of the non-zero entry, wherein the identified row of the corresponding one of the N output register sets identifies the corresponding output register within the corresponding one of the N output register sets.

4. The method of claim 1, wherein each row of the first matrix represents a weight vector in a machine learning system, and each column of the second matrix represents an activation vector in the machine learning system.

5. The method of claim 1, further comprising ignoring any zero entries in the first matrix.

6. The method of claim 1, further comprising assigning a unique entry in the N output register sets to each dot product of the matrix multiplication.

7. The method of claim 1, wherein each non-zero entry of the selected N non-zero entries is routed to the identified corresponding one of the N SIMD engines such that the identified corresponding one of the N SIMD engines receives multiple copies of the non-zero entry.

8. The method of claim 1, further comprising independently addressing each identified corresponding output register within the corresponding one of the N output register sets.

9. The method of claim 1, wherein ⅛ or fewer of the entries of the first matrix are non-zero entries.

10. The method of claim 1, wherein using the corresponding row address of the non-zero entry to identify a corresponding one of the N SIMD engines and a corresponding one of the N output register sets to process the non-zero entry comprises:
   dividing the row address of the non-zero entry by the number N, and then using the remainder of this dividing operation to identify the corresponding one of the N SIMD engines and the corresponding one of the N output register sets.

11. The method of claim 3, wherein identifying a row within the corresponding one of the N output register sets in response to the corresponding row address of the non-zero entry comprises:
   dividing the row address of the non-zero entry within the first matrix by the number N and ignoring any remainder.

12. The method of claim 2, wherein identifying a corresponding row of entries within the second matrix in response to the corresponding column address of the non-zero entry comprises: identifying a row of entries in the second matrix having a row address equal to the corresponding column address of the non-zero entry.

13. A computer system comprising:
   single instruction multiple data (SIMD) engines, wherein N is a number equal to or greater than two; and
   corresponding output register sets, each including a corresponding plurality of output registers, the computer system configured to perform matrix multiplication of a first matrix and a second matrix by performing the steps of:
      identifying a plurality of non-zero entries included in the first matrix, wherein each of the identified plurality of non-zero entries has a corresponding column address and a corresponding row address within the first matrix;
      for each of the identified plurality of non-zero entries, using the corresponding row address of the non-zero entry to identify a corresponding one of the N SIMD engines and a corresponding one of the N output register sets to process the non-zero entry;
      sorting the identified plurality of non-zero entries to select N non-zero entries, each having a different identified corresponding one of the N output register sets;

routing each of the selected N non-zero entries to the identified corresponding one of the N of SIMD engines to perform multiplication operations with entries of the second matrix, wherein each of the N SIMD engines generates a plurality of products;

for each of the selected N non-zero entries, using the corresponding row address of the non-zero entry to identify one of the plurality of output registers in the identified corresponding one of the N output register sets; and for each of the selected N non-zero entries, using the identified corresponding one of the N SIMD engines to perform accumulate operations by accessing the identified one of the output registers within the identified corresponding one of the N output register sets.

14. The computer system of claim 13, further configured to perform the steps of:

for each of the selected N non-zero entries:
identifying a corresponding row of entries in the second matrix in response to the corresponding column address of the non-zero entry;
routing the identified corresponding row of entries to the identified corresponding one of the N SIMD engines; and
multiplying each of the selected N non-zero entries with the identified corresponding row of entries using the identified corresponding one of the N SIMD engines, thereby creating a corresponding plurality of products with each of the N SIMD engines.

15. The computer system of claim 13, further configured to perform the steps of:

for each of the selected N non-zero entries,
identifying a row of the corresponding one of the N output register sets in response to the corresponding row address of the non-zero entry,
wherein the identified row of the corresponding one of the N output register sets identifies the corresponding output register within the corresponding one of the N output register sets.

16. The computer system of claim 13, wherein each row of the first matrix represents a weight vector in a machine learning system, and each column of the second matrix represents an activation vector in the machine learning system.

17. The computer system of claim 13, further configured to perform the step of ignoring any zero entries in the first matrix.

18. The computer system of claim 13, further configured to perform the step of assigning a unique entry in the N output register sets to each dot product of the matrix multiplication.

19. The computer system of claim 13, wherein each non-zero entry of the selected N non-zero entries is routed to the identified corresponding one of the N SIMD engines such that the identified corresponding one of the N SIMD engines receives multiple copies of the non-zero entry.

20. The computer system of claim 13, further configured to perform the step of independently addressing each identified corresponding output register within the corresponding one of the N of output register sets.

21. The computer system of claim 13, wherein $1/8$ or fewer of the entries of the first matrix are non-zero entries.

22. The computer system of claim 13, wherein using the corresponding row address of the non-zero entry to identify a corresponding one of the N SIMD engines and a corresponding one of the N output register sets to process the non-zero entry comprises:

dividing the row address of the non-zero entry by the number N, and then using the remainder of this dividing operation to identify the corresponding one of the N SIMD engines and the corresponding one of the N output register sets.

23. The computer system of claim 15, wherein identifying a row within the corresponding one of the N output register sets in response to the corresponding row address of the non-zero entry comprises:

dividing the row address of the non-zero entry within the first matrix by the number N and ignoring any remainder.

24. The computer system of claim 14, wherein identifying a corresponding row of entries within the second matrix in response to the corresponding column address of the non-zero entry comprises: identifying a row of entries in the second matrix having a row address equal to the corresponding column address of the non-zero entry.

\* \* \* \* \*